(12) United States Patent
Cieplinski et al.

(10) Patent No.: US 8,957,865 B2
(45) Date of Patent: Feb. 17, 2015

(54) DEVICE, METHOD, AND GRAPHICAL USER INTERFACE FOR MANIPULATING A USER INTERFACE OBJECT

(75) Inventors: Avi E. Cieplinski, San Francisco, CA (US); Timothy David Cherna, San Francisco, CA (US); Jeffrey Traer Bernstein, San Francisco, CA (US); B. Michael Victor, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1516 days.

(21) Appl. No.: 12/566,994

(22) Filed: Sep. 25, 2009

(65) Prior Publication Data
US 2010/0171712 A1  Jul. 8, 2010

Related U.S. Application Data

(60) Provisional application No. 61/142,624, filed on Jan. 5, 2009, provisional application No. 61/184,818, filed on Jun. 7, 2009.

(51) Int. Cl.
*G06F 3/041* (2006.01)
*G06T 11/60* (2006.01)
*G06F 3/0488* (2013.01)

(52) U.S. Cl.
CPC ............ *G06T 11/60* (2013.01); *G06F 3/04883* (2013.01); *G06F 2203/04808* (2013.01)
USPC ......................................................... 345/173

(58) Field of Classification Search
None
See application file for complete search history.

(56) References Cited

U.S. PATENT DOCUMENTS

| 5,798,752 | A | 8/1998 | Buxton et al. |
|---|---|---|---|
| 7,055,110 | B2 | 5/2006 | Kupka |
| 7,453,444 | B2 * | 11/2008 | Geaghan ....................... 345/173 |
| 7,489,305 | B2 | 2/2009 | Salisbury et al. |
| 2003/0071858 | A1 | 4/2003 | Morohoshi |
| 2005/0052427 | A1 | 3/2005 | Wu et al. |
| 2006/0001650 | A1 | 1/2006 | Robbins et al. |
| 2006/0026535 | A1 * | 2/2006 | Hotelling et al. ............. 715/863 |

(Continued)

FOREIGN PATENT DOCUMENTS

| DE | 20 2007 014957 | 12/2007 |
|---|---|---|
| EP | 0 689 123 A2 | 12/1995 |

(Continued)

OTHER PUBLICATIONS

Apple.com, "Find Out How," downloaded Dec. 16, 2008, 1 page, http://www.apple.com/findouthow/work/#tutorial=shapesmasks.

(Continued)

*Primary Examiner* — Nicholas Lee
(74) *Attorney, Agent, or Firm* — Morrison & Foerster LLP

(57) ABSTRACT

In some embodiments, an electronic device with a display and a touch-sensitive surface displays a user interface object. The device detects a first contact and a second contact concurrently on the touch-sensitive surface. The device determines which contact of the first contact and the second contact is a topmost contact, a bottommost contact, a leftmost contact, and a rightmost contact on the touch-sensitive surface. While continuing to detect the first contact and the second contact, the device detects movement of the first contact across the touch-sensitive surface, and concurrently moves two edges of the user interface object that correspond to the first contact in accordance with the detected movement of the first contact, including horizontally moving one of the two edges and vertically moving the other of the two edges.

30 Claims, 46 Drawing Sheets

(56) References Cited

U.S. PATENT DOCUMENTS

| | | | |
|---|---|---|---|
| 2006/0125803 A1 | 6/2006 | Westerman et al. | |
| 2006/0170669 A1* | 8/2006 | Walker et al. | 345/418 |
| 2006/0288313 A1 | 12/2006 | Hillis | |
| 2007/0097089 A1 | 5/2007 | Battles | |
| 2007/0182722 A1 | 8/2007 | Hotelling et al. | 345/173 |
| 2008/0036743 A1 | 2/2008 | Westerman et al. | 345/173 |
| 2008/0158170 A1 | 7/2008 | Herz et al. | |
| 2008/0168395 A1 | 7/2008 | Ording et al. | |
| 2008/0168403 A1 | 7/2008 | Westerman et al. | |
| 2008/0168405 A1 | 7/2008 | Tolmasky et al. | |
| 2008/0192059 A1 | 8/2008 | Kennedy | |
| 2008/0297482 A1 | 12/2008 | Weiss | |
| 2008/0309632 A1 | 12/2008 | Westerman et al. | |
| 2008/0316183 A1 | 12/2008 | Westerman et al. | |
| 2009/0051946 A1* | 2/2009 | Hibi | 358/1.9 |
| 2009/0125848 A1 | 5/2009 | Keohane et al. | |
| 2009/0128516 A1* | 5/2009 | Rimon et al. | 345/174 |
| 2009/0228792 A1 | 9/2009 | van Os et al. | |
| 2009/0284479 A1 | 11/2009 | Dennis et al. | |
| 2010/0149211 A1* | 6/2010 | Tossing et al. | 345/628 |
| 2010/0169819 A1* | 7/2010 | Bestle et al. | 715/773 |

FOREIGN PATENT DOCUMENTS

| | | |
|---|---|---|
| EP | 0 840 200 A2 | 5/1998 |
| EP | 1 615 109 A2 | 1/2006 |
| EP | 1 983 416 A1 | 10/2008 |
| WO | WO 2007/037806 | 4/2007 |

OTHER PUBLICATIONS

Apple.com, "MacBook Air," apple.com, downloaded Dec. 29, 2008, 3 pages, http://www.apple.com/macbookair/features.html.

Buxton, W., "Chapter 5: Case Study 1: Touch Tablets," Haptic Input, Jan. 4, 2009.

CNET, "bounding box," cnet.com, downloaded Dec. 29, 2008, 1 page, http://www.cnet.com/Resources/Info/Glossary/Terms/boundingbox.html.

MacKenzie et al., "A Comparison of Three Selection Techniques for Touchpads," Proceedings of the CHI '98 Conference on Human Factors in Computing Systems, pp. 336-343, New York: ACM.

MacRumors, "View Full Version: Best way to do multi-touch scale/rotate on iPhone," MacRumors.com, Jun. 29, 2008, 4 pages, http://forums.macrumors.com/archive/index.php/t-508042.html.

Multi-Touch Technology, "Minority Report-like Touch Screen," http://www.multitouchtechnology.com/videos/minority-report-like-touch-screen/.

Multi-Touch Technology, "Multi-Touch for Mac OS X in Full-Screen," Multi-Touch Technology.com, downloaded Dec. 29, 2008, 5 pages, http://www.multitouchtechnology.com/videos/multi-touch-for-mac-os-x-in-full-screen/.

Multi-Touch Technology, "Multi-Touch trackpad gestures," Multi-Touch Technology.com, downloaded Dec. 29, 2008, 6 pages, http://www.multitouchtechnology.com/mac/multi-touch-trackpad-gestures/.

Photogene, "Photogene Tutorial," photogene.com, downloaded Dec. 11, 2008, 4 pages, http://www.i-photogene.com/photogene/Tutorial.html.

Ricker, T., "Multi-finger MacBook trackpad gestures demonstrated on video," Zimbio Pilot—Laptop Reviews, Oct. 15, 2008, 7 pages, http://www.zimbio.com/pilot?ZURL=%2FLaptop%2BReviews%2Farticles.

Serif SPC, "DrawPlus 4.0 Companion," ©1998 Serif, Inc, 188 pages.

Simon, S., "A Good Crop," O'Reilly digitalmedia, Jun. 26, 2008, 11 pages, http://blogs.oreilly.com/aperture/2008/06/a-good-crop/html.

Starrett, C., "iPhone Gems: Top Photography and Image Manipulation Apps,"iLounge, Oct. 8, 2008, 14 pages, http://www.ilounge.com/index.php/articles/comments/iphone-gems-top-photography-and-image-manipulation-apps.

Touch Usability, "Multi-touch Mighty Mouse?" touchusability.com, Dec. 22, 2008, 7 pages, http://www.touchusability.com/touchpads/.

Brandl, P. "Combining and Measuring the Benefits of Bimanual Pen and Direct-Touch Interaction on Horizontal Interfaces," Media Interaction Lab, May 2008, slide presentation, 26 pages.

Dietz, P. et al, "DiamondTouch: A Multi-User Touch Technology," UIST '01 Orlando FLA, Nov. 11-14, 2001, pp. 219-226.

Esenther et al., "DiamondTouch SDK: Support for Multi-User, Multi-Touch Applications," Mitsubishi Electric Research Laboratories, TR2002-48, Nov. 2002.

FinderWorks, "XWinder, The Future of Window Management," FingerWorks.com, uploaded Apr. 27, 2009, http://www.fingerworks.com/XWinder.html, 4 pages.

Gamedev, "Game Dictionary," GameDev.net, Dec. 29, 2008, http://www.gamedev.net/dict/term.asp?TermID=309, 1 page.

Hinckley et al., "Interaction and Modeling Techniques for Desktop Two-Handed Input," UIST '98, San Francisco, CA, Nov. 1998, 10 pages.

HP, "TouchSmart tx2 Notebook PC," 2009, http://h30440.www3.hp.com/campaigns/tx2/demo/Model.html, 1 page.

jasu, "Matrices and the Transform Matrix," jasu blog. Jun. 13, 2007, http://jasu.tistory.com/228, 22 pages.

Kurtenback et al., The Design of a GUI Paradigm based on Tablets, Two hands, and Transparency, Mar. 27, 1997, 8 pages.

Malik, S. et al., "Visual Touchpad: A Two-handed Gesturel Input Device," ICMI'04, Oct. 13-15, 2004, 8 pages.

Matsushita et al., "HoloWall: Designing a Finger. Hand, Body, and Object Sensitive Wall," UIST '97 Banff, Alberta, Canada, Oct. 1997, 2 pages.

Moscovich et al., "Indirect Mappings of Multi-touch Input Using One and Two Hands," CHI 2008, Apr. 2008, Florence, Italy, 9 pages.

Palm Inc., "Palm Pre Phone User Guide," Sprint, 2009, pp. 41-51 and 165-175.

SavySoda, "Documents 2 by SavySoda," May 6, 2009, http://web.archive.org/web/20090506223817/http://www.savysoda.com/Documents2/, 5 pages.

Surfin' Safari, "CSS Transforms," Oct. 26, 2007, http://webkit.org/blog/130/css-transforms/, 6 pages.

SVG 1.1, "7 Coordinate Systems, Transformations and Units," Jan. 14, 2003, http://www.w3.org/TR/SVG/coords.html, 50 pages.

Ullmer et al., "The metaDESK: Models and Prototypes for Tangible User Interfaces," UIST '97, Oct. 1997, Banff, Alberta, Canada, 10 pages.

Van Lam, "Multi-touch Image Editing with LiveOuartz," MacApper, May 8, 2008. http://macapper.com/2008/05/08/multi-touch-image-editing-with-liveguartz/3 pages.

Vimeo, "A demo of a multi-touch photo app," Jae-Ho Yoo, 2009, http://vimeo.com/1614427?pg=embed&sec=1614427, 1 pageWikipedia, "Minimum bounding box," Wikipedia, the free encyclopedia. Oct. 31, 2008, http://en.wikipedia.org/wiki/Bounding_box, 2 pages.

Wikipedia, "Minimum bounding box," Wikipedia, the free encyclopedia, Oct. 31. 2008, http://en.wikipedia.org/wiki/Bounding_box, 2 pages.

Wilson, A., "Robust Computer Vision-Based Detection of Pinching for One and Two-Handed Gesture Input," UIST '06, Oct. 2006, Montreux, Switzerland, 4 pages.

Wu, et al., "Multi-Finger and Whole Hand Gestural Interaction Techniques for Multi-User Tabletop Displays," UIST '03, Nov. 5-7, 2003, Vancouver, BC, Canada, © ACM 2003, 10 pages.

YouTube, "Dell Latitude XT," 9:44 minute video uploaded to YouTube by raiden72 on Sep. 11, 2008, http://www.youtube.com/watch?v=ysRBGiztvjY, 2 pages.

You Tube, "high def videos," 42 second video uploaded to YouTube by David Brebner on Jun. 10, 2008, http://www.youtube.com/watch?v=QawnEnn01Li, 1 page.

YouTube, "HP TX2 TouchSmart Multi Touch DEMO in Vista," 5:49 minute video uploaded to YouTube by Topcat Yen, Jan. 18, 2009, http://www.youtube.com/watch?v=DxvFRW8xR3Y, 1 page.

YouTube, "Jesuits at CES-HP TX2::The "iPhone" of Tablet Notebooks," 3:25 minute video uploaded to YouTube by gadgettts, Jan. 10, 2009, http://www.youtube.com/watch?v=tOO713z4GOs, 2 pages.

(56) References Cited

OTHER PUBLICATIONS

YouTube, "MERL DiamondTouch (2001)," 2:51 minute video uploaded to YouTube by Paul Dietz, Jun. 5, 2007, http://www.youtube.com/watch?v=MwizbTQfOpl, 1 page.

YouTube, "Photoshop MT-Desktop Digital Imaging on FTIR multitouch," 5:38 minute video uploaded to YouTube by thomasglaeser on Feb. 7, 2007, http://www.youtube.com/watch?v=JmHNr9EH1iU&feature=related, 2 pages.

European Search Report and Written Opinion dated Jul. 8, 2011, received in European Patent Application No. 11150220.9, which corresponds to U.S. Appl. No. 12/789,425.

Invitation to Pay Additional Fees dated Jul. 13, 2011, received in International Patent Application No. PCT/US2010/062588, which corresponds to U.S. Appl. No. 12/789,425.

International Search Report and Written Opinion dated Dec. 14, 2011, received in U.S. Appl. No. 12/789,425 (Hogan).

\* cited by examiner

700

---

Simultaneously display on a display: a digital image and a cropping mask rectangle for the digital image. The digital image has an image location on the display and an image area. The cropping mask rectangle has four edges comprising a top edge, a bottom edge, a left edge, and a right edge. — 702

> The top and bottom edges are horizontal lines and the left and right edges are vertical lines. — 704

> The digital image and the cropping mask rectangle are simultaneously displayed in an image editing application, a drawing application, a presentation application, or a word processing document — 706

---

Enter a digital image manipulation mode in response to detecting a first predefined user action — 708

---

While the computing device is in the digital image manipulation mode:

> Provide a visual indicator that the digital image can be manipulated — 710

> Detect a first contact and a second contact concurrently on the touch-sensitive surface — 712

> Determine a position of the first contact on the touch-sensitive surface — 714

> Determine a position of the second contact on the touch-sensitive surface — 716

| 802 | Simultaneously display on a display: a digital image and a cropping mask rectangle for the digital image. The cropping mask rectangle has a mask location on the display, a mask area, a mask height, a mask width, and a mask aspect ratio between the mask width and the mask height. |

| 804 | The digital image and the cropping mask rectangle are simultaneously displayed in an image editing application, a drawing application, a presentation application, or a word processing document |

| 806 | Provide a visual indicator that the cropping mask rectangle can be manipulated |

| 808 | Detect a first contact and a second contact concurrently on the touch-sensitive surface |

| 810 | The first contact and the second contact are displaced from the edges of the cropping mask rectangle |

| 812 | The first contact and the second contact are displaced from the cropping mask rectangle |

| 814 | Determine a position of the first contact on the touch-sensitive surface |

| 816 | Determine a position of the second contact on the touch-sensitive surface |

┌─────────────────────────────────────────────────────────────────────┐
│ Simultaneously display on a display: a digital image and a cropping mask │ ─ 902
│ rectangle for the digital image. The digital image has an image location on │
│ the display and an image area. The cropping mask rectangle has a mask │
│ location on the display, a mask area, a mask height, a mask width, and a │
│ mask aspect ratio between the mask width and the mask height │
│                                                                     │
│  ┌───────────────────────────────────────────────────────────────┐  │
│  │ The digital image and the cropping mask rectangle are         │  │
│  │ simultaneously displayed in an image editing application, a drawing │─ 904
│  │ application, a presentation application, or a word processing │  │
│  │ document                                                      │  │
│  └───────────────────────────────────────────────────────────────┘  │
└─────────────────────────────────────────────────────────────────────┘
                                  ▼
┌─────────────────────────────────────────────────────────────────────┐
│ Enter a digital image manipulation mode in response to detecting a first │─ 906
│ predefined user action                                              │
└─────────────────────────────────────────────────────────────────────┘
                                  ▼
┌─────────────────────────────────────────────────────────────────────┐
│ While the computing device is in the digital image manipulation mode: │
│                                                                     │
│  ┌───────────────────────────────────────────────────────────────┐  │
│  │ Provide a visual indicator that the digital image can be manipulated │─ 908
│  └───────────────────────────────────────────────────────────────┘  │
│                                                                     │
│  ┌───────────────────────────────────────────────────────────────┐  │
│  │ Detect a first contact and a second contact concurrently on the │─ 910
│  │ touch-sensitive surface                                       │  │
│  └───────────────────────────────────────────────────────────────┘  │
│                              ▼                                      │
│  ┌───────────────────────────────────────────────────────────────┐  │
│  │ Determine a position of the first contact on the touch-sensitive │─ 912
│  │ surface                                                       │  │
│  └───────────────────────────────────────────────────────────────┘  │
│                              ▼                                      │
│  ┌───────────────────────────────────────────────────────────────┐  │
│  │ Determine a position of the second contact on the touch-sensitive │─ 914
│  │ surface                                                       │  │
│  └───────────────────────────────────────────────────────────────┘  │
└─────────────────────────────────────────────────────────────────────┘
                                  ▼
                                 (A)

| Display a user interface object on the display. The user interface object has four edges comprising a top edge, a bottom edge, a left edge, and a right edge. | 1002 |

The four edges are edges of a bounding box of the user interface object — 1004

The top and bottom edges are horizontal lines and the left and right edges are vertical lines — 1006

The user interface object is displayed in an image editing application, a drawing application, a presentation application, or a word processing document — 1008

Provide a visual indicator that the user interface object can be manipulated — 1010

Detect a first contact and a second contact concurrently on the touch-sensitive surface — 1012

The first contact and the second contact are displaced from the edges of the user interface object — 1014

The first contact and the second contact are displaced from the user interface object — 1016

Determine a position of the first contact on the touch-sensitive surface — 1018

Determine a position of the second contact on the touch-sensitive surface — 1020

DEVICE, METHOD, AND GRAPHICAL USER INTERFACE FOR MANIPULATING A USER INTERFACE OBJECT

RELATED APPLICATIONS

This application claims priority to U.S. Provisional Patent Application Nos. 61/142,624, "Device, Method, and Graphical User Interface for Manipulating a User Interface Object," filed Jan. 5, 2009, and 61/184,818, "Device, Method, and Graphical User Interface for Manipulating a User Interface Object," filed Jun. 7, 2009. Both of these applications are incorporated by reference herein in their entirety.

This application is related to the following applications: (1) U.S. patent application Ser. No. 10/654,108, "Ambidextrous Mouse," filed Sep. 2, 2003; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/038,590, "Mode-Based Graphical User Interfaces For Touch Sensitive Input Devices" filed Jan. 18, 2005; (5) U.S. patent application Ser. No. 11/367,749, "Multi-Functional Hand-Held Device," filed Mar. 3, 2006; (6) U.S. patent application Ser. No. 11/700,636, "Gesturing With A Multipoint Sensing Device," filed Jan. 31, 2007; U.S. patent application Ser. No. 11/731,118, "Wide Touchpad On A Portable Computer," filed Mar. 30, 2007; and (7) U.S. patent application Ser. No. 11/850,635, "Touch Screen Device, Method, and Graphical User Interface for Determining Commands by Applying Heuristics," filed Sep. 5, 2007. All of these applications are incorporated by reference herein in their entirety.

TECHNICAL FIELD

The disclosed embodiments relate generally to electronic devices with touch-sensitive surfaces operable to manipulate user interface objects, such as a digital image and/or a cropping mask rectangle for the digital image.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display. Typical manipulations include adjusting the position, size, and/or orientation of digital images, graphic objects, text, and other user interface objects. For example, a user may need to perform such manipulations on a digital image and/or a cropping mask rectangle for the digital image in an image editing application (e.g., Aperture or iPhoto from Apple Computer, Inc. of Cupertino, Calif.), a drawing application, a presentation application (e.g., Keynote from Apple Computer, Inc. of Cupertino, Calif.), a word processing application (e.g., Pages from Apple Computer, Inc. of Cupertino, Calif.), a website creation application (e.g., iWeb from Apple Computer, Inc. of Cupertino, Calif.), a disk authoring application (e.g., iDVD from Apple Computer, Inc. of Cupertino, Calif.), or a spreadsheet application (e.g., Numbers from Apple Computer, Inc. of Cupertino, Calif.).

But conventional methods for performing these manipulations are cumbersome and inefficient. For example, using a cursor to individually adjust multiple handles on multiple user interface objects (e.g., digital images and/or cropping mask rectangles) is tedious and creates a significant cognitive burden on a user. In addition, conventional methods take longer than necessary, thereby wasting energy. This latter consideration is particularly important in battery-operated devices.

Accordingly, there is a need for computing devices with faster, more efficient methods and interfaces for manipulating on-screen objects. Such methods and interfaces may complement or replace conventional methods for manipulating on-screen objects. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computer-implemented method is performed at a computing device with a display and a touch-sensitive surface. The computer-implemented method includes: simultaneously displaying on the display: a digital image; and a cropping mask rectangle for the digital image, wherein the cropping mask rectangle has four edges comprising a top edge, a bottom edge, a left edge, and a right edge; detecting a first contact and a second contact concurrently on the touch-sensitive surface; determining which contact of the first contact and the second contact is a topmost contact on the touch-sensitive surface; determining which contact of the first contact and the second contact is a bottommost contact on the touch-sensitive surface; determining which contact of the first contact and the second contact is a leftmost contact on the touch-sensitive surface; determining which contact of the first contact and the second contact is a rightmost contact on the touch-sensitive surface; and, while continuing to detect the first contact and the second contact on the touch-sensitive surface: detecting movement of the first contact across the touch-sensitive surface; and concurrently moving on the display two edges of the cropping mask rectangle that correspond to the first contact in accordance with the detected movement of the first contact, including horizontally moving one of the two edges and vertically moving the other of the two edges.

In accordance with some embodiments, a computing device includes a touch-sensitive surface, a display, one or more processors, memory, and one or more programs. The one or more programs are stored in the memory and configured to be executed by the one or more processors. The one or more programs include instructions for: simultaneously displaying on the display: a digital image; and a cropping mask rectangle for the digital image, wherein the cropping mask rectangle has four edges comprising a top edge, a bottom edge, a left edge, and a right edge; detecting a first contact and a second contact concurrently on the touch-sensitive surface; determining which contact of the first contact and the second contact is a topmost contact on the touch-sensitive surface; determining which contact of the first contact and the second contact is a bottommost contact on the touch-sensitive surface; determining which contact of the first contact and the second contact is a leftmost contact on the touch-sensitive surface; determining which contact of the first contact and the second contact is a rightmost contact on the touch-sensitive surface; and, while continuing to detect the first contact and the second contact on the touch-sensitive surface: detecting movement of the first contact across the touch-sensitive surface; and concurrently moving on the display two edges of the cropping mask rectangle that correspond to the first contact in accordance with the detected movement of the first contact, including horizontally moving one of the two edges and vertically moving the other of the two edges.

In accordance with some embodiments, a computer readable storage medium has stored therein instructions which when executed by a computing device with a touch-sensitive surface and a display, cause the device to: simultaneously display on the display: a digital image; and a cropping mask rectangle for the digital image, wherein the cropping mask rectangle has four edges comprising a top edge, a bottom edge, a left edge, and a right edge; detect a first contact and a second contact concurrently on the touch-sensitive surface; determine which contact of the first contact and the second contact is a topmost contact on the touch-sensitive surface; determine which contact of the first contact and the second contact is a bottommost contact on the touch-sensitive surface; determine which contact of the first contact and the second contact is a leftmost contact on the touch-sensitive surface; determine which contact of the first contact and the second contact is a rightmost contact on the touch-sensitive surface; and, while continuing to detect the first contact and the second contact on the touch-sensitive surface: detect movement of the first contact across the touch-sensitive surface; and concurrently move on the display two edges of the cropping mask rectangle that correspond to the first contact in accordance with the detected movement of the first contact, including horizontally moving one of the two edges and vertically moving the other of the two edges.

In accordance with some embodiments, a graphical user interface on a computing device with a touch-sensitive surface, a display, a memory, and one or more processors to execute one or more programs stored in the memory includes a digital image and a cropping mask rectangle for the digital image. The cropping mask rectangle has four edges comprising a top edge, a bottom edge, a left edge, and a right edge. A first contact and a second contact are detected concurrently on the touch-sensitive surface. Which contact of the first contact and the second contact is a topmost contact on the touch-sensitive surface is determined. Which contact of the first contact and the second contact is a bottommost contact on the touch-sensitive surface is determined. Which contact of the first contact and the second contact is a leftmost contact on the touch-sensitive surface is determined. Which contact of the first contact and the second contact is a rightmost contact on the touch-sensitive surface is determined. While continuing to detect the first contact and the second contact on the touch-sensitive surface: movement of the first contact across the touch-sensitive surface is detected; and two edges of the cropping mask rectangle that correspond to the first contact are moved concurrently on the display in accordance with the detected movement of the first contact, including horizontally moving one of the two edges and vertically moving the other of the two edges.

In accordance with some embodiments, a computing device includes: a touch-sensitive surface; a display; means for simultaneously displaying on the display: a digital image; and a cropping mask rectangle for the digital image, wherein the cropping mask rectangle has four edges comprising a top edge, a bottom edge, a left edge, and a right edge; means for detecting a first contact and a second contact concurrently on the touch-sensitive surface; means for determining which contact of the first contact and the second contact is a topmost contact on the touch-sensitive surface; means for determining which contact of the first contact and the second contact is a bottommost contact on the touch-sensitive surface; means for determining which contact of the first contact and the second contact is a leftmost contact on the touch-sensitive surface; means for determining which contact of the first contact and the second contact is a rightmost contact on the touch-sensitive surface; and, while continuing to detect the first contact and the second contact on the touch-sensitive surface: means for detecting movement of the first contact across the touch-sensitive surface; and means for concurrently moving on the display two edges of the cropping mask rectangle that correspond to the first contact in accordance with the detected movement of the first contact, including horizontally moving one of the two edges and vertically moving the other of the two edges.

In accordance with some embodiments, a computer-implemented method is performed at a computing device with a display and a touch-sensitive surface. The computer-implemented method includes: simultaneously displaying on the display: a digital image, wherein the digital image has an image location on the display and an image area; and a cropping mask rectangle for the digital image, wherein the cropping mask rectangle has four edges comprising a top edge, a bottom edge, a left edge, and a right edge; while the computing device is in a digital image manipulation mode: detecting a first contact and a second contact concurrently on the touch-sensitive surface; while continuing to detect the first contact and the second contact on the touch-sensitive surface: detecting movement of at least one of the first contact and the second contact across the touch-sensitive surface; changing the image location on the display in accordance with a change in a location between the first contact and the second contact on the touch-sensitive surface; and changing the image area in accordance with a change in a distance between the first contact and the second contact on the touch-sensitive surface; and, while the computing device is in a cropping mask rectangle manipulation mode: detecting a third contact and a fourth contact concurrently on the touch-sensitive surface; determining which contact of the third contact and the fourth contact is a topmost contact on the touch-sensitive surface; determining which contact of the third contact and the fourth contact is a bottommost contact on the touch-sensitive surface; determining which contact of the third contact and the fourth contact is a leftmost contact on the touch-sensitive surface; determining which contact of the third contact and the fourth contact is a rightmost contact on the touch-sensitive surface; and, while continuing to detect the third contact and the fourth contact on the touch-sensitive surface: detecting movement of the third contact across the touch-sensitive surface; and concurrently moving on the display two edges of the cropping mask rectangle that correspond to the third contact in accordance with the detected movement of the third contact, including horizontally moving one of the two edges and vertically moving the other of the two edges.

In accordance with some embodiments, a computing device includes a touch-sensitive surface, a display, one or more processors, memory, and one or more programs. The one or more programs are stored in the memory and configured to be executed by the one or more processors. The one or more programs include instructions for: simultaneously displaying on the display: a digital image, wherein the digital image has an image location on the display and an image area; and a cropping mask rectangle for the digital image, wherein the cropping mask rectangle has four edges comprising a top edge, a bottom edge, a left edge, and a right edge; while the computing device is in a digital image manipulation mode: detecting a first contact and a second contact concurrently on the touch-sensitive surface; while continuing to detect the first contact and the second contact on the touch-sensitive surface: detecting movement of at least one of the first contact and the second contact across the touch-sensitive surface; changing the image location on the display in accordance with a change in a location between the first contact and the second contact on the touch-sensitive surface; and changing the image area in accordance with a change in a distance between the first contact and the second contact on the touch-sensitive surface; and, while the computing device is in a cropping mask rectangle manipulation mode: detecting a third contact and a fourth contact concurrently on the touch-sensitive surface; determining which contact of the third contact and the fourth contact is a topmost contact on the touch-sensitive surface; determining which contact of the third contact and the fourth contact is a bottommost contact on the touch-sensitive surface; determining which contact of the third contact and the fourth contact is a leftmost contact on the touch-sensitive surface; determining which contact of the third contact and the fourth contact is a rightmost contact on the touch-sensitive surface; and, while continuing to detect the third contact and the fourth contact on the touch-sensitive surface: detecting movement of the third contact across the touch-sensitive surface; and concurrently moving on the display two edges of the cropping mask rectangle that correspond to the third contact in accordance with the detected movement of the third contact, including horizontally moving one of the two edges and vertically moving the other of the two edges.

In accordance with some embodiments, a computer readable storage medium has stored therein instructions which when executed by a computing device with a touch-sensitive surface and a display, cause the device to: simultaneously display on the display: a digital image, wherein the digital image has an image location on the display and an image area; and a cropping mask rectangle for the digital image, wherein the cropping mask rectangle has four edges comprising a top edge, a bottom edge, a left edge, and a right edge; while the computing device is in a digital image manipulation mode: detect a first contact and a second contact concurrently on the touch-sensitive surface; while continuing to detect the first contact and the second contact on the touch-sensitive surface: detect movement of at least one of the first contact and the second contact across the touch-sensitive surface; change the image location on the display in accordance with a change in a location between the first contact and the second contact on the touch-sensitive surface; and change the image area in accordance with a change in a distance between the first contact and the second contact on the touch-sensitive surface; and, while the computing device is in a cropping mask rectangle manipulation mode: detect a third contact and a fourth contact concurrently on the touch-sensitive surface; determine which contact of the third contact and the fourth contact is a topmost contact on the touch-sensitive surface; determine which contact of the third contact and the fourth contact is a bottommost contact on the touch-sensitive surface; determine which contact of the third contact and the fourth contact is a leftmost contact on the touch-sensitive surface; determine which contact of the third contact and the fourth contact is a rightmost contact on the touch-sensitive surface; and, while continuing to detect the third contact and the fourth contact on the touch-sensitive surface: detect movement of the third contact across the touch-sensitive surface; and concurrently move on the display two edges of the cropping mask rectangle that correspond to the third contact in accordance with the detected movement of the third contact, including horizontally moving one of the two edges and vertically moving the other of the two edges.

In accordance with some embodiments, a graphical user interface on a computing device with a touch-sensitive surface, a display, a memory, and one or more processors to execute one or more programs stored in the memory includes a digital image and a cropping mask rectangle for the digital image. The digital image has an image location on the display and an image area. The cropping mask rectangle has four edges comprising a top edge, a bottom edge, a left edge, and a right edge. While the computing device is in a digital image manipulation mode: a first contact and a second contact are detected concurrently on the touch-sensitive surface; while continuing to detect the first contact and the second contact on the touch-sensitive surface: movement is detected of at least one of the first contact and the second contact across the touch-sensitive surface; the image location is changed on the display in accordance with a change in a location between the first contact and the second contact on the touch-sensitive surface; and the image area is changed in accordance with a change in a distance between the first contact and the second contact on the touch-sensitive surface. While the computing device is in a cropping mask rectangle manipulation mode: a third contact and a fourth contact are detected concurrently on the touch-sensitive surface; which contact of the third contact and the fourth contact is a topmost contact on the touch-sensitive surface is determined; which contact of the third contact and the fourth contact is a bottommost contact on the touch-sensitive surface is determined; which contact of the third contact and the fourth contact is a leftmost contact on the touch-sensitive surface is determined; which contact of the third contact and the fourth contact is a rightmost contact on the touch-sensitive surface is determined; and, while continuing to detect the third contact and the fourth contact on the touch-sensitive surface: movement of the third contact across the touch-sensitive surface is detected; and two edges of the cropping mask rectangle that correspond to the third contact are concurrently moved on the display in accordance with the detected movement of the third contact, including horizontally moving one of the two edges and vertically moving the other of the two edges.

In accordance with some embodiments, a computing device includes: a touch-sensitive surface; a display; means for simultaneously displaying on the display: a digital image, wherein the digital image has an image location on the display and an image area; and a cropping mask rectangle for the digital image, wherein the cropping mask rectangle has four edges comprising a top edge, a bottom edge, a left edge, and a right edge; while the computing device is in a digital image manipulation mode: means for detecting a first contact and a second contact concurrently on the touch-sensitive surface; while continuing to detect the first contact and the second contact on the touch-sensitive surface: means for detecting movement of at least one of the first contact and the second contact across the touch-sensitive surface; means for changing the image location on the display in accordance with a change in a location between the first contact and the second contact on the touch-sensitive surface; and means for changing the image area in accordance with a change in a distance between the first contact and the second contact on the touch-sensitive surface; and, while the computing device is in a cropping mask rectangle manipulation mode: means for detecting a third contact and a fourth contact concurrently on the touch-sensitive surface; means for determining which contact of the third contact and the fourth contact is a topmost contact on the touch-sensitive surface; means for determining which contact of the third contact and the fourth contact is a bottommost contact on the touch-sensitive surface; means for determining which contact of the third contact and the fourth contact is a leftmost contact on the touch-sensitive surface; means for determining which contact of the third contact and the fourth contact is a rightmost contact on the touch-sensitive surface; and, while continuing to detect the third contact and the fourth contact on the touch-sensitive surface: means for detecting movement of the third contact across the touch-sensitive surface; and means for concurrently moving on the display two edges of the cropping mask rectangle that correspond to the third contact in accordance with the detected movement of the third contact, including horizontally moving one of the two edges and vertically moving the other of the two edges.

In accordance with some embodiments, a computer-implemented method is performed at a computing device with a display and a touch-sensitive surface. The computer-implemented method includes: simultaneously displaying on the display: a digital image; and a cropping mask rectangle for the digital image, wherein the cropping mask rectangle has a mask location on the display, a mask area, a mask height, a mask width, and a mask aspect ratio between the mask width and the mask height; detecting a first contact and a second contact concurrently on the touch-sensitive surface; and, while continuing to detect the first contact and the second contact on the touch-sensitive surface: detecting movement of at least one of the first contact and the second contact across the touch-sensitive surface; and changing the mask aspect ratio in accordance with a change in an angle between an axis between the first contact and the second contact and an axis corresponding to the touch-sensitive surface.

In accordance with some embodiments, a computing device includes a touch-sensitive surface, a display, one or more processors, memory, and one or more programs. The one or more programs are stored in the memory and configured to be executed by the one or more processors. The one or more programs include instructions for: simultaneously displaying on the display: a digital image; and a cropping mask rectangle for the digital image, wherein the cropping mask rectangle has a mask location on the display, a mask area, a mask height, a mask width, and a mask aspect ratio between the mask width and the mask height; detecting a first contact and a second contact concurrently on the touch-sensitive surface; and, while continuing to detect the first contact and the second contact on the touch-sensitive surface: detecting movement of at least one of the first contact and the second contact across the touch-sensitive surface; and changing the mask aspect ratio in accordance with a change in an angle between an axis between the first contact and the second contact and an axis corresponding to the touch-sensitive surface.

In accordance with some embodiments, a computer readable storage medium has stored therein instructions which when executed by a computing device with a touch-sensitive surface and a display, cause the device to: simultaneously display on the display: a digital image; and a cropping mask rectangle for the digital image, wherein the cropping mask rectangle has a mask location on the display, a mask area, a mask height, a mask width, and a mask aspect ratio between the mask width and the mask height; detect a first contact and a second contact concurrently on the touch-sensitive surface; and, while continuing to detect the first contact and the second contact on the touch-sensitive surface: detect movement of at least one of the first contact and the second contact across the touch-sensitive surface; and change the mask aspect ratio in accordance with a change in an angle between an axis between the first contact and the second contact and an axis corresponding to the touch-sensitive surface.

In accordance with some embodiments, a graphical user interface on a computing device with a touch-sensitive surface, a display, a memory, and one or more processors to execute one or more programs stored in the memory includes a digital image and a cropping mask rectangle for the digital image. The cropping mask rectangle has a mask location on the display, a mask area, a mask height, a mask width, and a mask aspect ratio between the mask width and the mask height. A first contact and a second contact are detected concurrently on the touch-sensitive surface. While continuing to detect the first contact and the second contact on the touch-sensitive surface: movement of at least one of the first contact and the second contact across the touch-sensitive surface is detected; and the mask aspect ratio is changed in accordance with a change in an angle between an axis between the first contact and the second contact and an axis corresponding to the touch-sensitive surface.

In accordance with some embodiments, a computing device includes: a touch-sensitive surface; a display; means for simultaneously displaying on the display: a digital image; and a cropping mask rectangle for the digital image, wherein the cropping mask rectangle has a mask location on the display, a mask area, a mask height, a mask width, and a mask aspect ratio between the mask width and the mask height; means for detecting a first contact and a second contact concurrently on the touch-sensitive surface; and, while continuing to detect the first contact and the second contact on the touch-sensitive surface: means for detecting movement of at least one of the first contact and the second contact across the touch-sensitive surface; and means for changing the mask aspect ratio in accordance with a change in an angle between an axis between the first contact and the second contact and an axis corresponding to the touch-sensitive surface.

In accordance with some embodiments, a computer-implemented method is performed at a computing device with a display and a touch-sensitive surface. The computer-implemented method includes: simultaneously displaying on the display: a digital image, wherein the digital image has an image location on the display and an image area; and a cropping mask rectangle for the digital image, wherein the cropping mask rectangle has a mask location on the display, a mask area, a mask height, a mask width, and a mask aspect ratio between the mask width and the mask height; while the computing device is in a digital image manipulation mode: detecting a first contact and a second contact concurrently on the touch-sensitive surface; and, while continuing to detect the first contact and the second contact on the touch-sensitive surface: detecting movement of at least one of the first contact and the second contact across the touch-sensitive surface; changing the image location on the display in accordance with a change in a location between the first contact and the second contact on the touch-sensitive surface; and changing the image area in accordance with a change in a distance between the first contact and the second contact on the touch-sensitive surface; and, while the computing device is in a cropping mask rectangle manipulation mode: detecting a third contact and a fourth contact concurrently on the touch-sensitive surface; and, while continuing to detect the third contact and the fourth contact on the touch-sensitive surface: detecting movement of at least one of the third contact and the fourth contact across the touch-sensitive surface; and changing the mask aspect ratio in accordance with a change in an angle between an axis between the third contact and the fourth contact and an axis corresponding to the touch-sensitive surface.

In accordance with some embodiments, a computing device includes a touch-sensitive surface, a display, one or more processors, memory, and one or more programs. The one or more programs are stored in the memory and configured to be executed by the one or more processors. The one or more programs include instructions for: simultaneously displaying on the display: a digital image, wherein the digital image has an image location on the display and an image area; and a cropping mask rectangle for the digital image, wherein the cropping mask rectangle has a mask location on the display, a mask area, a mask height, a mask width, and a mask aspect ratio between the mask width and the mask height; while the computing device is in a digital image manipulation mode: detecting a first contact and a second contact concurrently on the touch-sensitive surface; while continuing to detect the first contact and the second contact on the touch-sensitive surface: detecting movement of at least one of the first contact and the second contact across the touch-sensitive surface; changing the image location on the display in accordance with a change in a location between the first contact and the second contact on the touch-sensitive surface; and changing the image area in accordance with a change in a distance between the first contact and the second contact on the touch-sensitive surface; and, while the computing device is in a cropping mask rectangle manipulation mode: detecting a third contact and a fourth contact concurrently on the touch-sensitive surface; and, while continuing to detect the third contact and the fourth contact on the touch-sensitive surface: detecting movement of at least one of the third contact and the fourth contact across the touch-sensitive surface; and changing the mask aspect ratio in accordance with a change in an angle between an axis between the third contact and the fourth contact and an axis corresponding to the touch-sensitive surface.

In accordance with some embodiments, a computer readable storage medium has stored therein instructions which when executed by a computing device with a touch-sensitive surface and a display, cause the device to: simultaneously display on the display: a digital image, wherein the digital image has an image location on the display and an image area; and a cropping mask rectangle for the digital image, wherein the cropping mask rectangle has a mask location on the display, a mask area, a mask height, a mask width, and a mask aspect ratio between the mask width and the mask height; while the computing device is in a digital image manipulation mode: detect a first contact and a second contact concurrently on the touch-sensitive surface; while continuing to detect the first contact and the second contact on the touch-sensitive surface: detect movement of at least one of the first contact and the second contact across the touch-sensitive surface; change the image location on the display in accordance with a change in a location between the first contact and the second contact on the touch-sensitive surface; and change the image area in accordance with a change in a distance between the first contact and the second contact on the touch-sensitive surface; and, while the computing device is in a cropping mask rectangle manipulation mode: detect a third contact and a fourth contact concurrently on the touch-sensitive surface; and, while continuing to detect the third contact and the fourth contact on the touch-sensitive surface: detect movement of at least one of the third contact and the fourth contact across the touch-sensitive surface; and change the mask aspect ratio in accordance with a change in an angle between an axis between the third contact and the fourth contact and an axis corresponding to the touch-sensitive surface.

In accordance with some embodiments, a graphical user interface on a computing device with a touch-sensitive surface, a display, a memory, and one or more processors to execute one or more programs stored in the memory includes a digital image and a cropping mask rectangle for the digital image. The digital image has an image location on the display and an image area. The cropping mask rectangle has a mask location on the display, a mask area, a mask height, a mask width, and a mask aspect ratio between the mask width and the mask height. While the computing device is in a digital image manipulation mode: a first contact and a second contact are detected concurrently on the touch-sensitive surface; while continuing to detect the first contact and the second contact on the touch-sensitive surface: movement is detected of at least one of the first contact and the second contact across the touch-sensitive surface; the image location is changed on the display in accordance with a change in a location between the first contact and the second contact on the touch-sensitive surface; and the image area is changed in accordance with a change in a distance between the first contact and the second contact on the touch-sensitive surface. While the computing device is in a cropping mask rectangle manipulation mode: a third contact and a fourth contact are detected concurrently on the touch-sensitive surface; and, while continuing to detect the third contact and the fourth contact on the touch-sensitive surface: movement is detected of at least one of the third contact and the fourth contact across the touch-sensitive surface; and the mask aspect ratio is changed in accordance with a change in an angle between an axis between the third contact and the fourth contact and an axis corresponding to the touch-sensitive surface.

In accordance with some embodiments, a computing device includes: a touch-sensitive surface; a display; means for simultaneously displaying on the display: a digital image, wherein the digital image has an image location on the display and an image area; and a cropping mask rectangle for the digital image, wherein the cropping mask rectangle has a mask location on the display, a mask area, a mask height, a mask width, and a mask aspect ratio between the mask width and the mask height; while the computing device is in a digital image manipulation mode: means for detecting a first contact and a second contact concurrently on the touch-sensitive surface; while continuing to detect the first contact and the second contact on the touch-sensitive surface: means for detecting movement of at least one of the first contact and the second contact across the touch-sensitive surface; means for changing the image location on the display in accordance with a change in a location between the first contact and the second contact on the touch-sensitive surface; and means for changing the image area in accordance with a change in a distance between the first contact and the second contact on the touch-sensitive surface; and, while the computing device is in a cropping mask rectangle manipulation mode: means for detecting a third contact and a fourth contact concurrently on the touch-sensitive surface; and, while continuing to detect the third contact and the fourth contact on the touch-sensitive surface: means for detecting movement of at least one of the third contact and the fourth contact across the touch-sensitive surface; and means for changing the mask aspect ratio in accordance with a change in an angle between an axis between the third contact and the fourth contact and an axis corresponding to the touch-sensitive surface.

In accordance with some embodiments, a computer-implemented method is performed at a computing device with a display and a touch-sensitive surface. The computer-implemented method includes: displaying a user interface object on the display, wherein the user interface object has four edges comprising a top edge, a bottom edge, a left edge, and a right edge; detecting a first contact and a second contact concurrently on the touch-sensitive surface; determining which contact of the first contact and the second contact is a topmost contact on the touch-sensitive surface; determining which contact of the first contact and the second contact is a bottommost contact on the touch-sensitive surface; determining which contact of the first contact and the second contact is a leftmost contact on the touch-sensitive surface; determining which contact of the first contact and the second contact is a rightmost contact on the touch-sensitive surface; and, while continuing to detect the first contact and the second contact on the touch-sensitive surface: detecting movement of the first contact across the touch-sensitive surface; and concurrently moving on the display two edges of the user interface object that correspond to the first contact in accordance with the detected movement of the first contact, including horizontally moving one of the two edges and vertically moving the other of the two edges.

In accordance with some embodiments, a computing device includes a touch-sensitive surface, a display, one or more processors, memory, and one or more programs. The one or more programs are stored in the memory and configured to be executed by the one or more processors. The one or more programs include instructions for: displaying a user interface object on the display, wherein the user interface object has four edges comprising a top edge, a bottom edge, a left edge, and a right edge; detecting a first contact and a second contact concurrently on the touch-sensitive surface; determining which contact of the first contact and the second contact is a topmost contact on the touch-sensitive surface; determining which contact of the first contact and the second contact is a bottommost contact on the touch-sensitive surface; determining which contact of the first contact and the second contact is a leftmost contact on the touch-sensitive surface; determining which contact of the first contact and the second contact is a rightmost contact on the touch-sensitive surface; and, while continuing to detect the first contact and the second contact on the touch-sensitive surface: detecting movement of the first contact across the touch-sensitive surface; and concurrently moving on the display two edges of the user interface object that correspond to the first contact in accordance with the detected movement of the first contact, including horizontally moving one of the two edges and vertically moving the other of the two edges.

In accordance with some embodiments, a computer readable storage medium has stored therein instructions which when executed by a computing device with a touch-sensitive surface and a display, cause the device to: display a user interface object on the display, wherein the user interface object has four edges comprising a top edge, a bottom edge, a left edge, and a right edge; detect a first contact and a second contact concurrently on the touch-sensitive surface; determine which contact of the first contact and the second contact is a topmost contact on the touch-sensitive surface; determine which contact of the first contact and the second contact is a bottommost contact on the touch-sensitive surface; determine which contact of the first contact and the second contact is a leftmost contact on the touch-sensitive surface; determine which contact of the first contact and the second contact is a rightmost contact on the touch-sensitive surface; and, while continuing to detect the first contact and the second contact on the touch-sensitive surface: detect movement of the first contact across the touch-sensitive surface; and concurrently move on the display two edges of the user interface object that correspond to the first contact in accordance with the detected movement of the first contact, including horizontally moving one of the two edges and vertically moving the other of the two edges.

In accordance with some embodiments, a graphical user interface on a computing device with a touch-sensitive surface, a display, a memory, and one or more processors to execute one or more programs stored in the memory includes a user interface object. The user interface object has four edges comprising a top edge, a bottom edge, a left edge, and a right edge. A first contact and a second contact are detected concurrently on the touch-sensitive surface. Which contact of the first contact and the second contact is a topmost contact on the touch-sensitive surface is determined. Which contact of the first contact and the second contact is a bottommost contact on the touch-sensitive surface is determined. Which contact of the first contact and the second contact is a leftmost contact on the touch-sensitive surface is determined. Which contact of the first contact and the second contact is a rightmost contact on the touch-sensitive surface is determined. While continuing to detect the first contact and the second contact on the touch-sensitive surface: movement of the first contact across the touch-sensitive surface is detected; and two edges of the user interface object that correspond to the first contact are moved concurrently on the display in accordance with the detected movement of the first contact, including horizontally moving one of the two edges and vertically moving the other of the two edges.

In accordance with some embodiments, a computing device includes: a touch-sensitive surface; a display; means for displaying a user interface object on the display, wherein the user interface object has four edges comprising a top edge, a bottom edge, a left edge, and a right edge; means for detecting a first contact and a second contact concurrently on the touch-sensitive surface; means for determining which contact of the first contact and the second contact is a topmost contact on the touch-sensitive surface; means for determining which contact of the first contact and the second contact is a bottommost contact on the touch-sensitive surface; means for determining which contact of the first contact and the second contact is a leftmost contact on the touch-sensitive surface; means for determining which contact of the first contact and the second contact is a rightmost contact on the touch-sensitive surface; and, while continuing to detect the first contact and the second contact on the touch-sensitive surface: means for detecting movement of the first contact across the touch-sensitive surface; and means for concurrently moving on the display two edges of the user interface object that correspond to the first contact in accordance with the detected movement of the first contact, including horizontally moving one of the two edges and vertically moving the other of the two edges.

Thus, computing devices with touch-sensitive surfaces are provided with faster, more efficient methods and interfaces for manipulating on-screen objects, thereby increasing the effectiveness, efficiency, and user satisfaction with such devices. Such methods and interfaces may complement or replace conventional methods for manipulating on-screen objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7F are flow diagrams illustrating a method of manipulating a digital image and a cropping mask in accordance with some embodiments.

FIGS. 8A-8D are flow diagrams illustrating a method of manipulating a cropping mask in accordance with some embodiments.

FIGS. 9A-9E are flow diagrams illustrating a method of manipulating a digital image and a cropping mask in accordance with some embodiments.

DESCRIPTION OF EMBODIMENTS

Figure 1A:
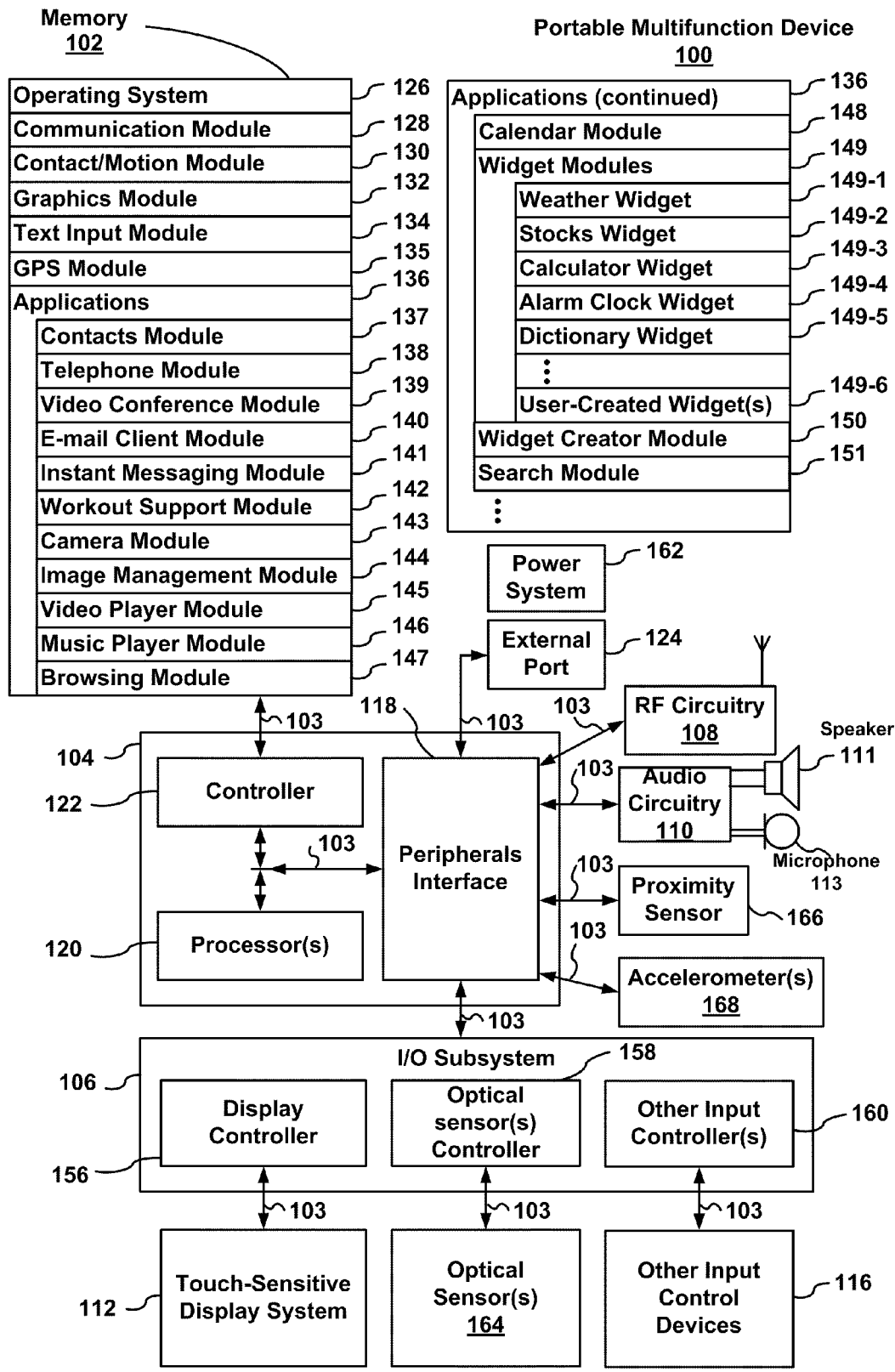
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Computer, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
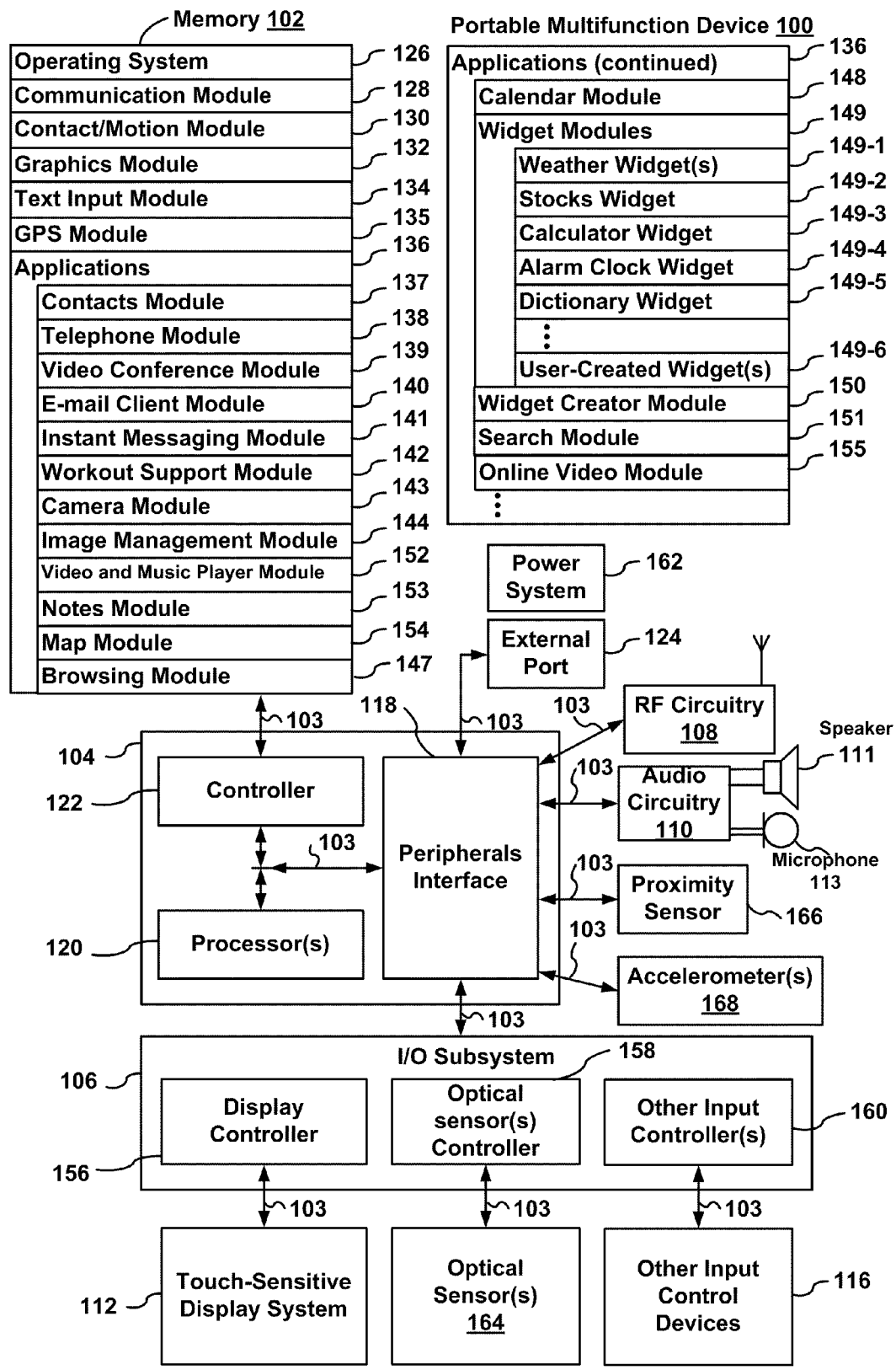

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch-sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch-sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
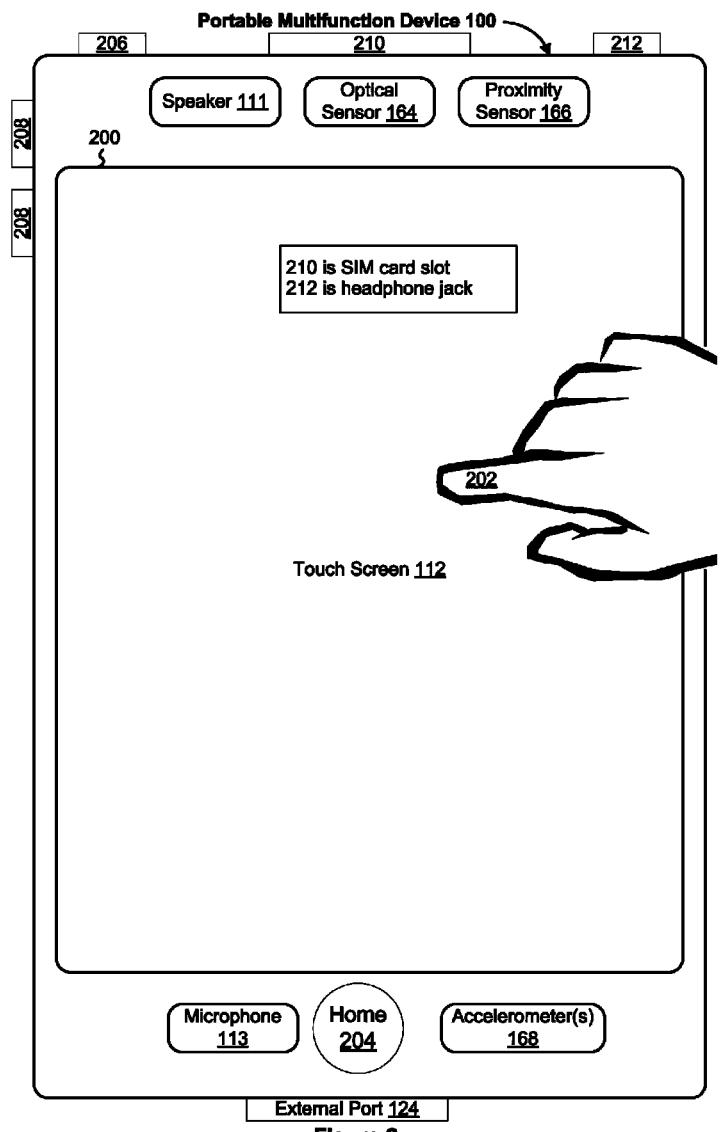
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
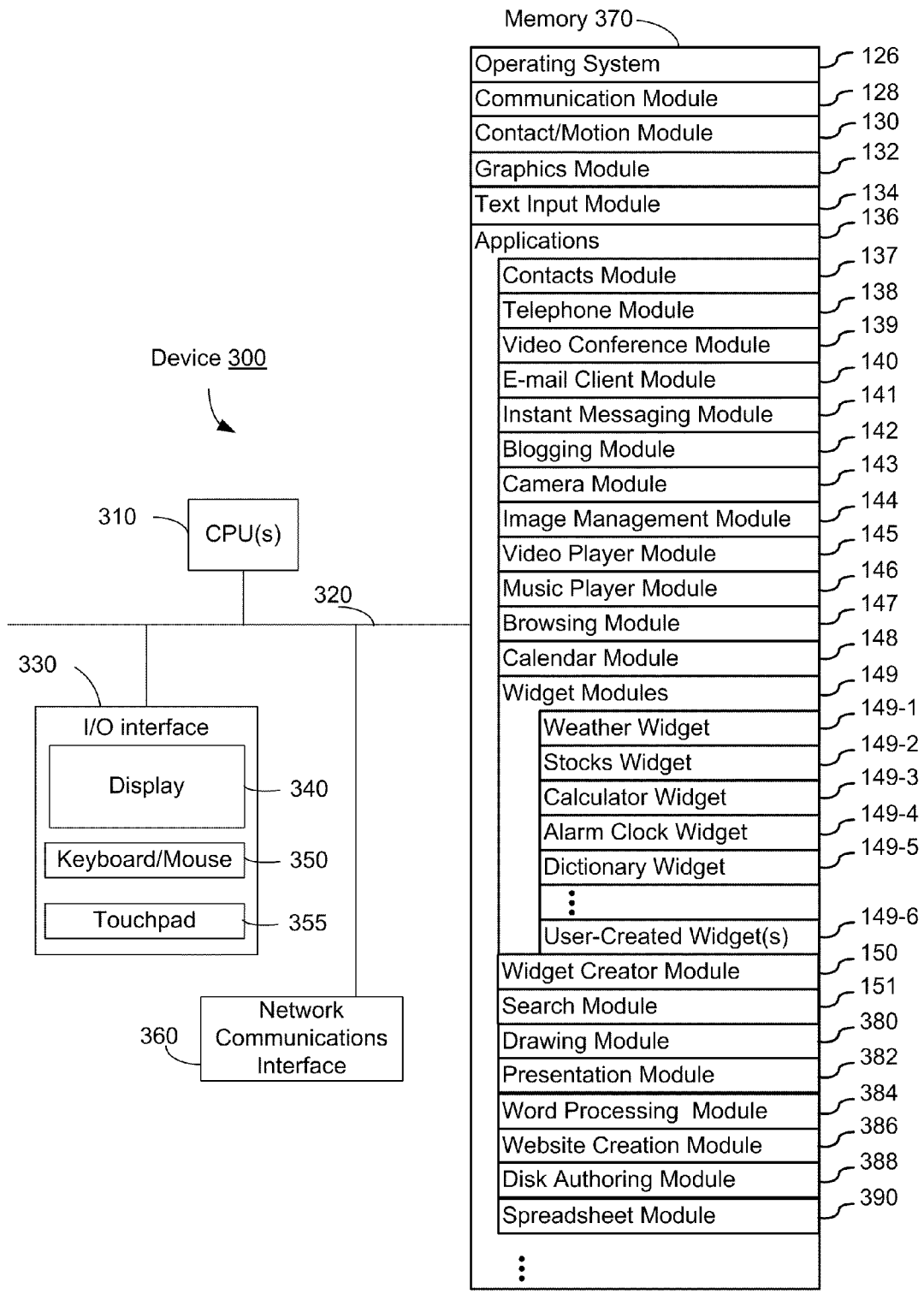
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes a input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
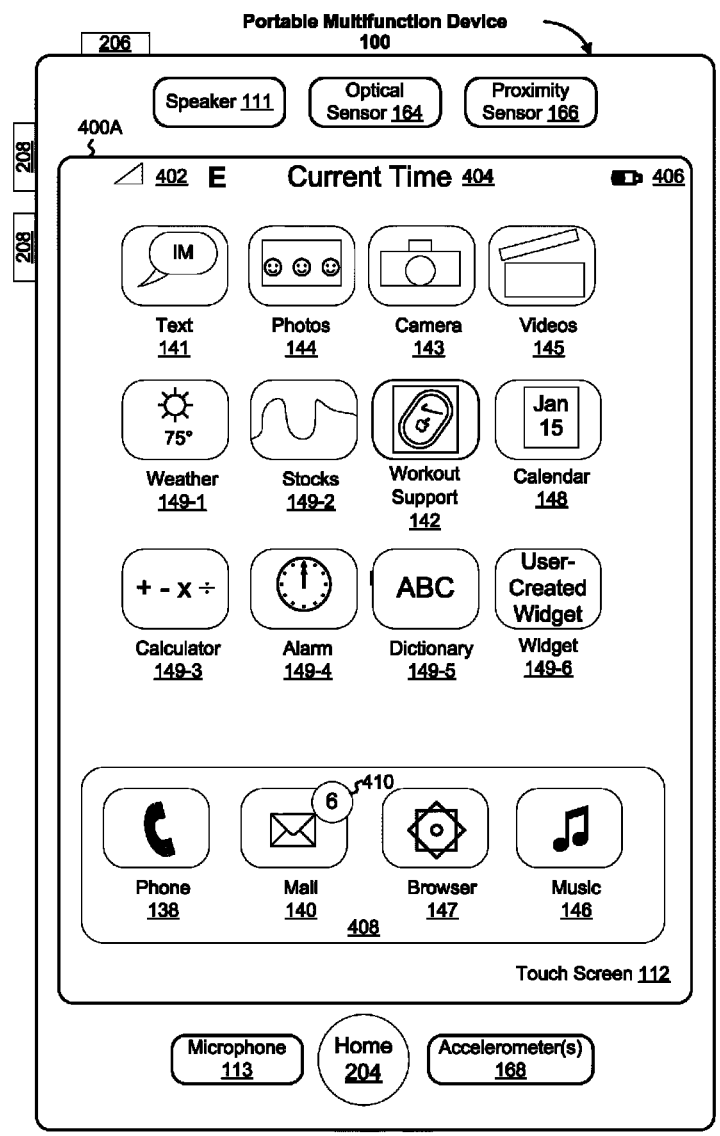
FIGS. 4A and 4B illustrate exemplary user interfaces for a menu of applications on a portable multifunction device in accordance with some embodiments.
Figure 4B:
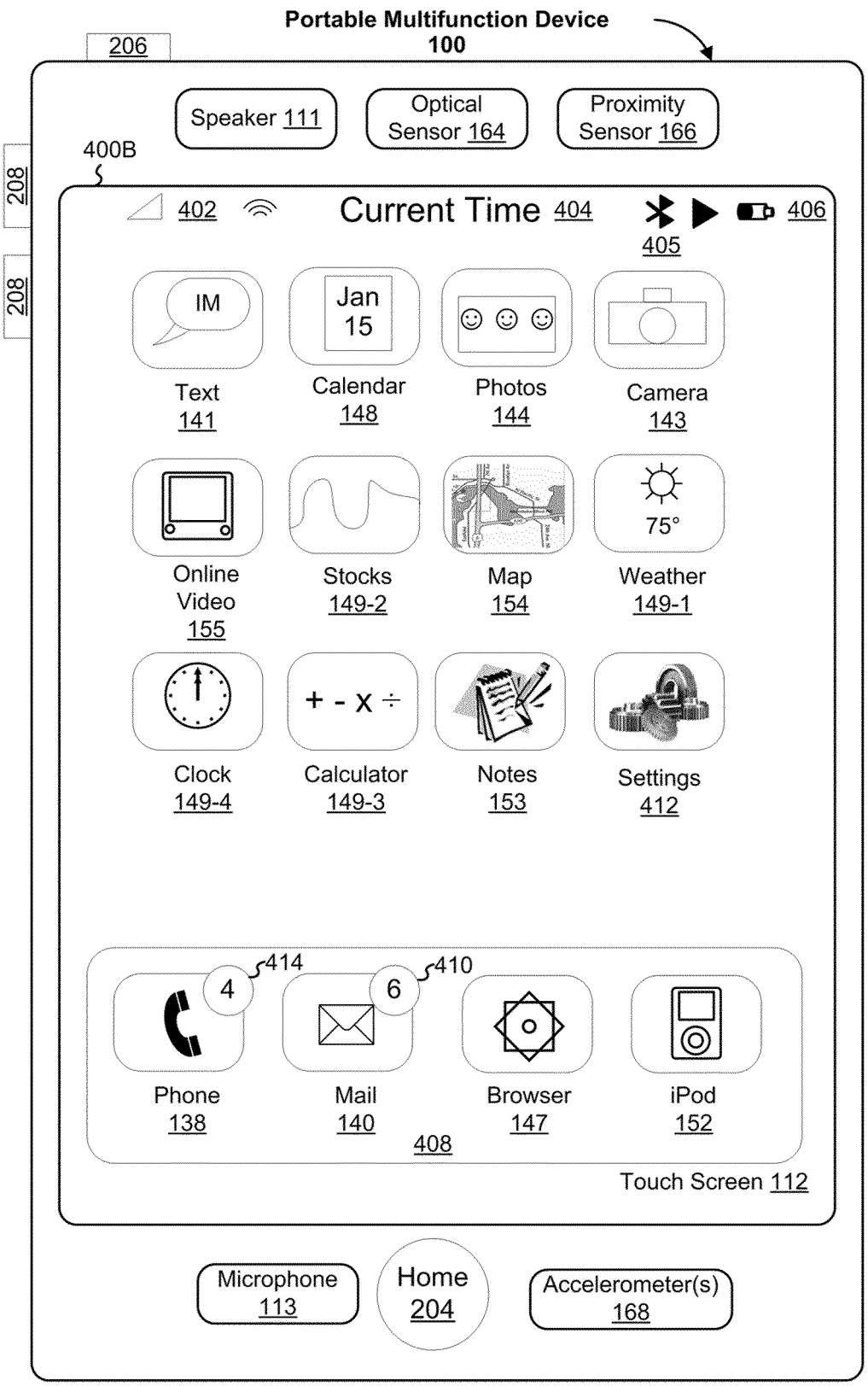

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple Computer, Inc.) module 152; and
Online video module 155, also referred to as YouTube (trademark of Google, Inc.) module 155.

Attention is now directed towards embodiments of user interfaces ("UI") and associated processes that may be implemented on a computing device with a display and a touch-sensitive surface, such as device 300 or portable multifunction device 100.

FIGS. 5A-5K illustrate exemplary user interfaces for manipulating a digital image and a cropping mask rectangle on a computing device with a display and a touch-sensitive surface in accordance with some embodiments. The user interfaces in these figures are used to illustrate the processes described below with respect to FIGS. 6A-6E, 7A-7F, 8A-8D, and 9A-9E.

Figure 5A:
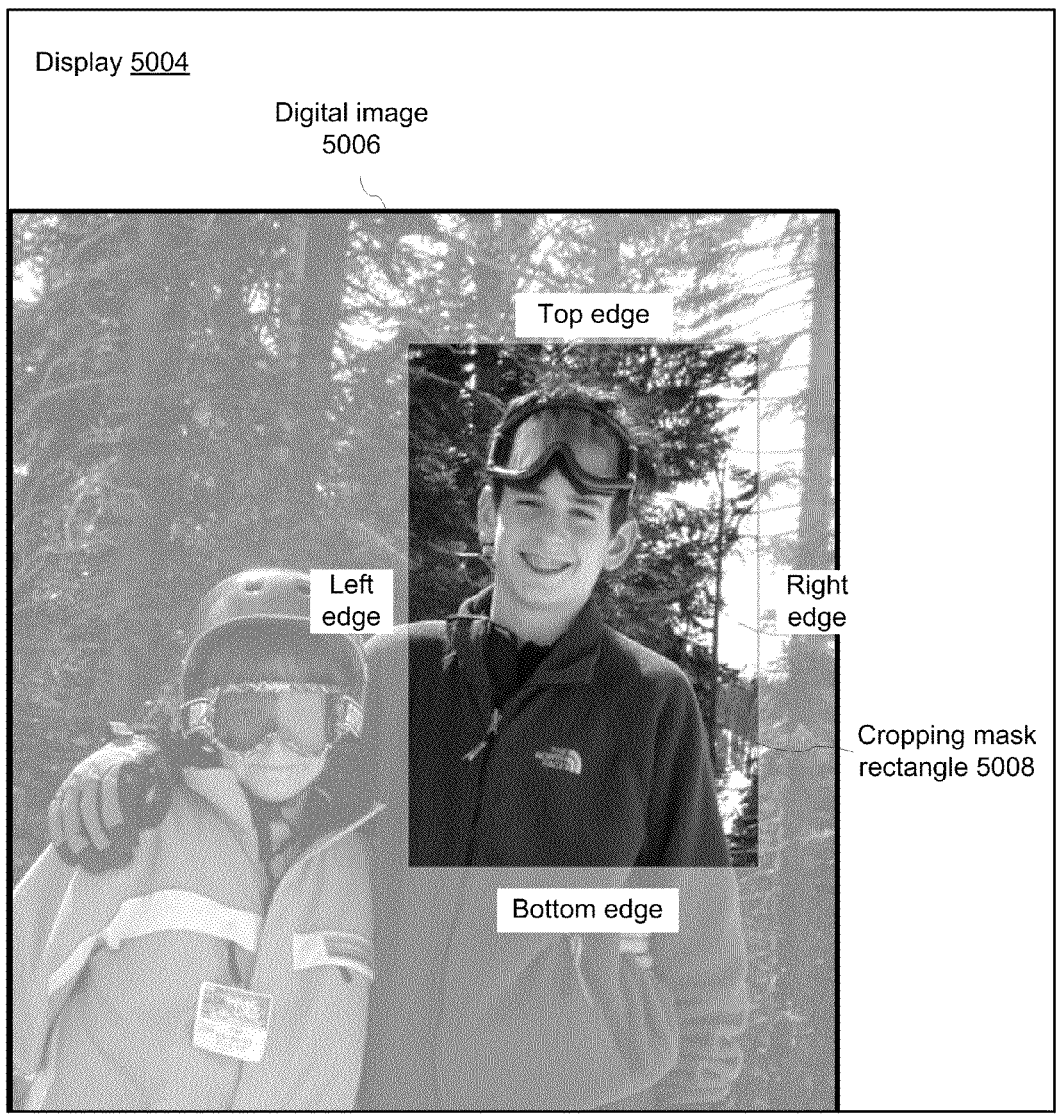
FIGS. 5A-5K illustrate exemplary user interfaces for manipulating a digital image and a cropping mask rectangle on a computing device with a display and a touch-sensitive surface in accordance with some embodiments.
Figure 5A:
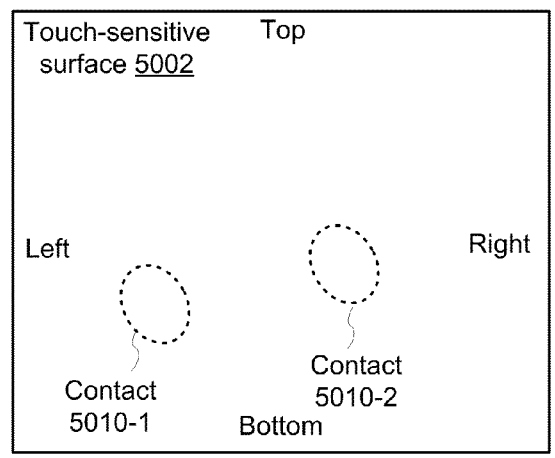
Figure 5B:
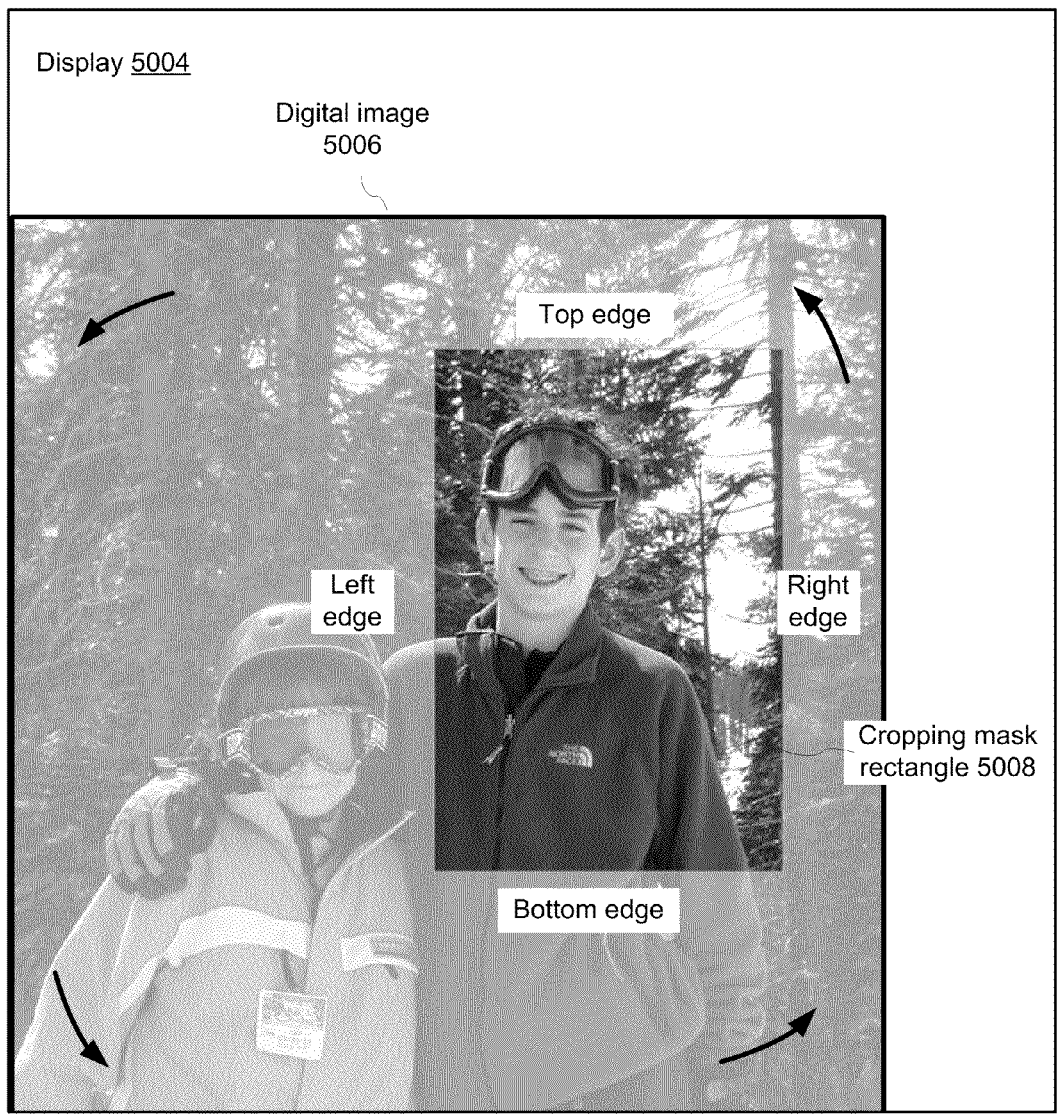
Figure 5B:
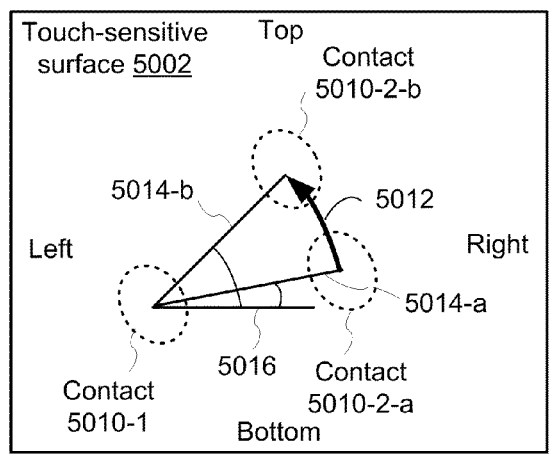
Figure 5C:
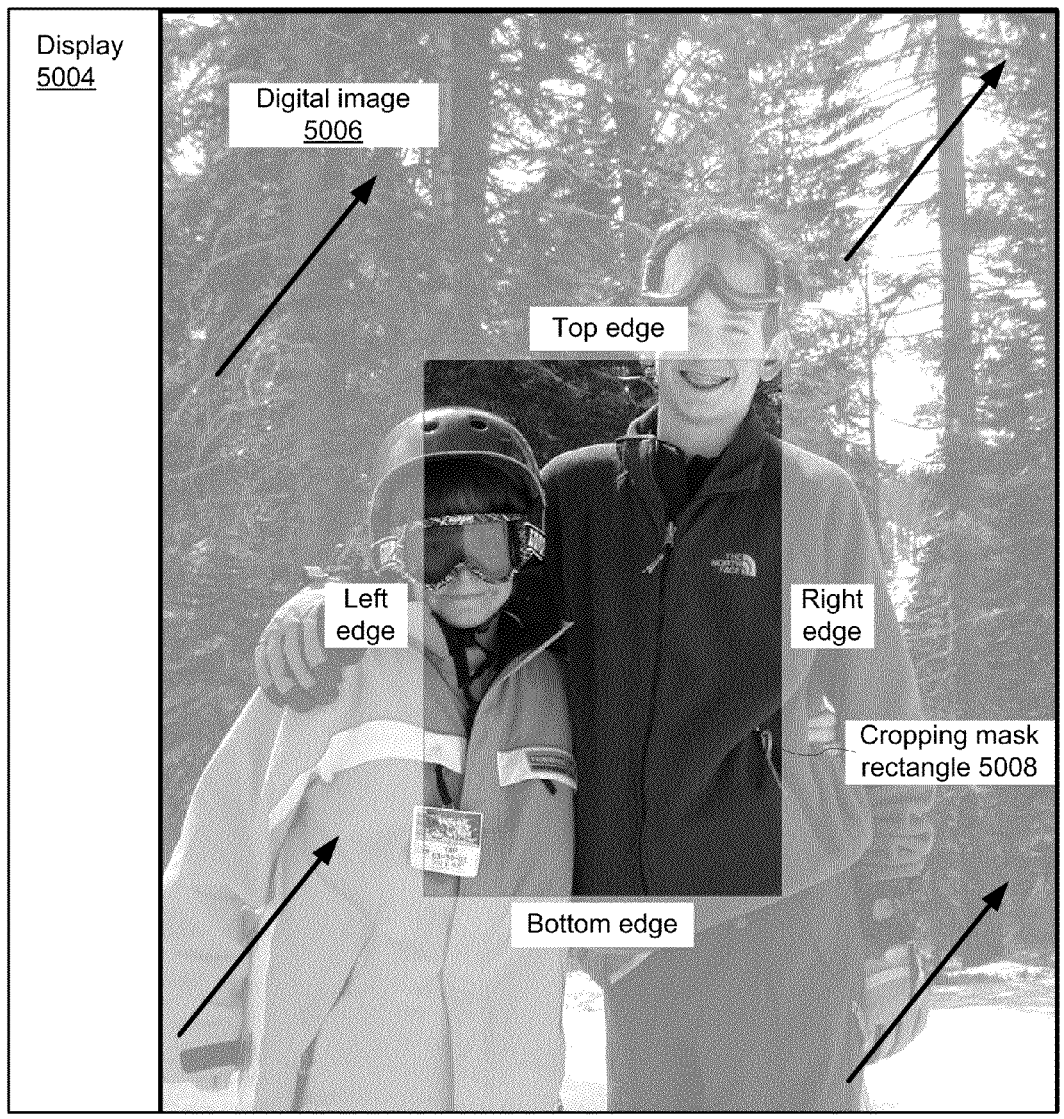
Figure 5C:
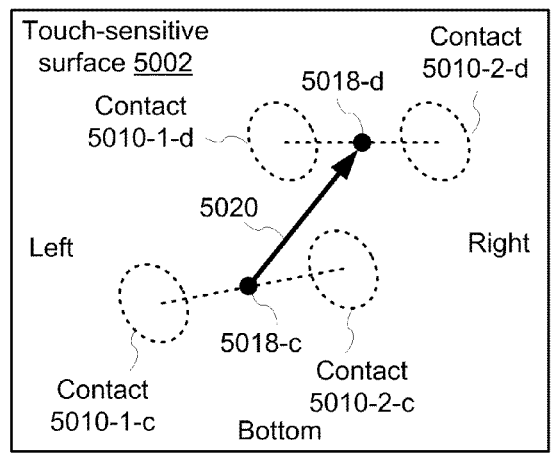
Figure 5D:
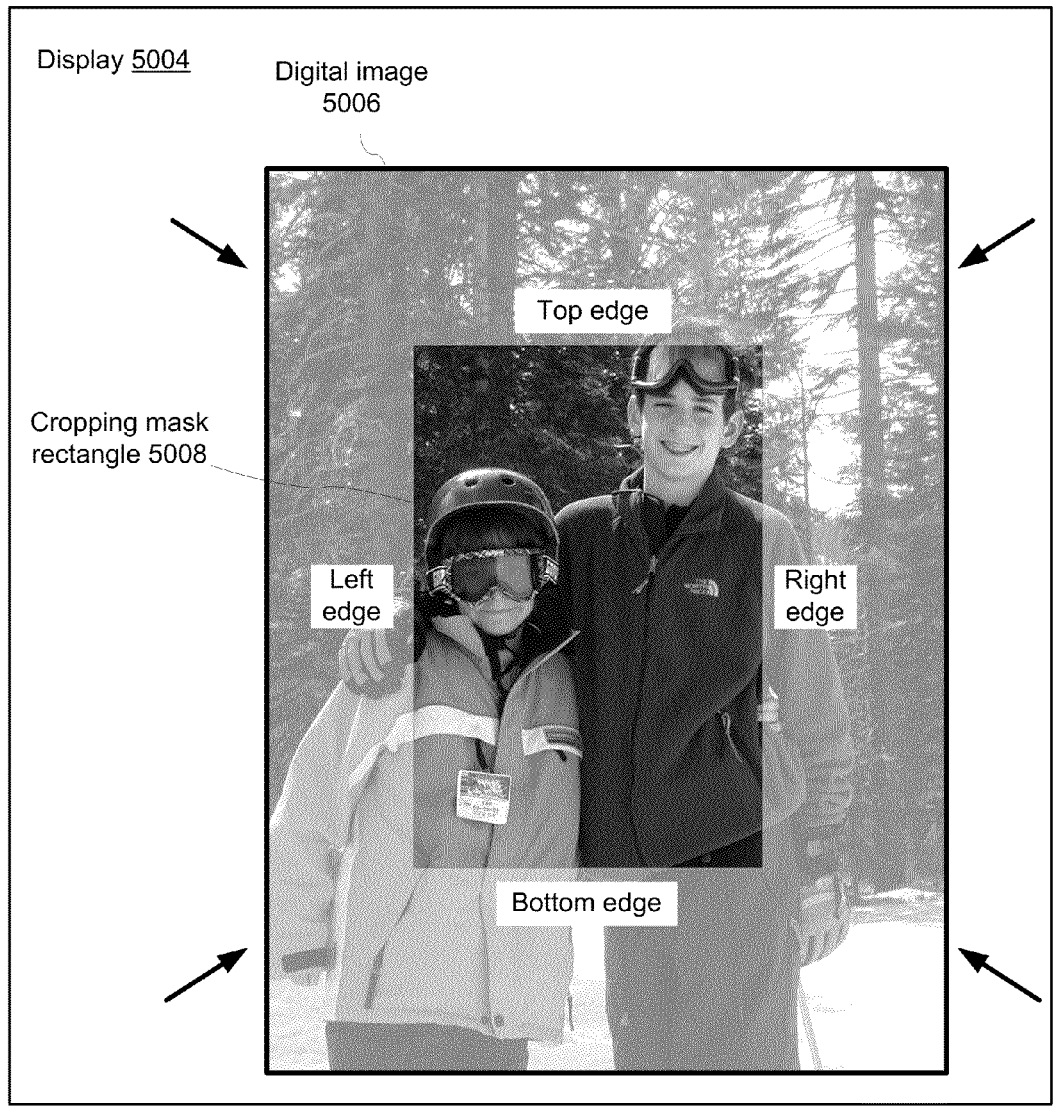
Figure 5D:
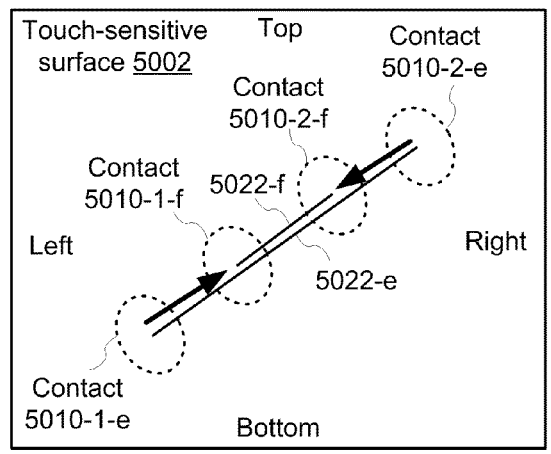

FIGS. 5A-5D illustrate user interfaces for manipulating a digital image 5006. FIG. 5B illustrates rotating the digital image in response to detecting rotation of simultaneous contacts 5010-1 and 5010-2 on the touch-sensitive surface 5002. FIG. 5C illustrates translating the digital image in response to detecting translation of simultaneous contacts 5010-1 and 5010-2 on the touch-sensitive surface 5002. FIG. 5D illustrates shrinking the digital image in response to detecting depinching of simultaneous contacts 5010-1 and 5010-2 on the touch-sensitive surface 5002.

Figure 5E:
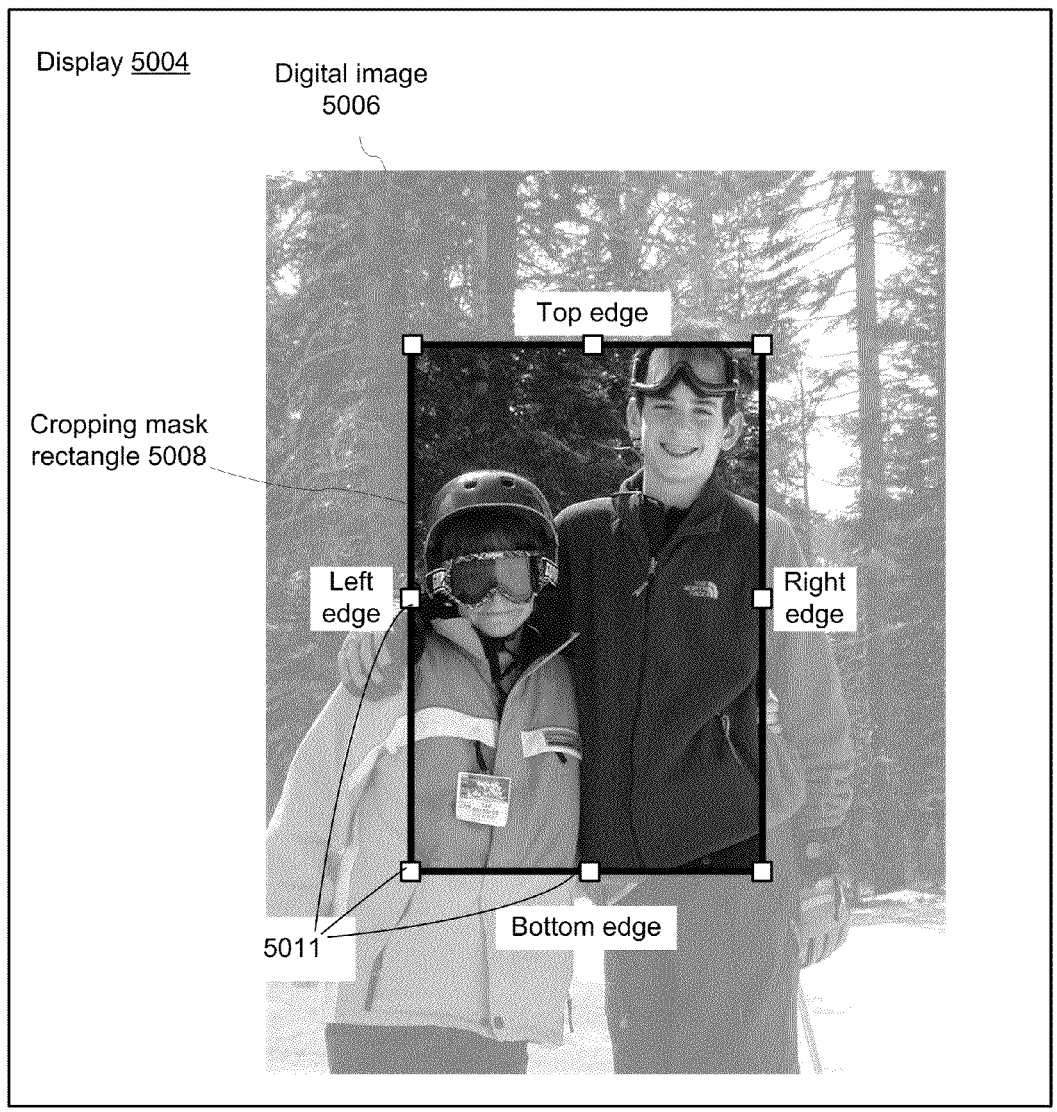
Figure 5E:
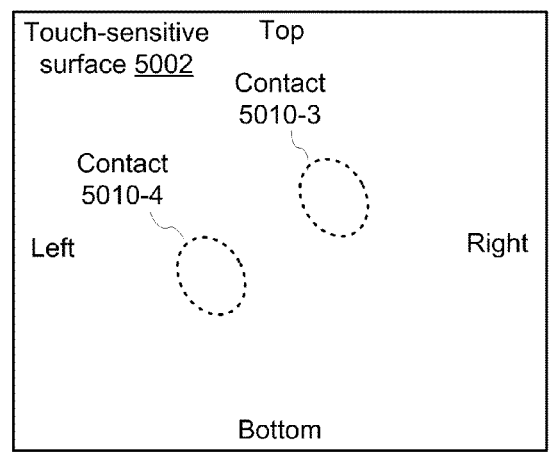
Figure 5F:
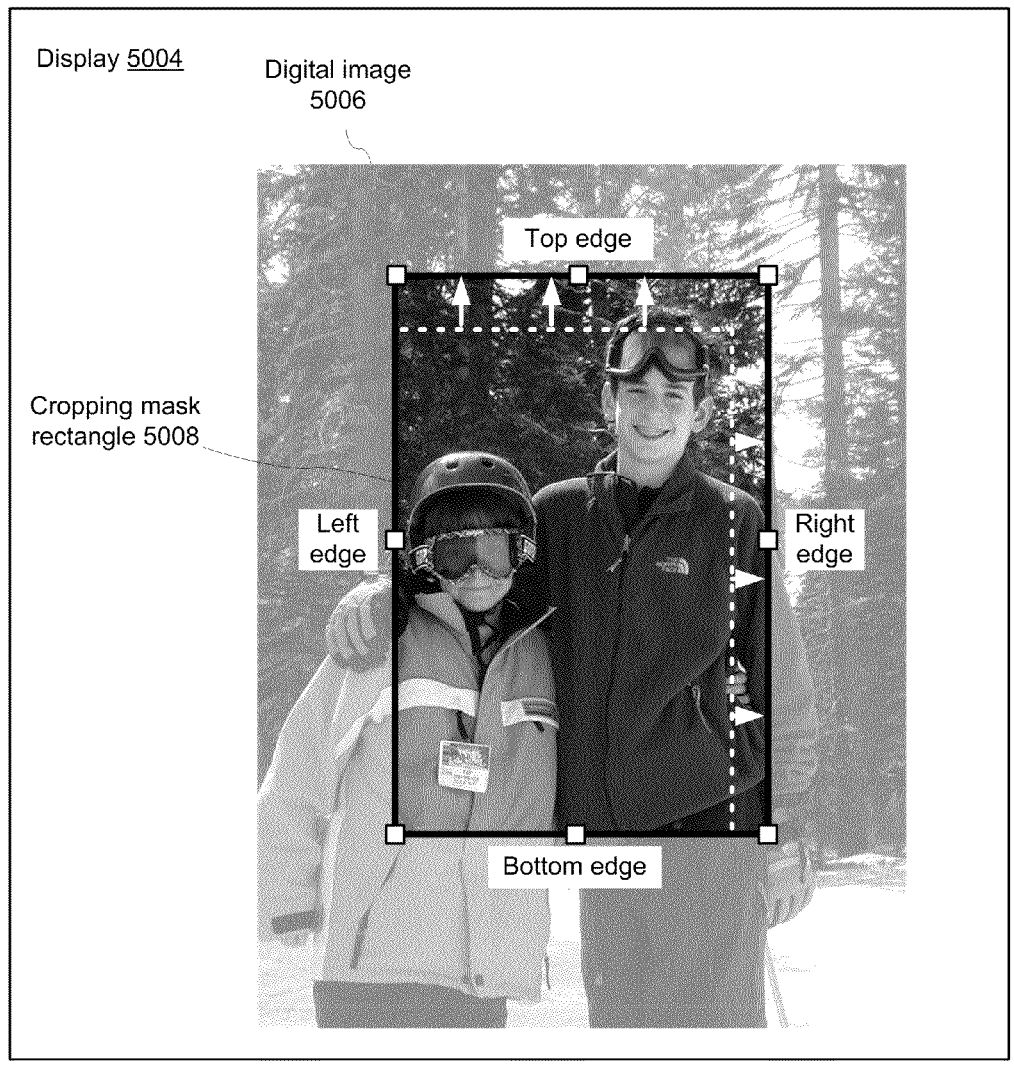
Figure 5F:
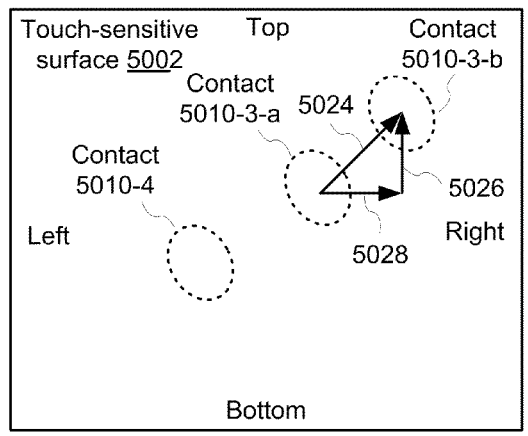

FIGS. 5E-5I illustrate user interfaces for manipulating a cropping mask rectangle 5008 for the digital image 5006. FIG. 5F illustrates concurrently moving two edges of the cropping mask rectangle 5008 that correspond to one of two simultaneous contacts in accordance with the detected movement of the contact (contact 5010-3), including horizontally moving one of the two edges and vertically moving the other of the two edges.

Figure 5G:
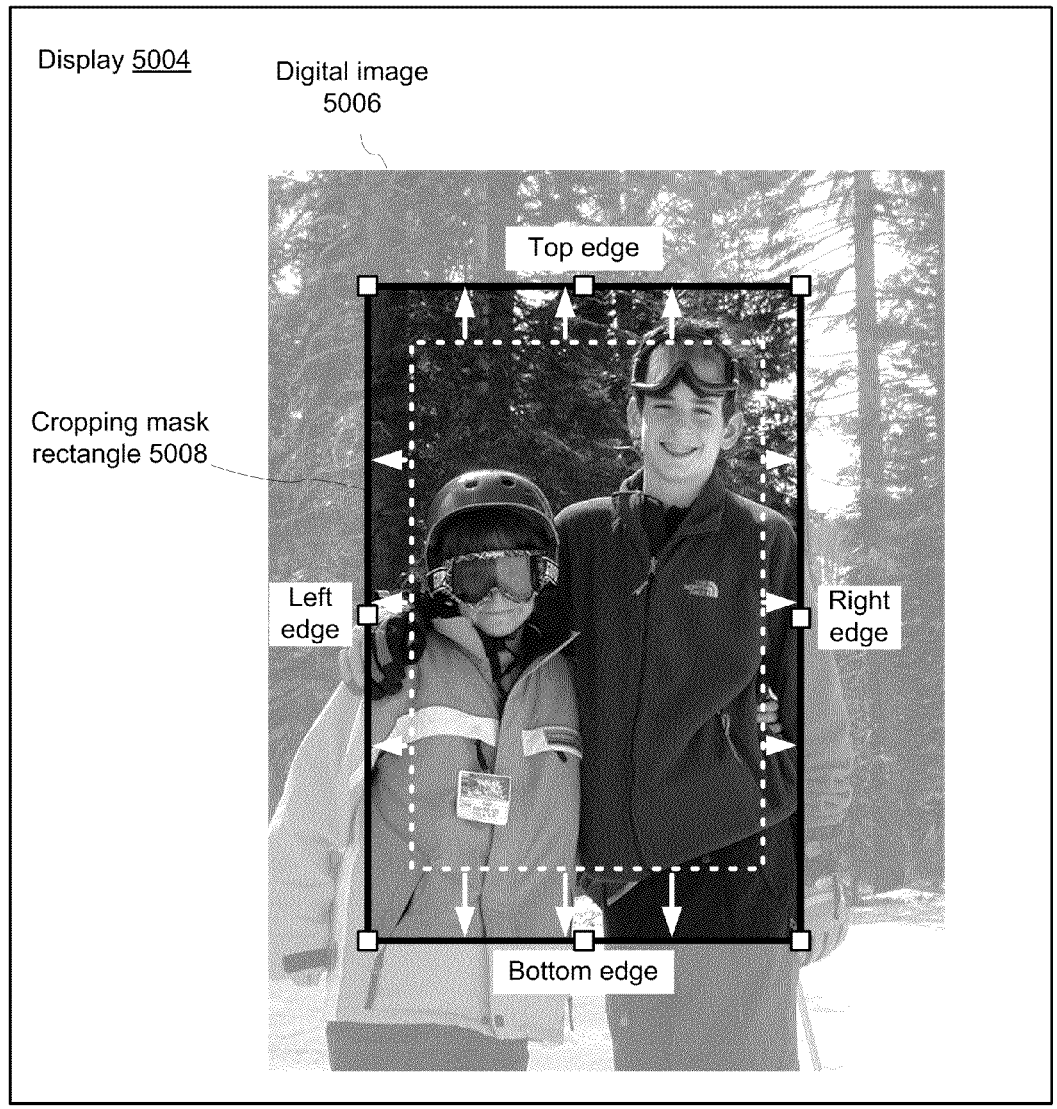
Figure 5G:
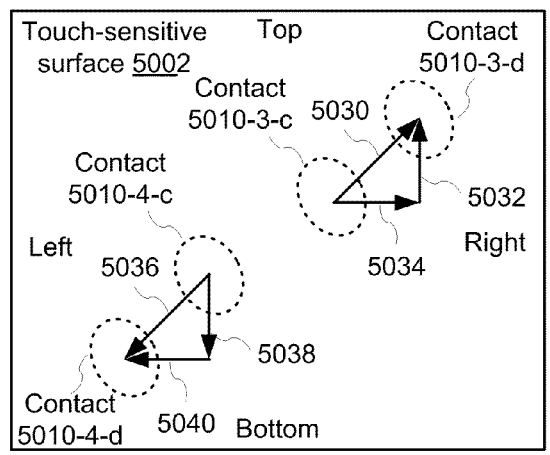

FIG. 5G illustrates concurrently moving respective edges of the cropping mask rectangle 5008 in accordance with the movements of respective contacts 5010-3 and 5010-4.

Figure 5H:
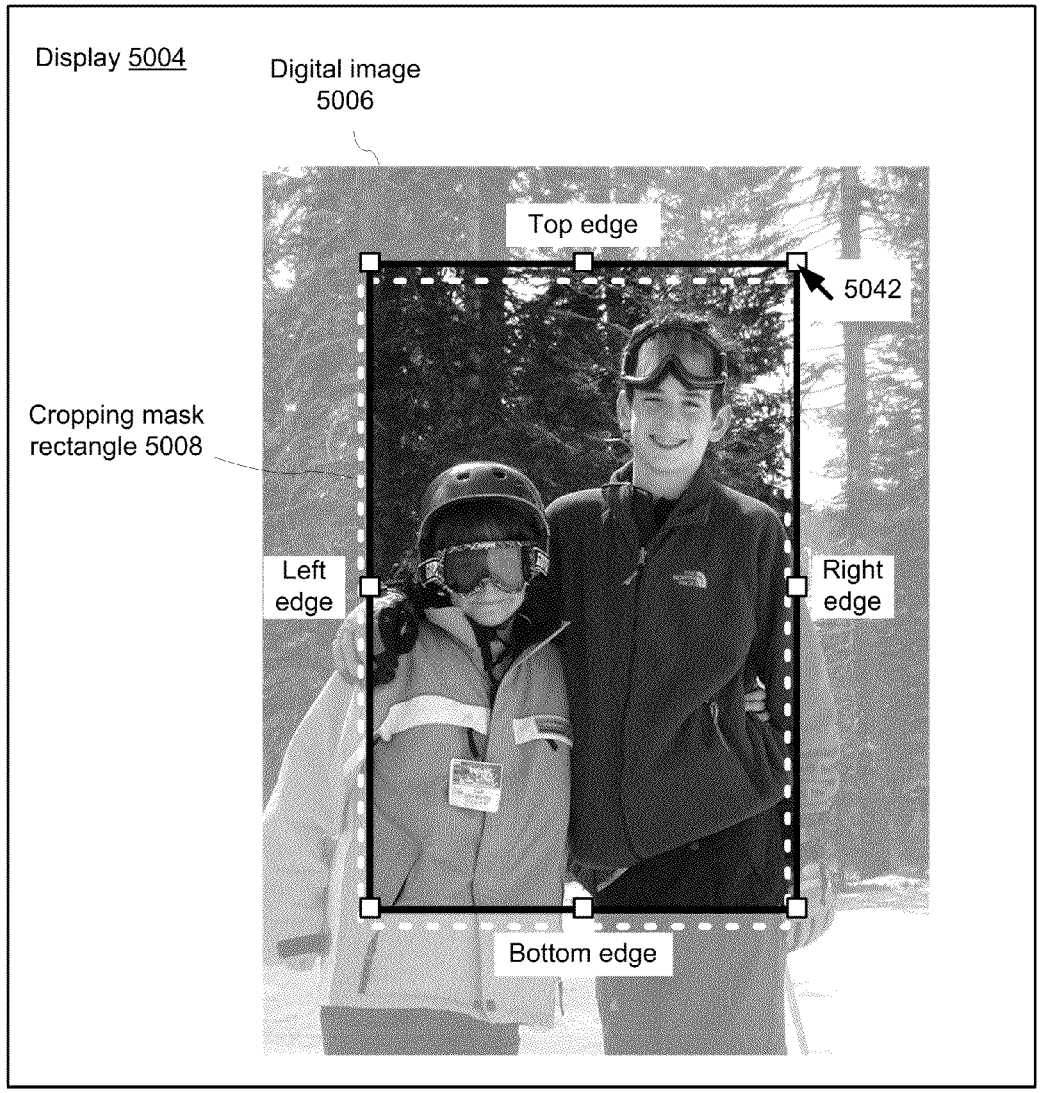
Figure 5H:
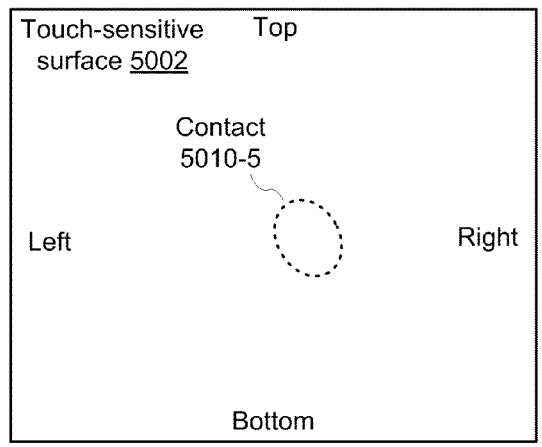

FIG. 5H illustrates using a complementary conventional method to adjust the size and location of the cropping mask rectangle.

Figure 5I:
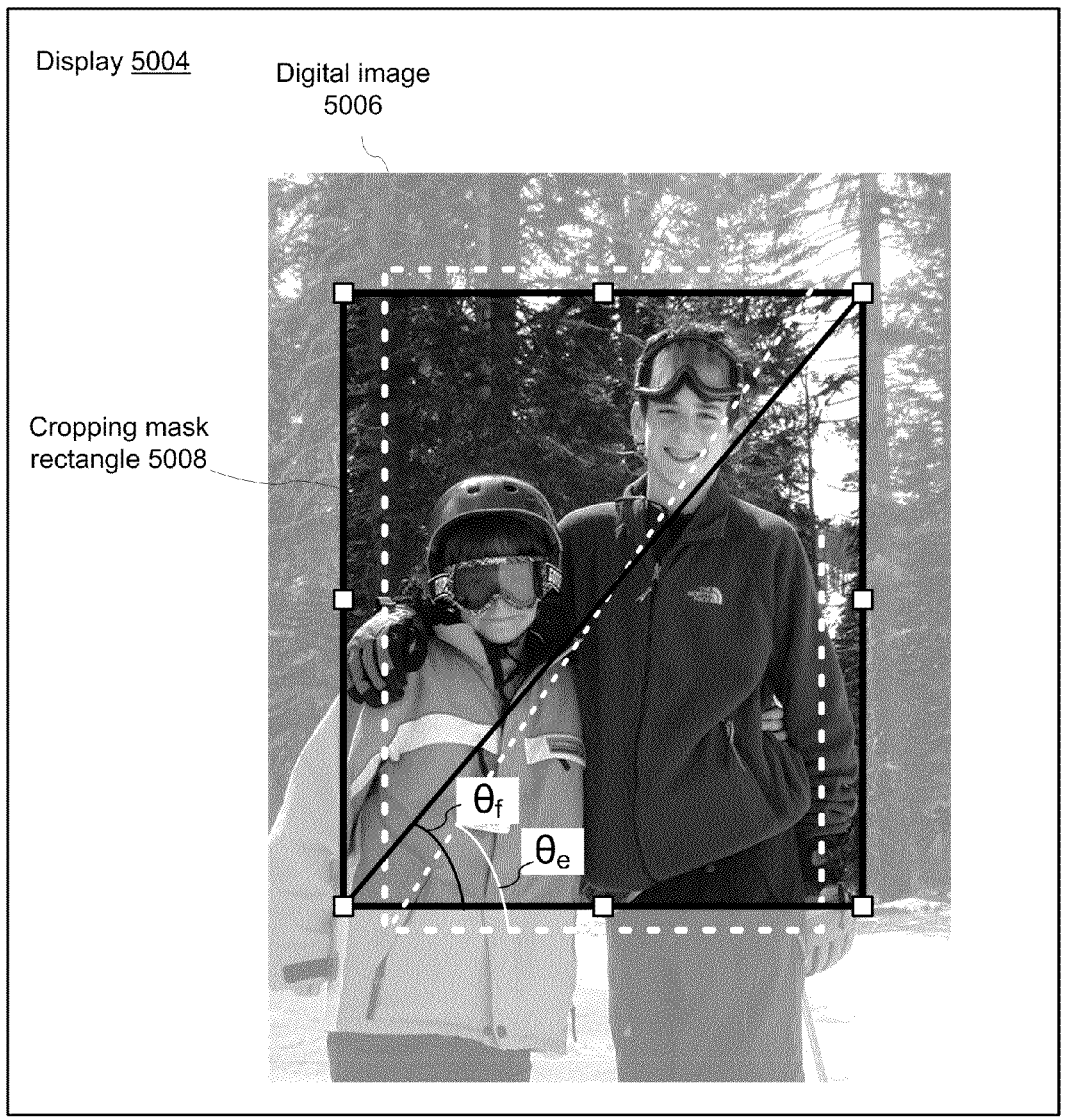
Figure 5I:
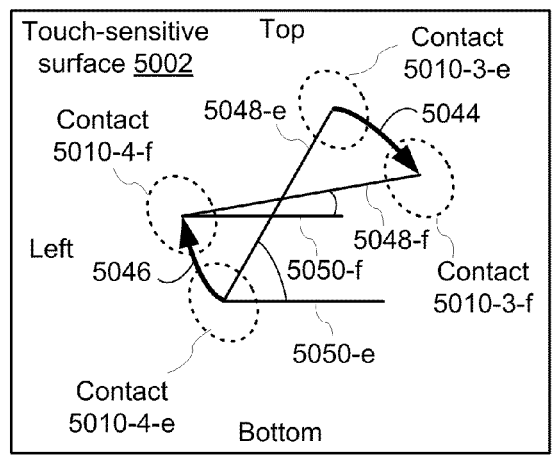

FIG. 5I illustrates changing the aspect ratio of the cropping mask rectangle in response to detecting rotation of simultaneous contacts 5010-3 and 5010-4 on the touch-sensitive surface 5002.

Figure 5J:
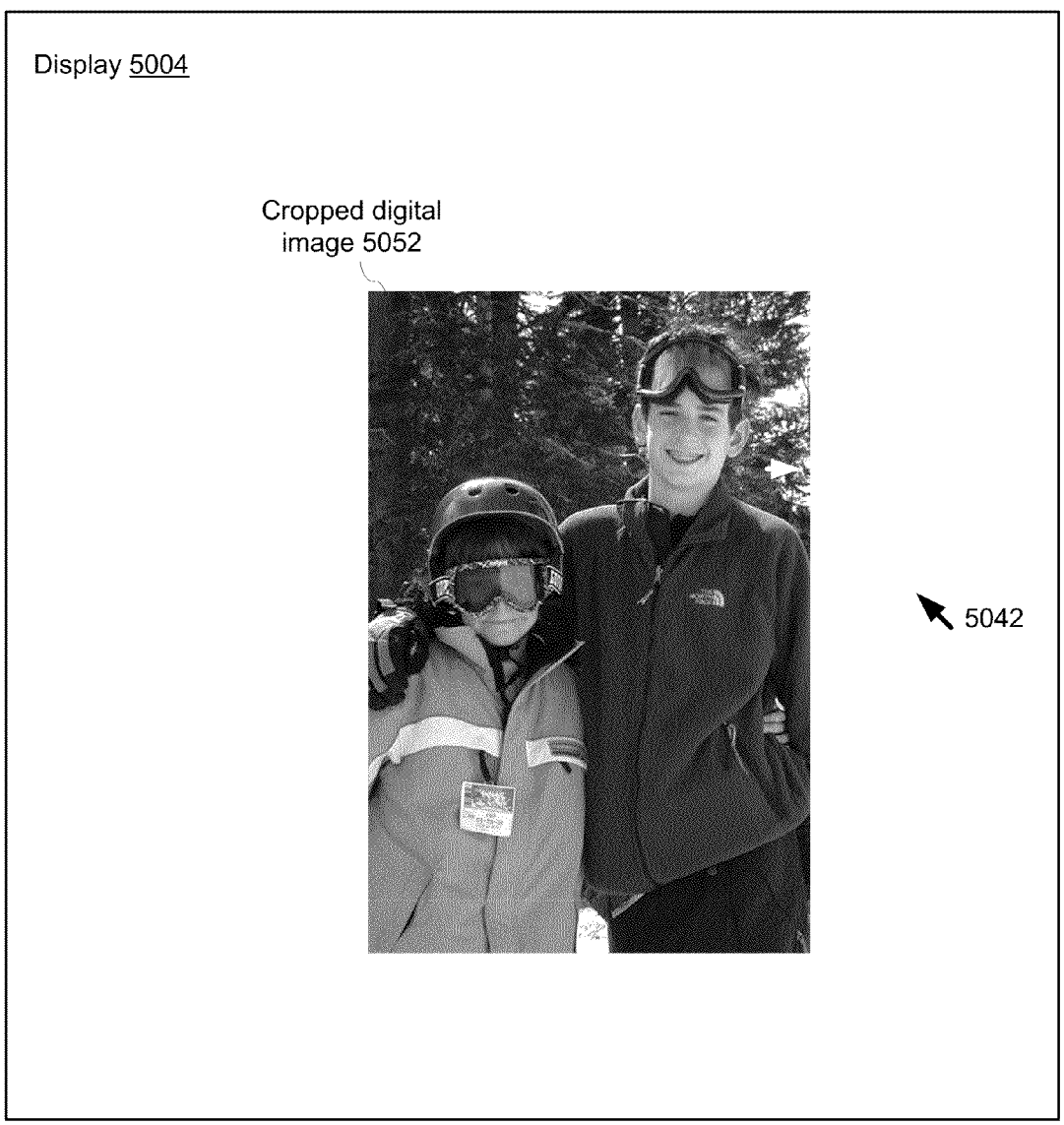
Figure 5J:
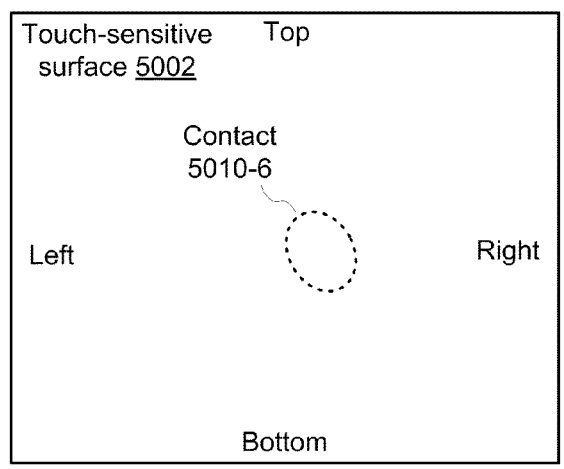
Figure 5K:
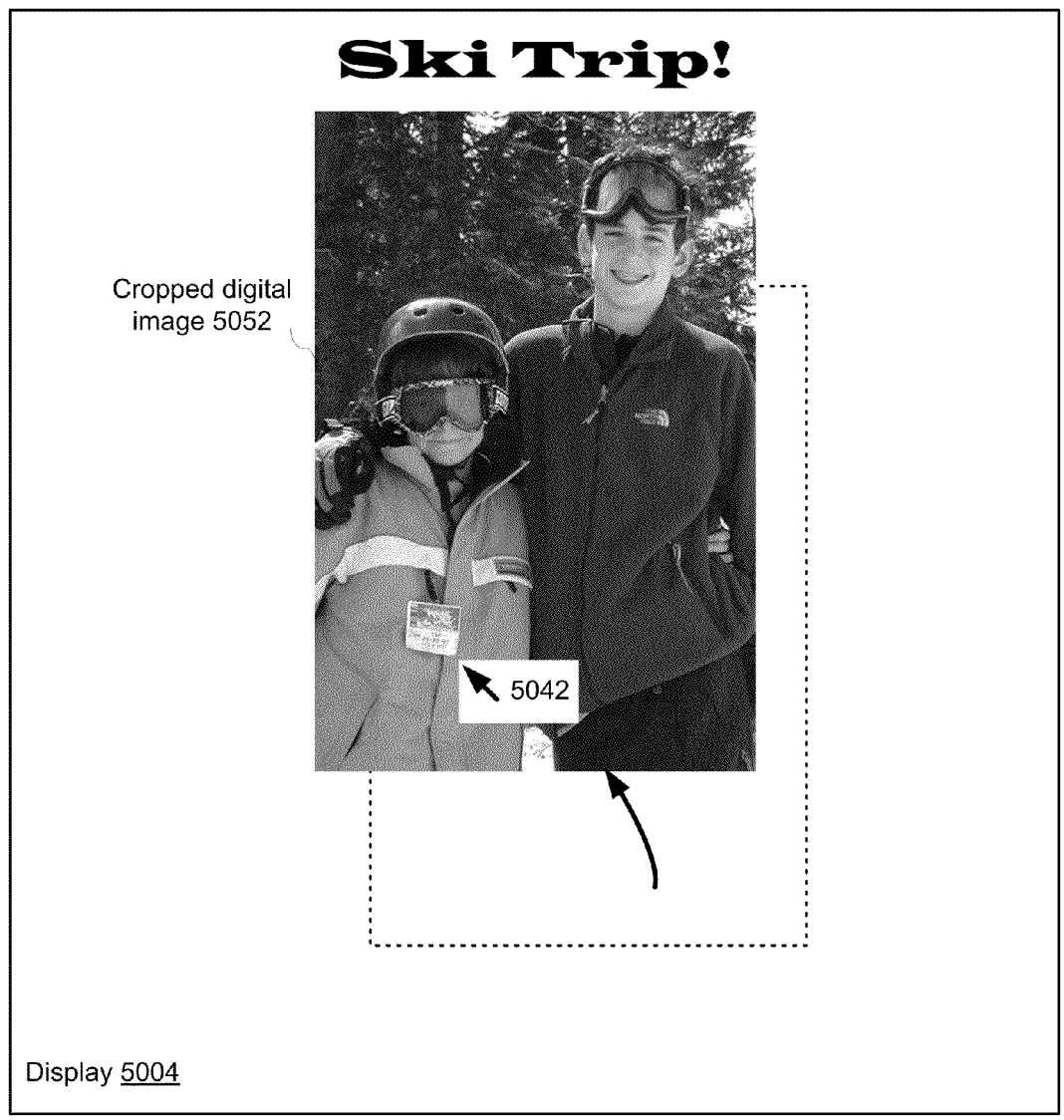
Figure 5K:
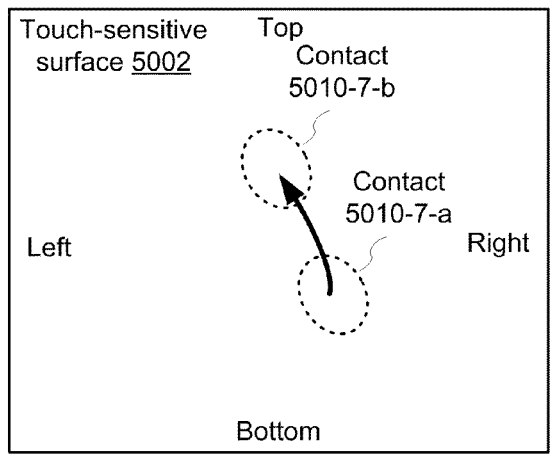
Figure 6A:
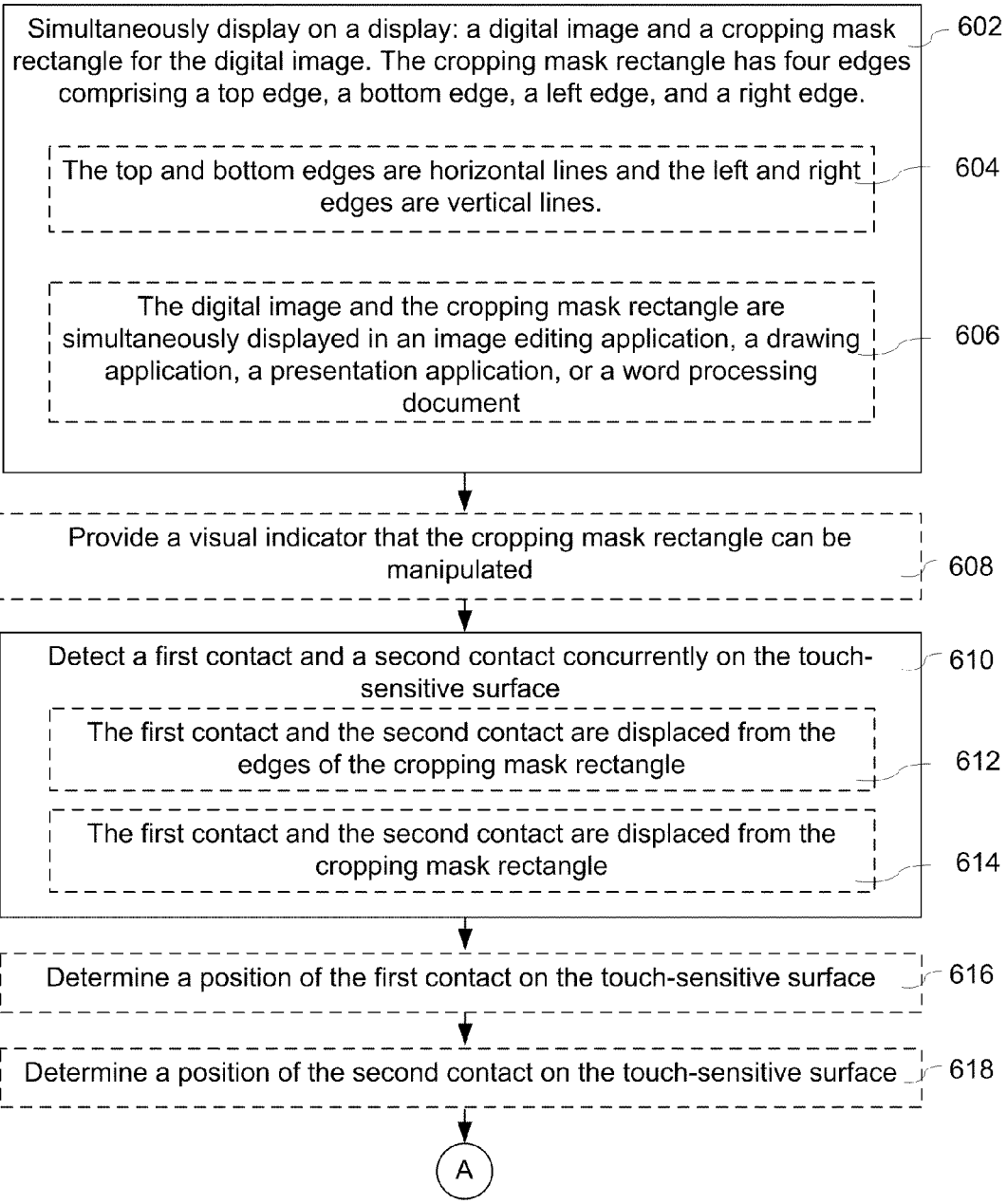
FIGS. 6A-6E are flow diagrams illustrating a method of manipulating a cropping mask in accordance with some embodiments.
Figure 6B:
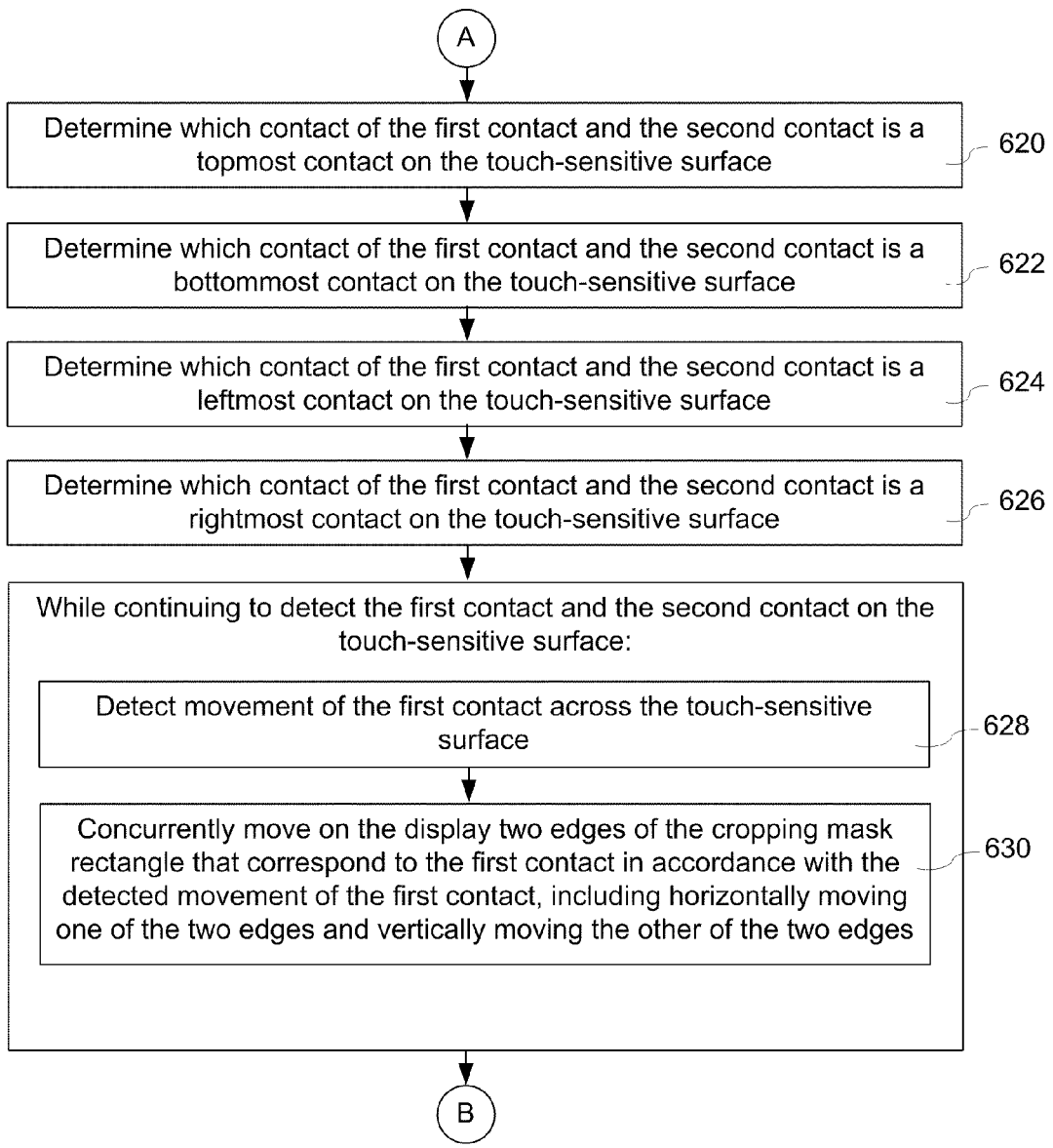
Figure 6C:
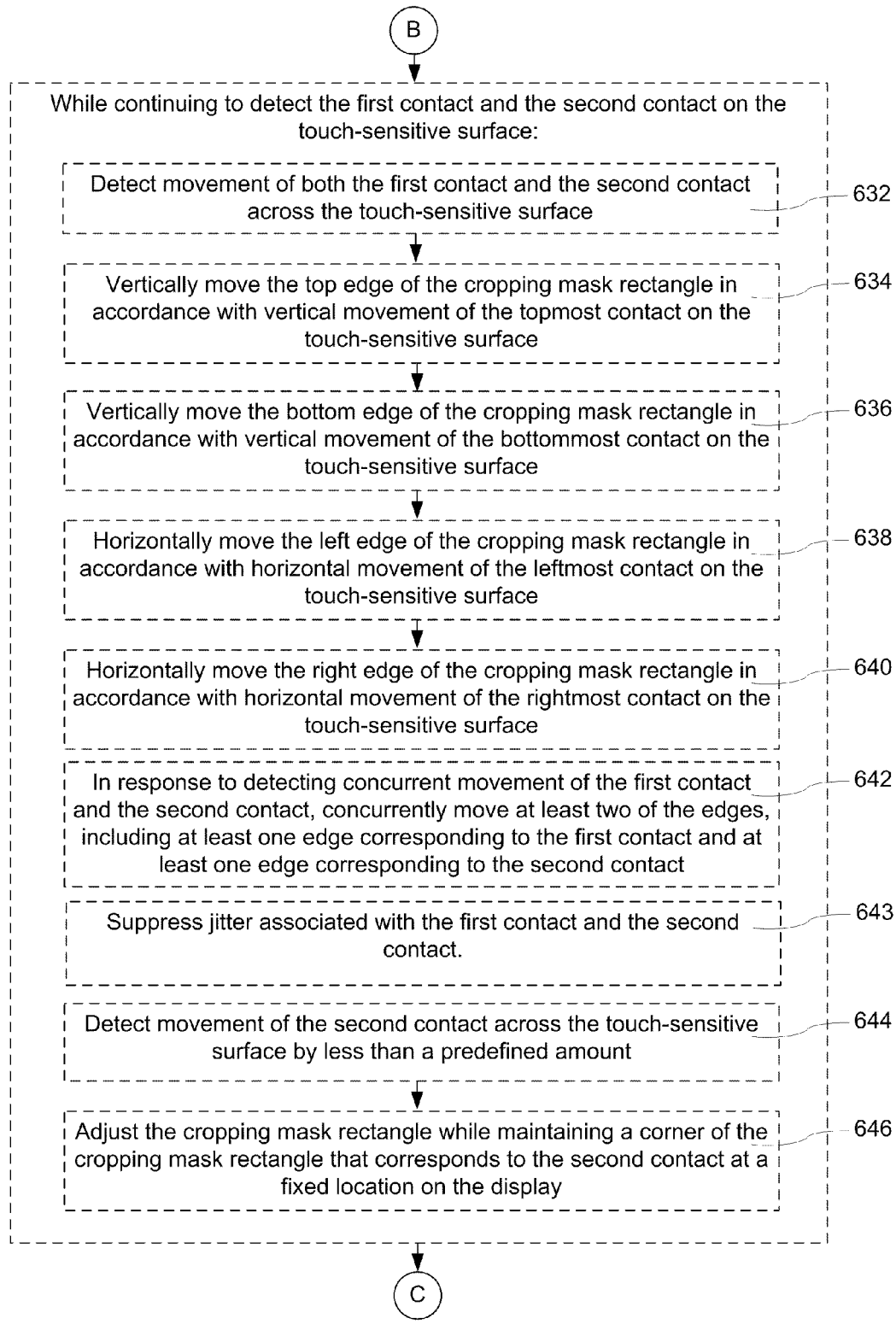
Figure 6D:
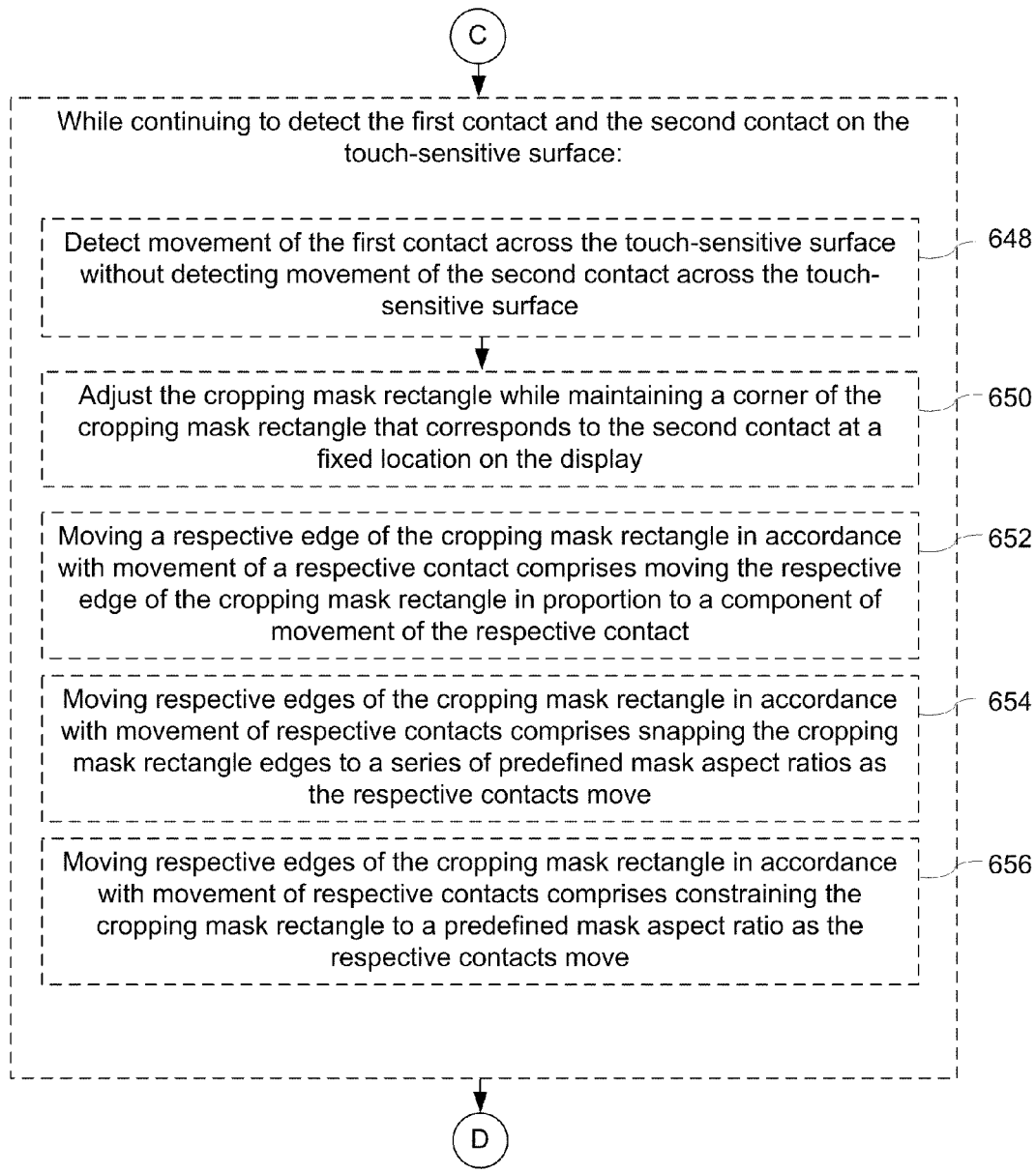
Figure 6E:
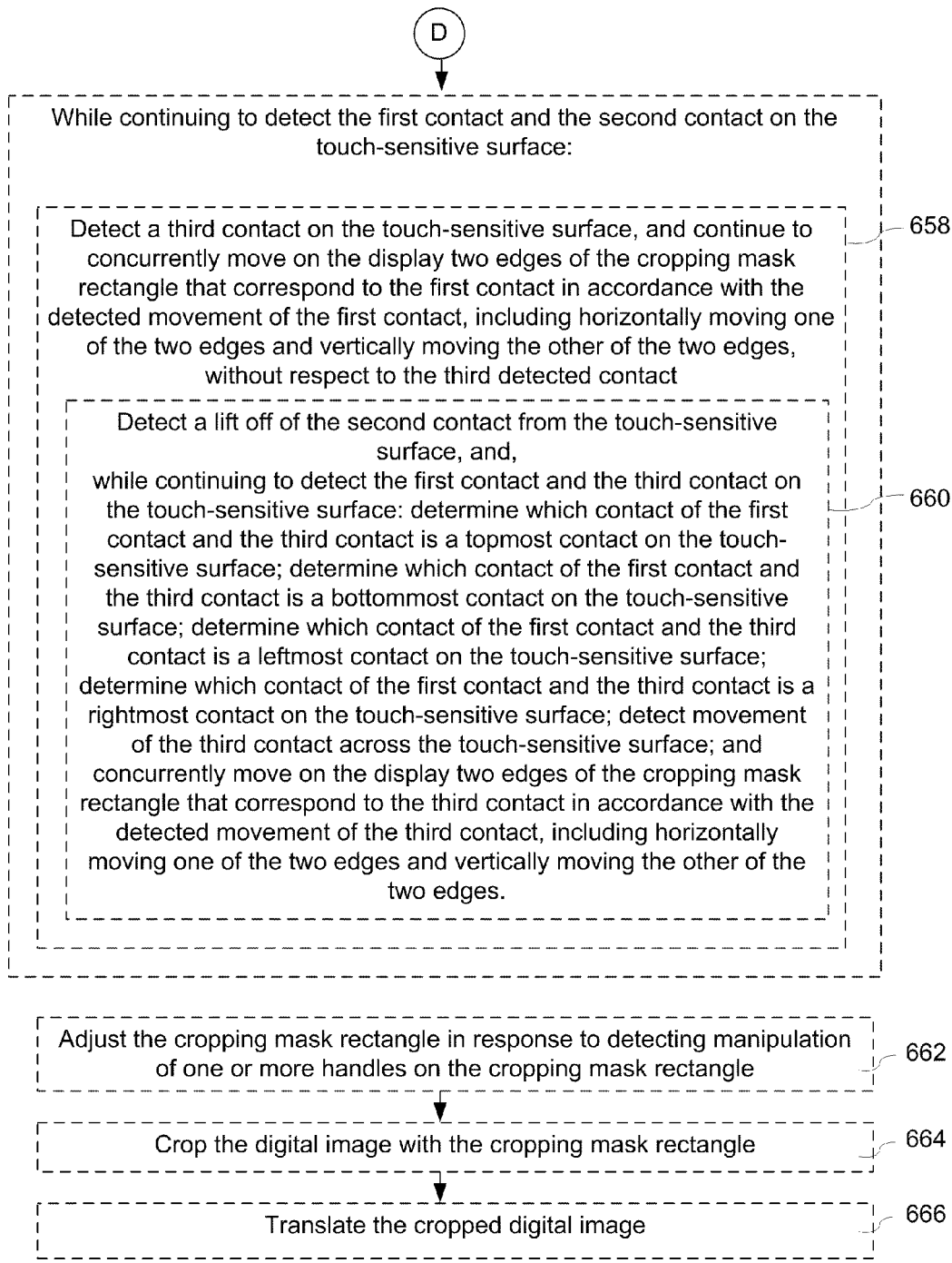
Figure 7B:
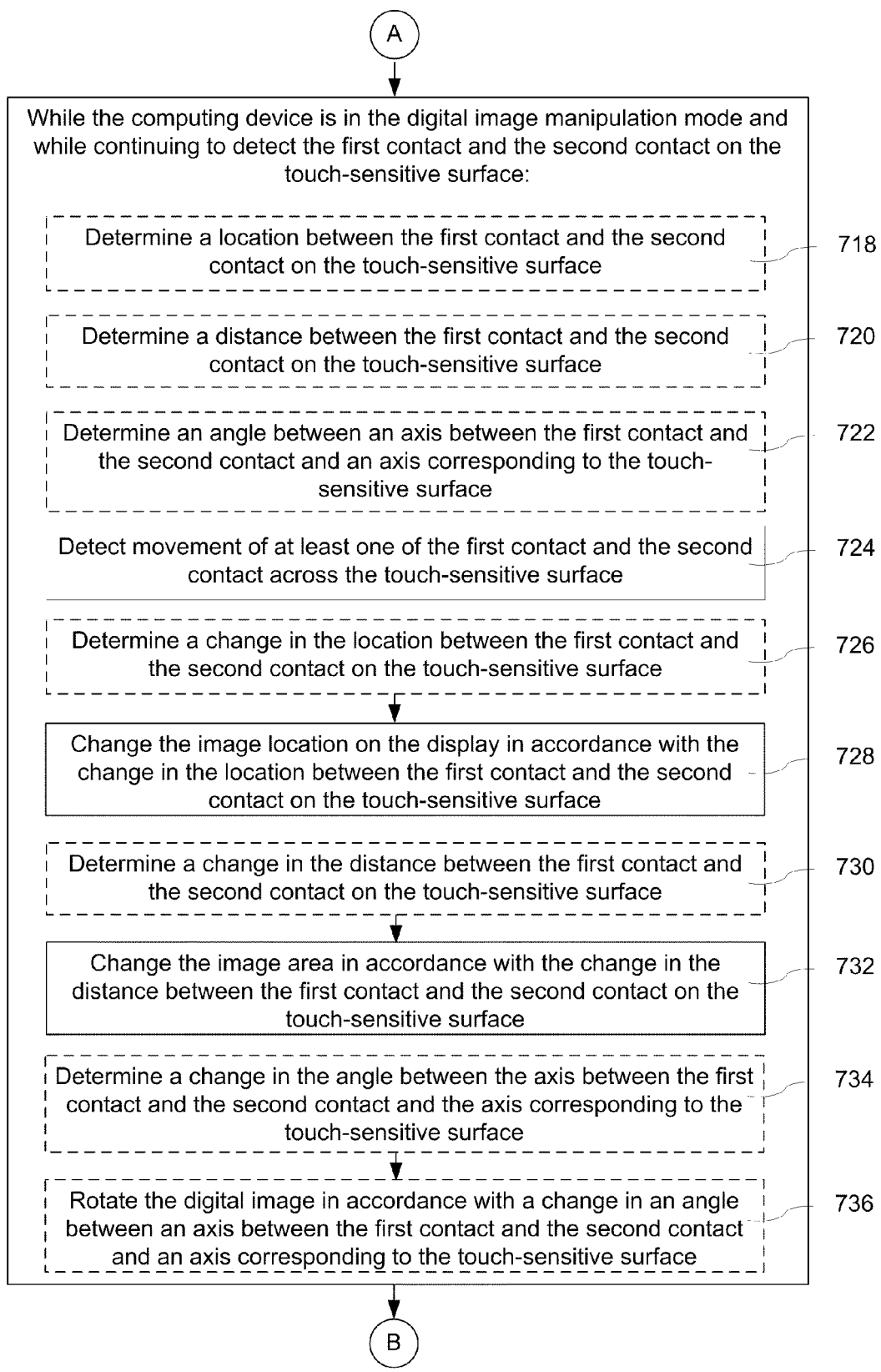
Figure 7C:
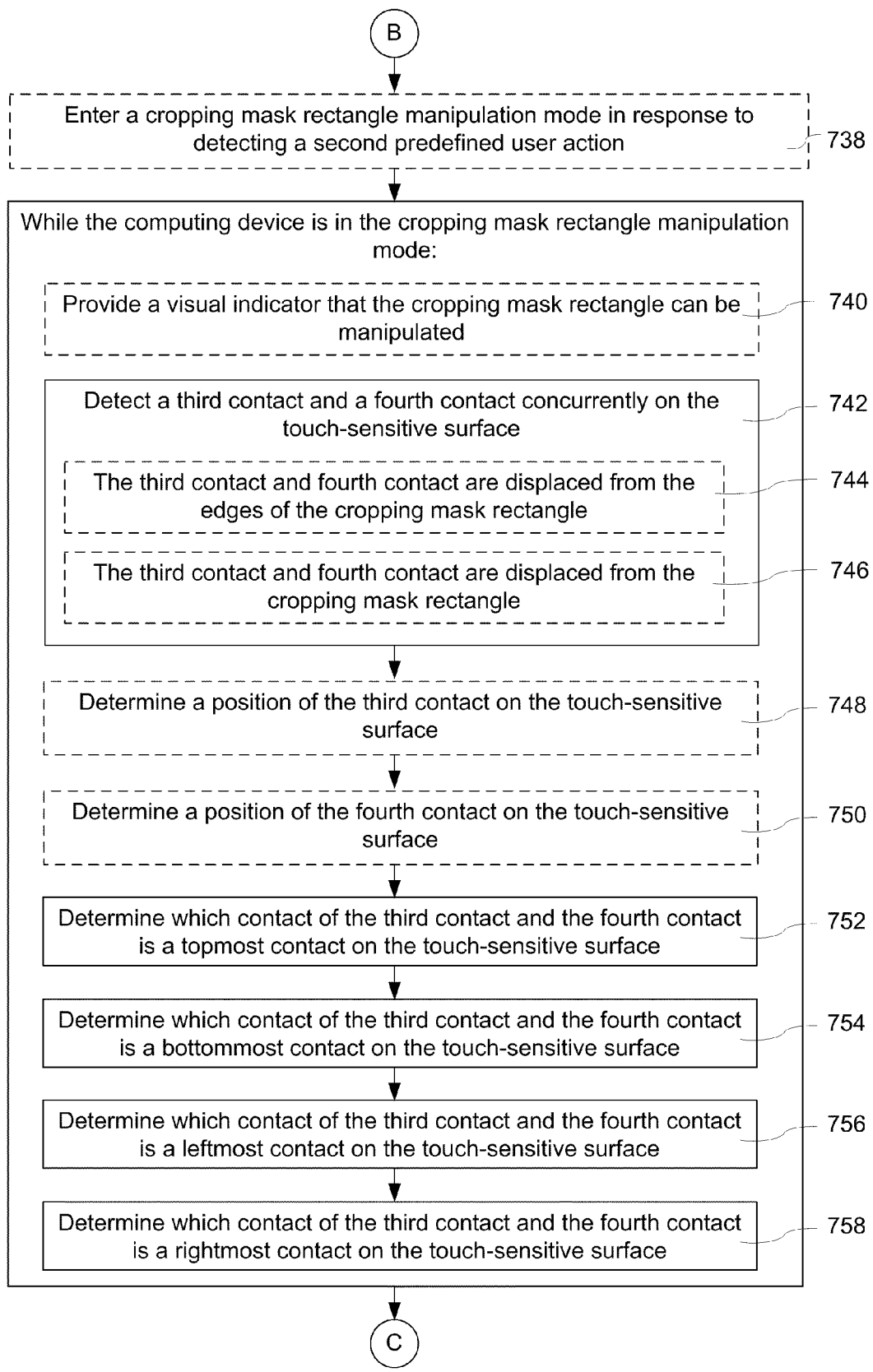
Figure 7D:
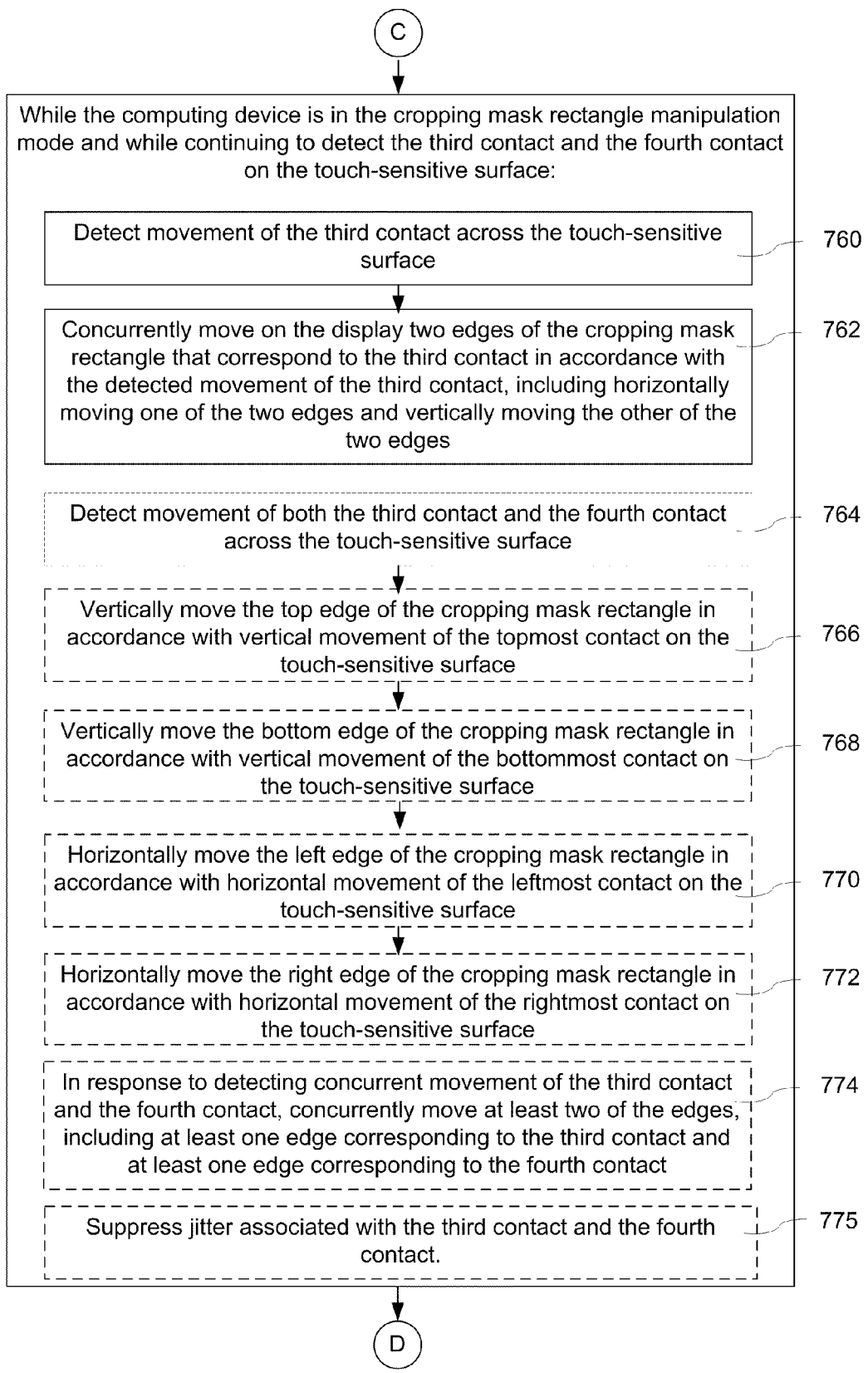
Figure 7E:
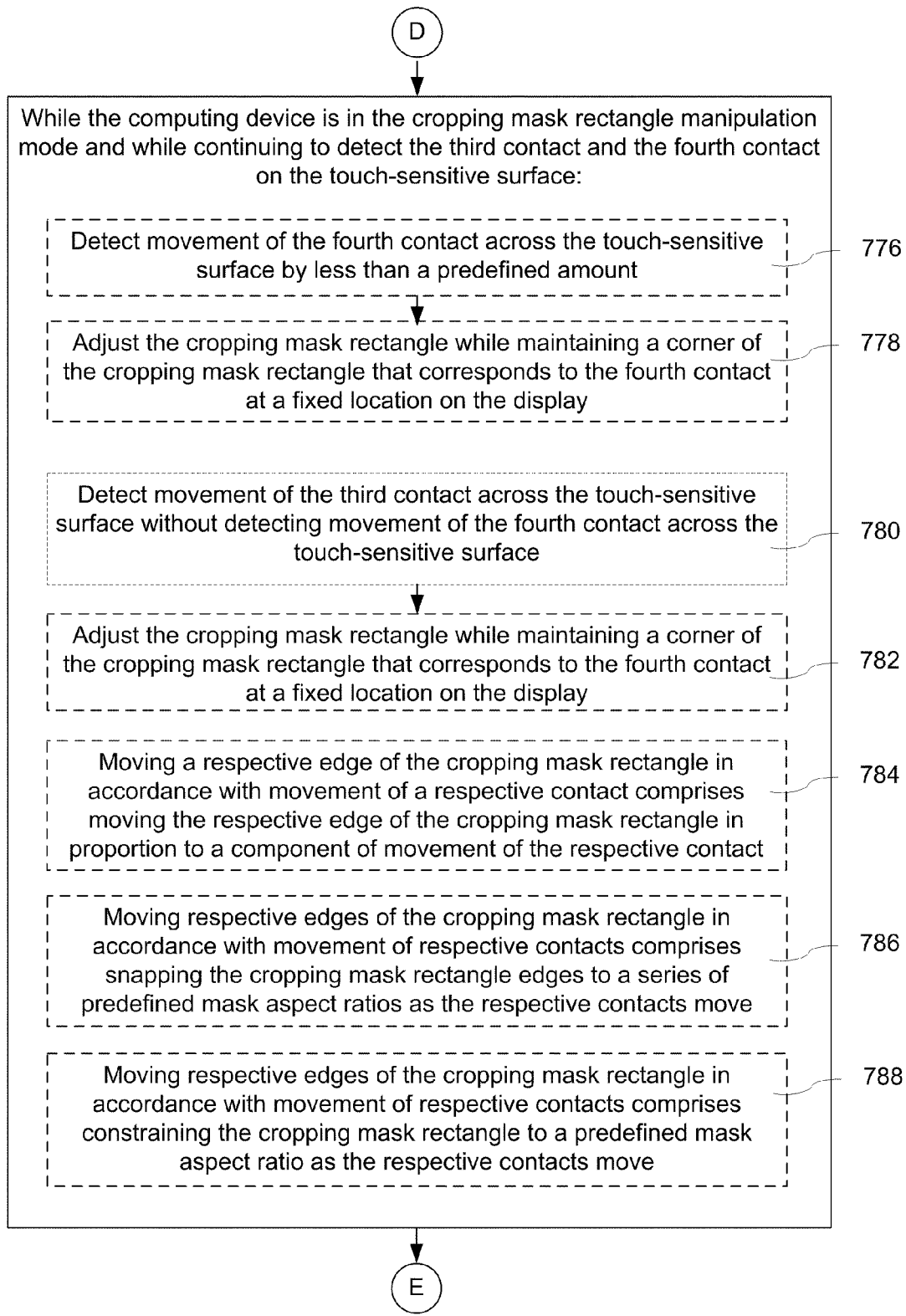
Figure 7F:
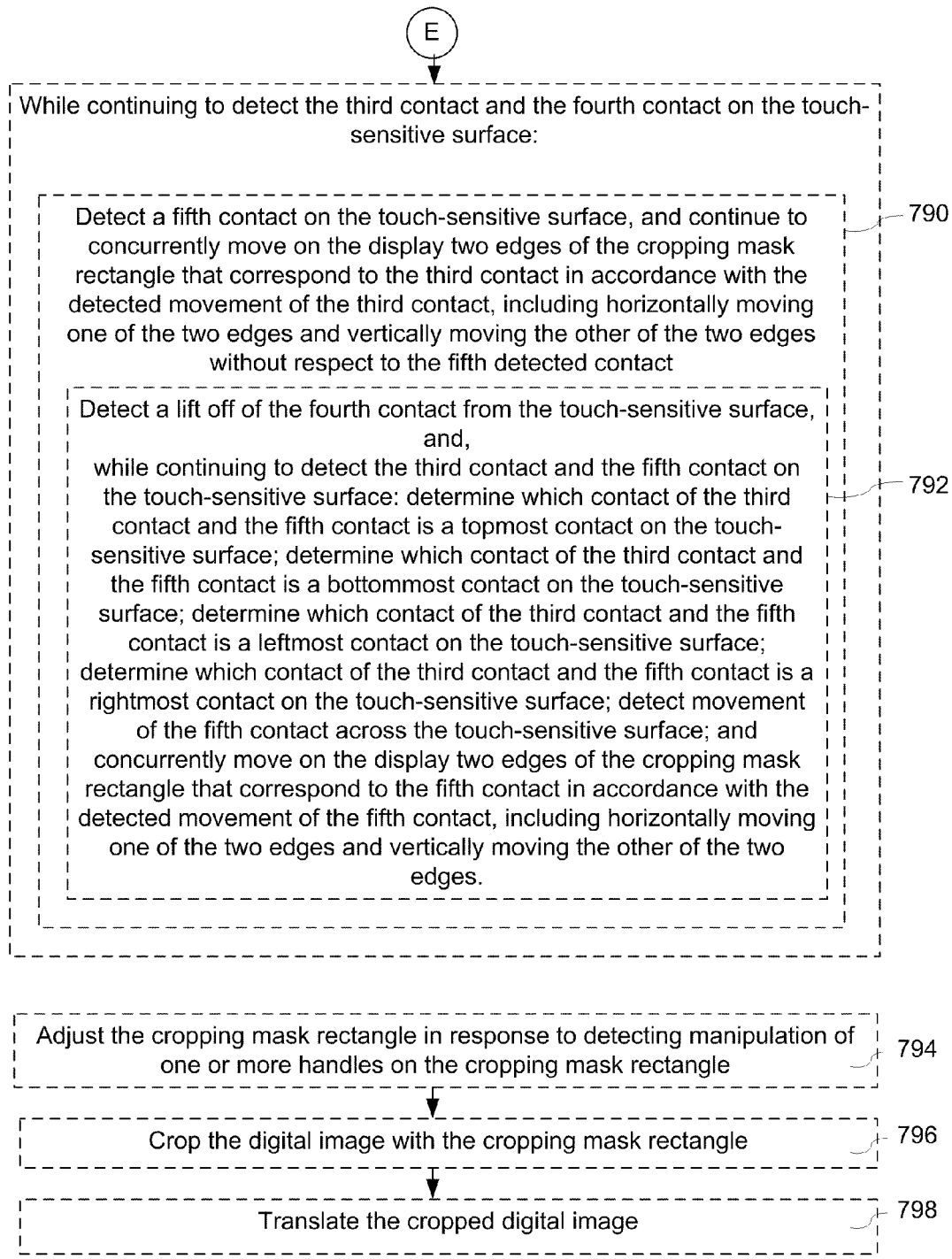
Figure 8B:
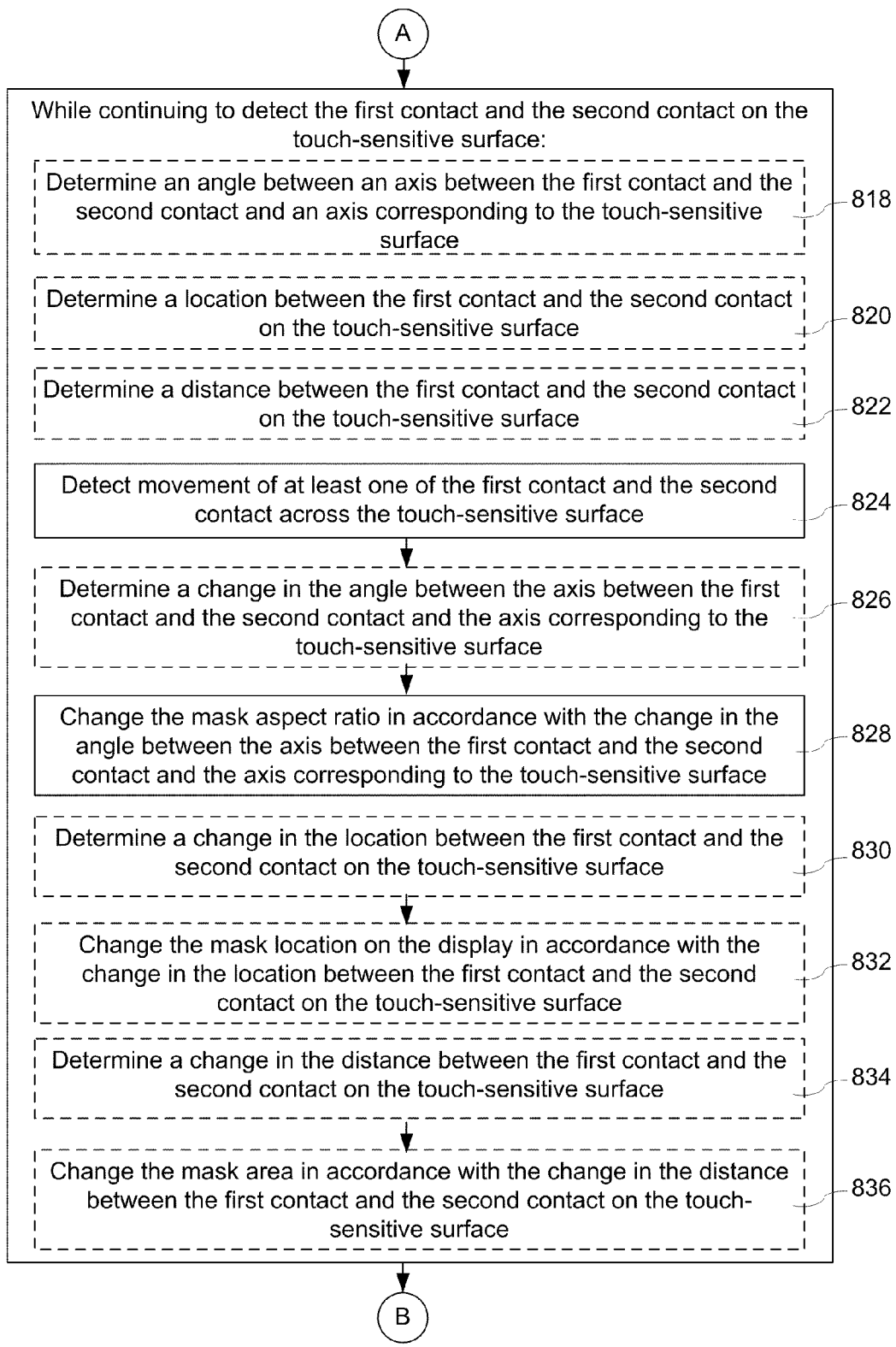
Figure 8C:
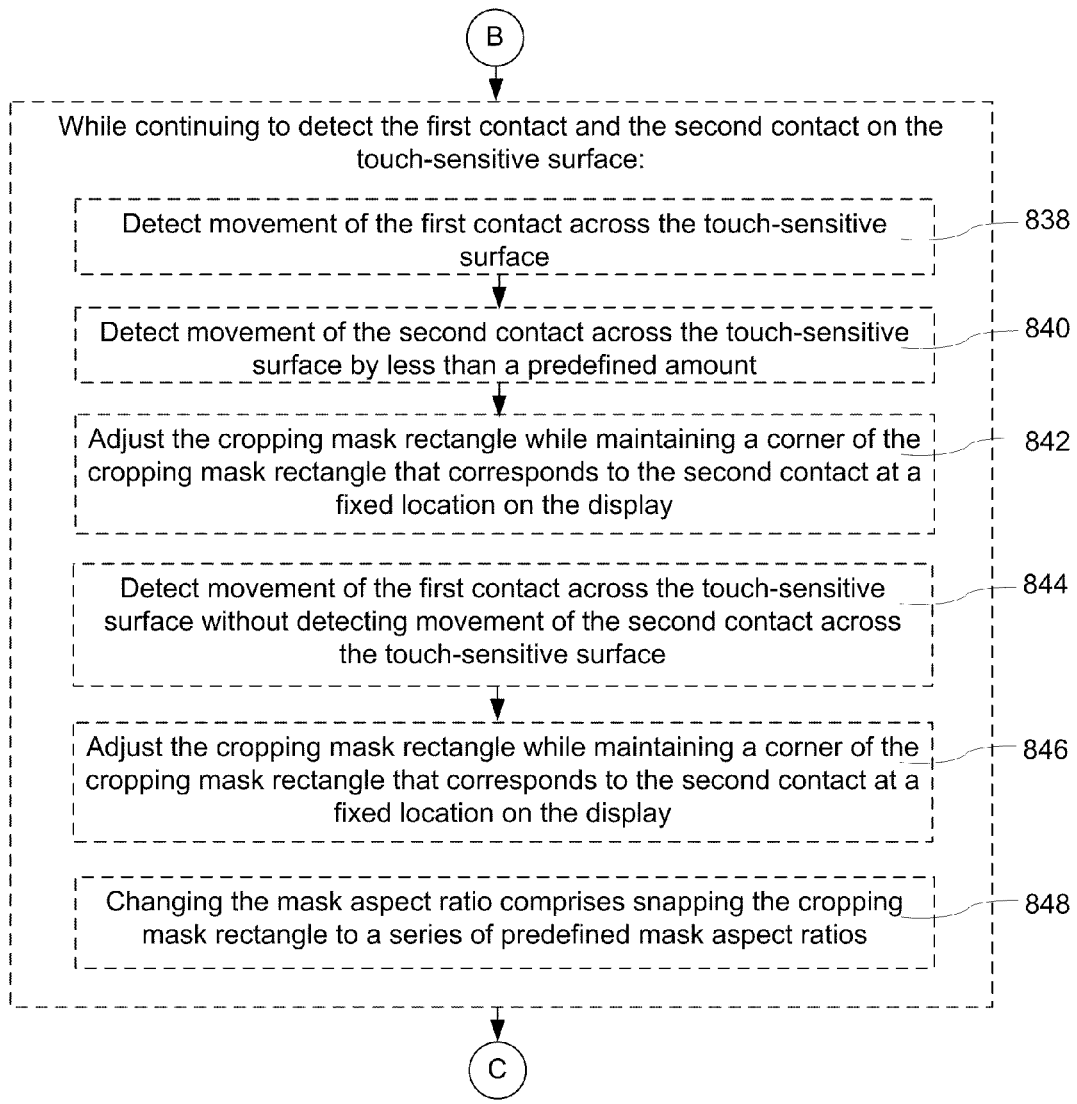
Figure 8D:
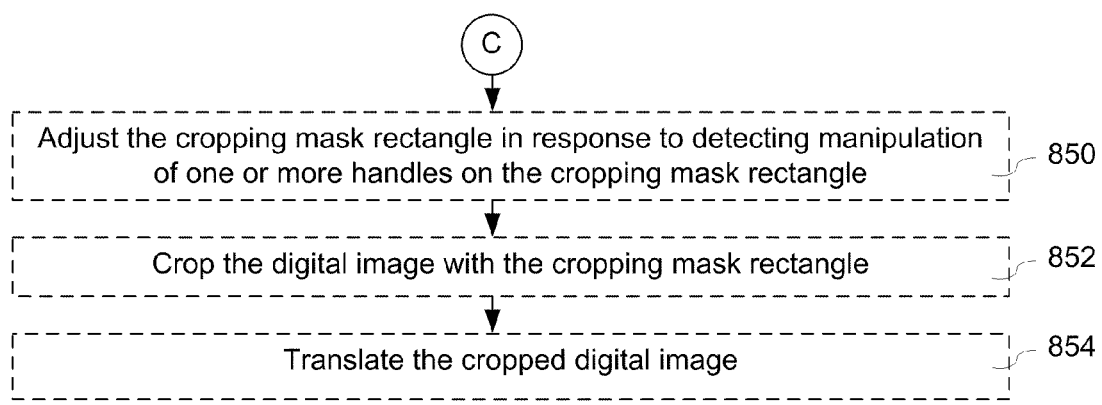
Figure 9B:
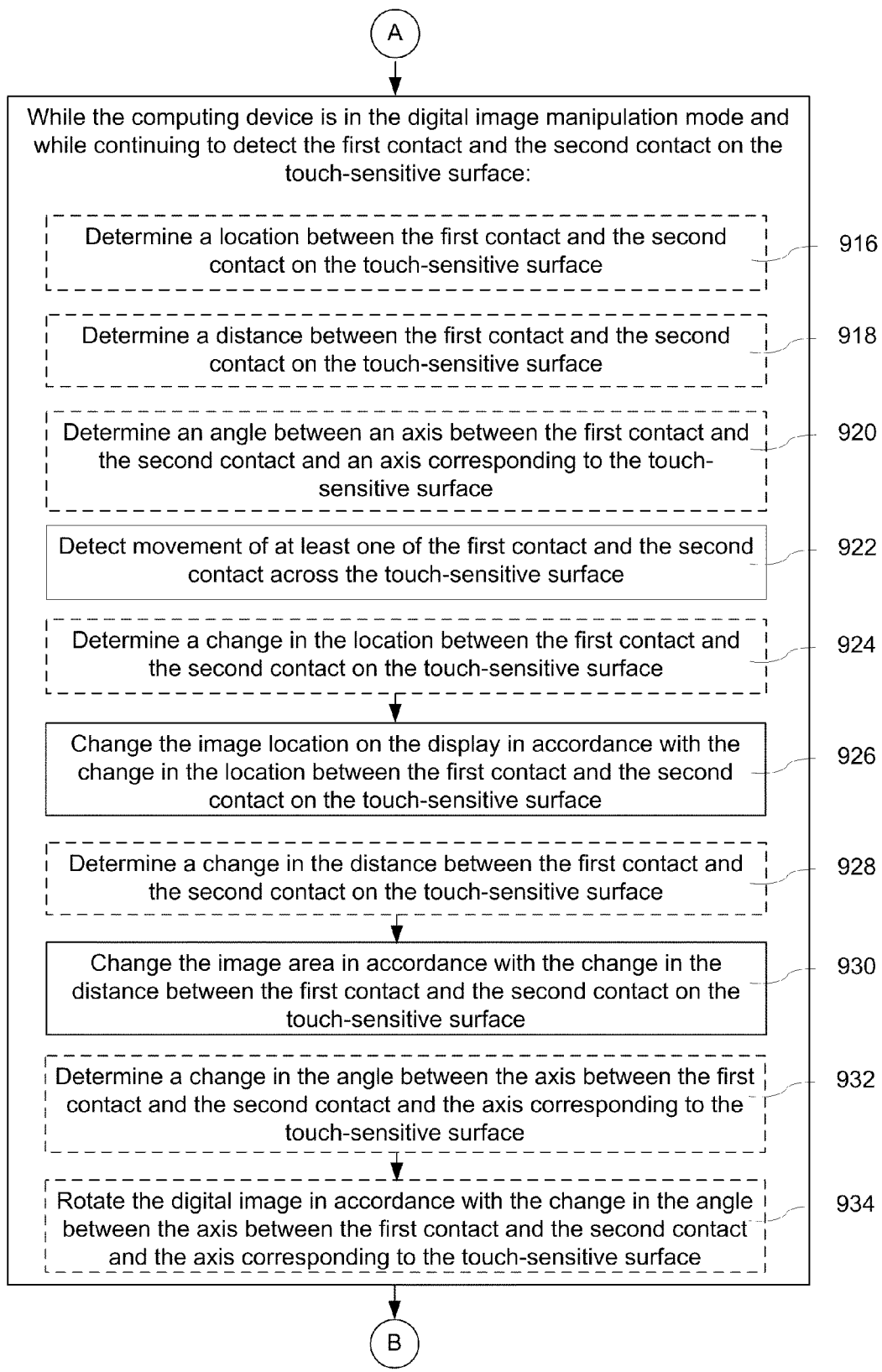
Figure 9C:
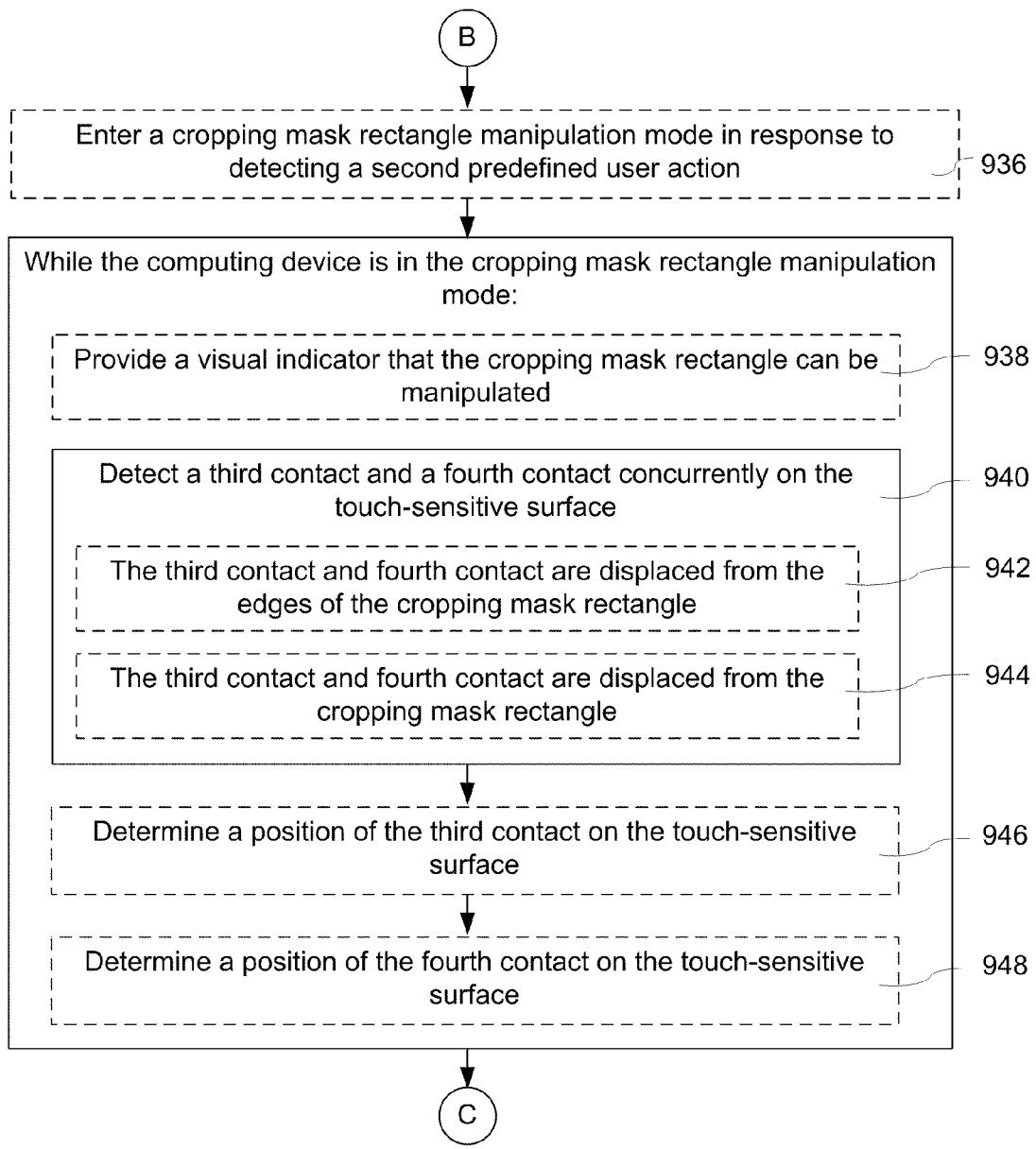
Figure 9D:
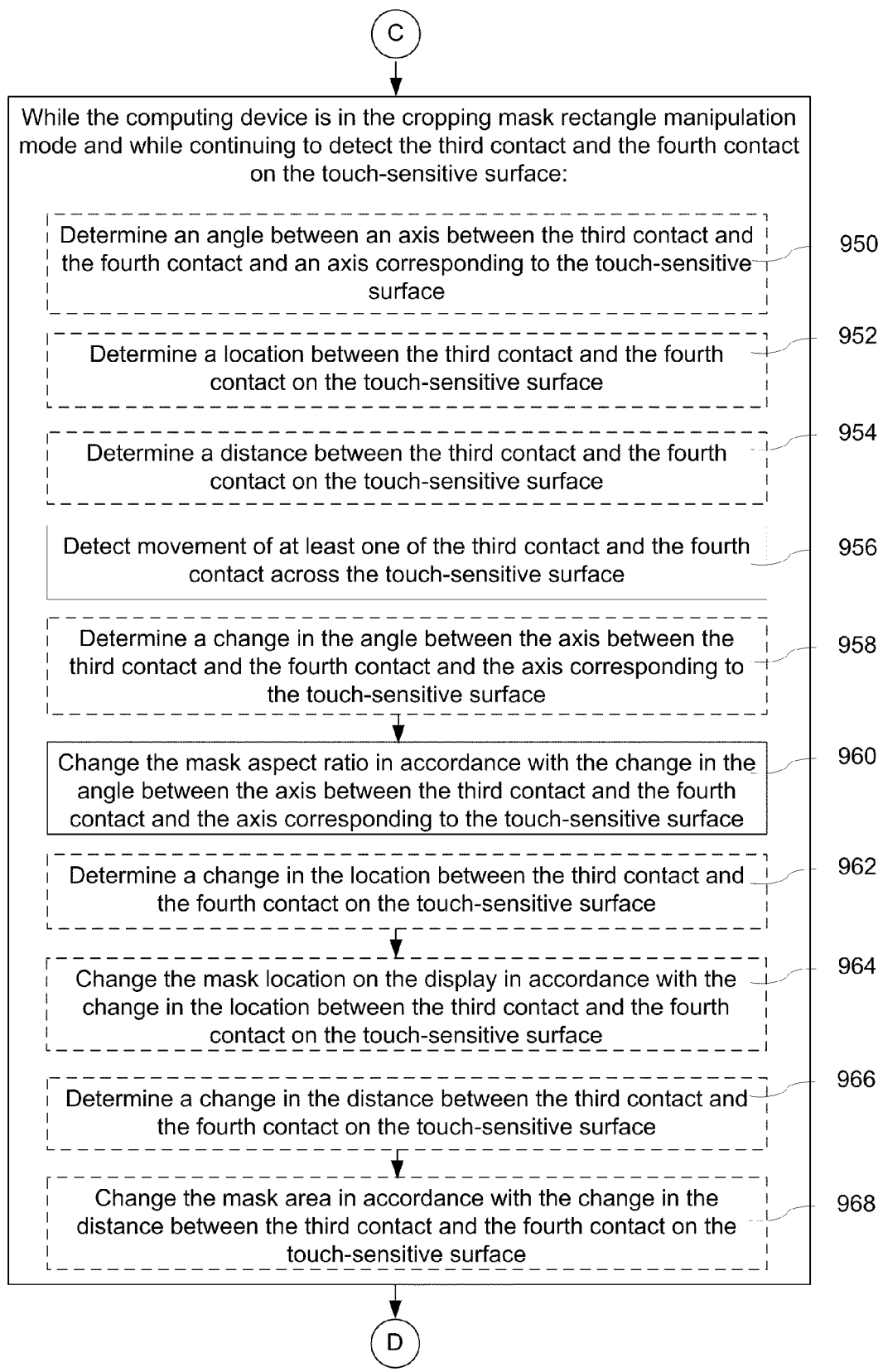
Figure 9E:
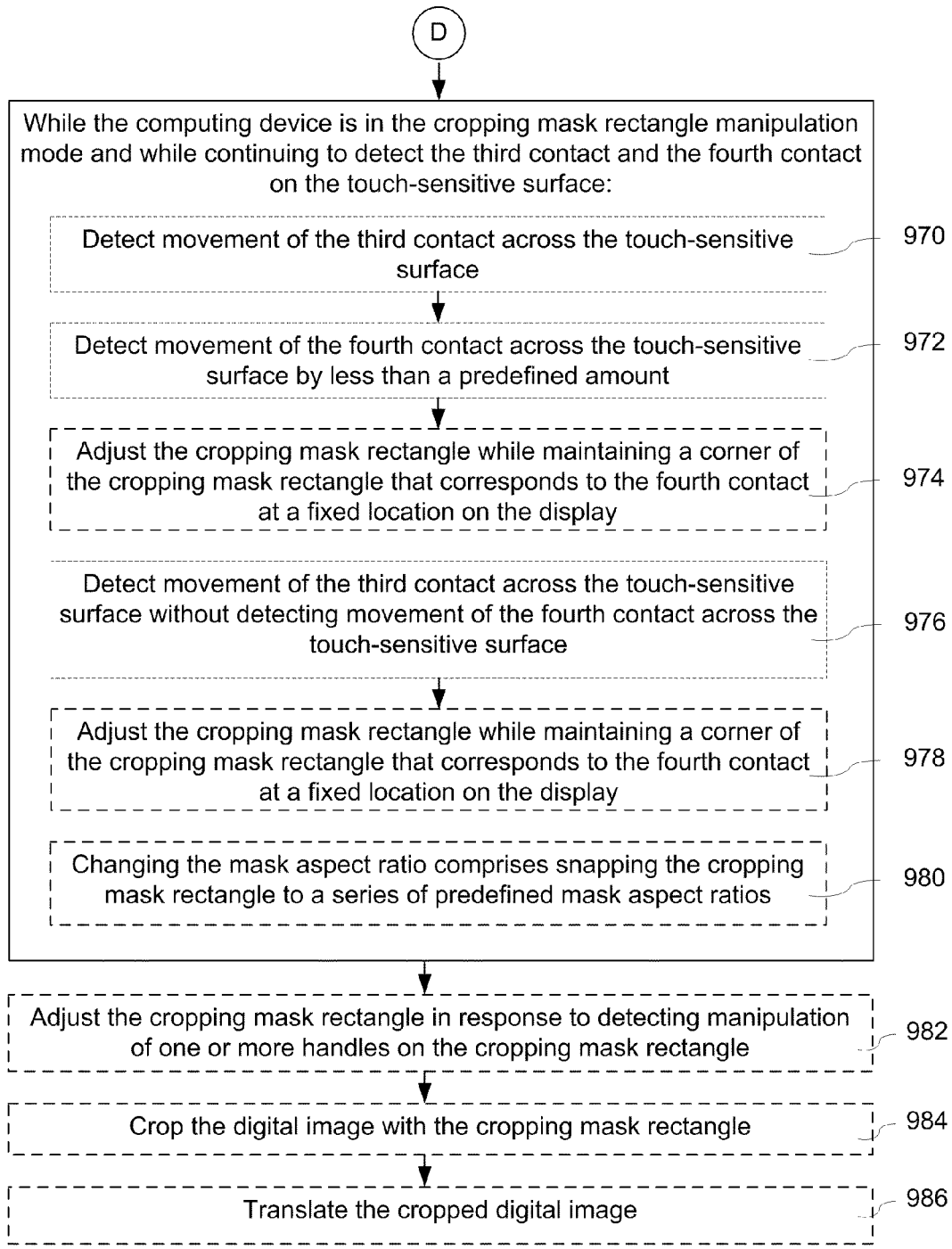
Figure 10B:
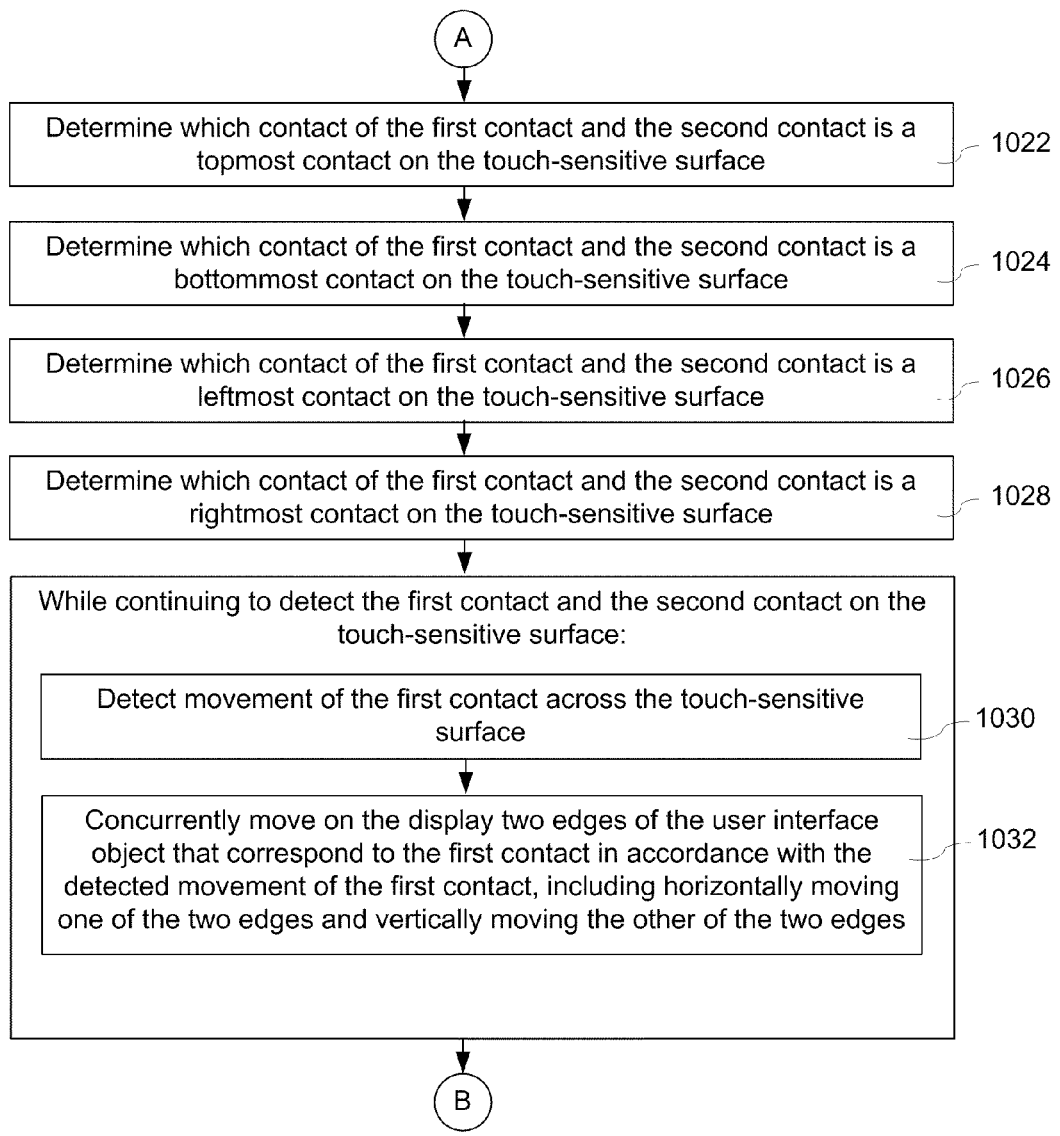
FIGS. 10A-10D are flow diagrams illustrating a method of manipulating a user interface object in accordance with some embodiments.
Figure 10C:
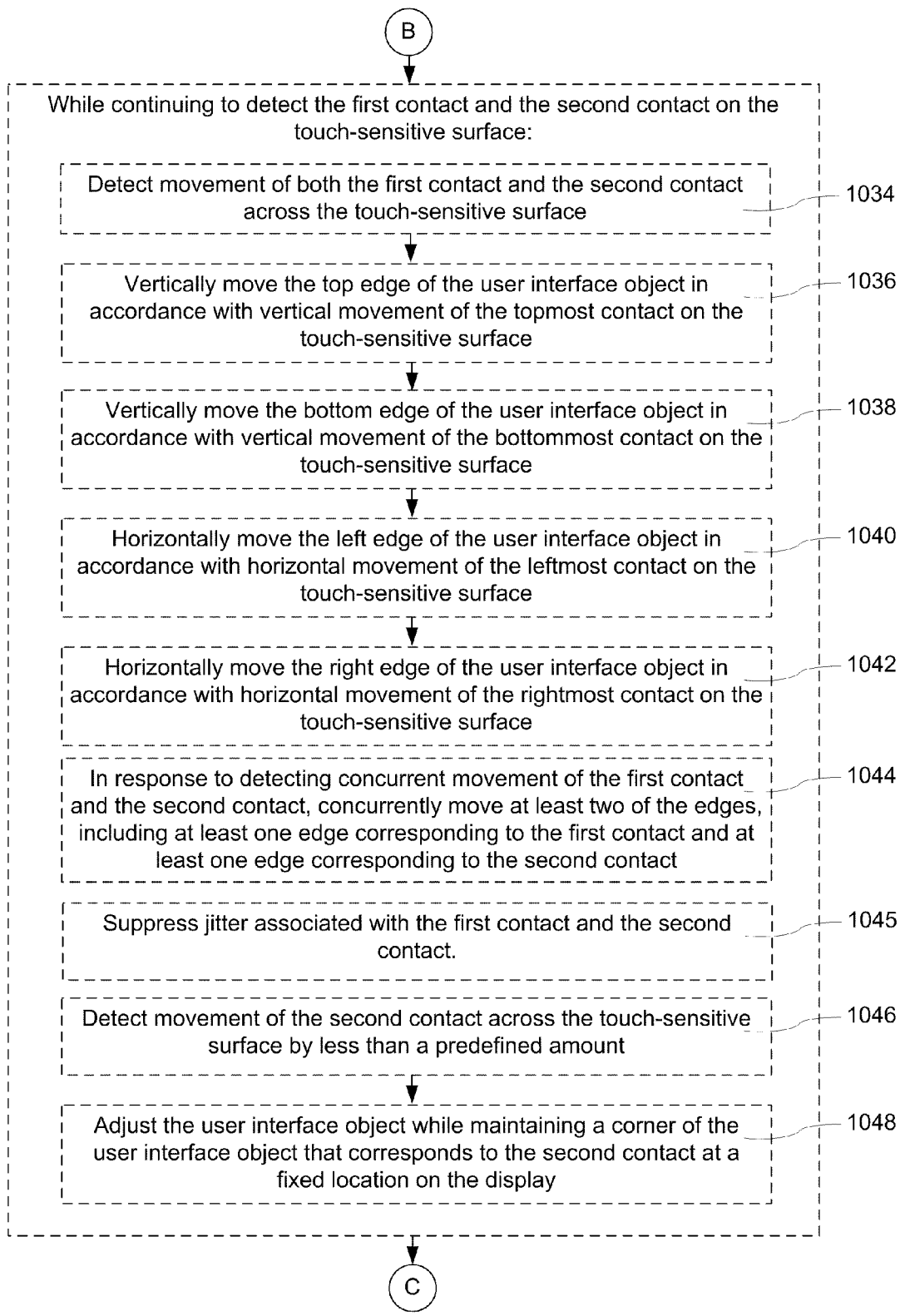
Figure 10D:
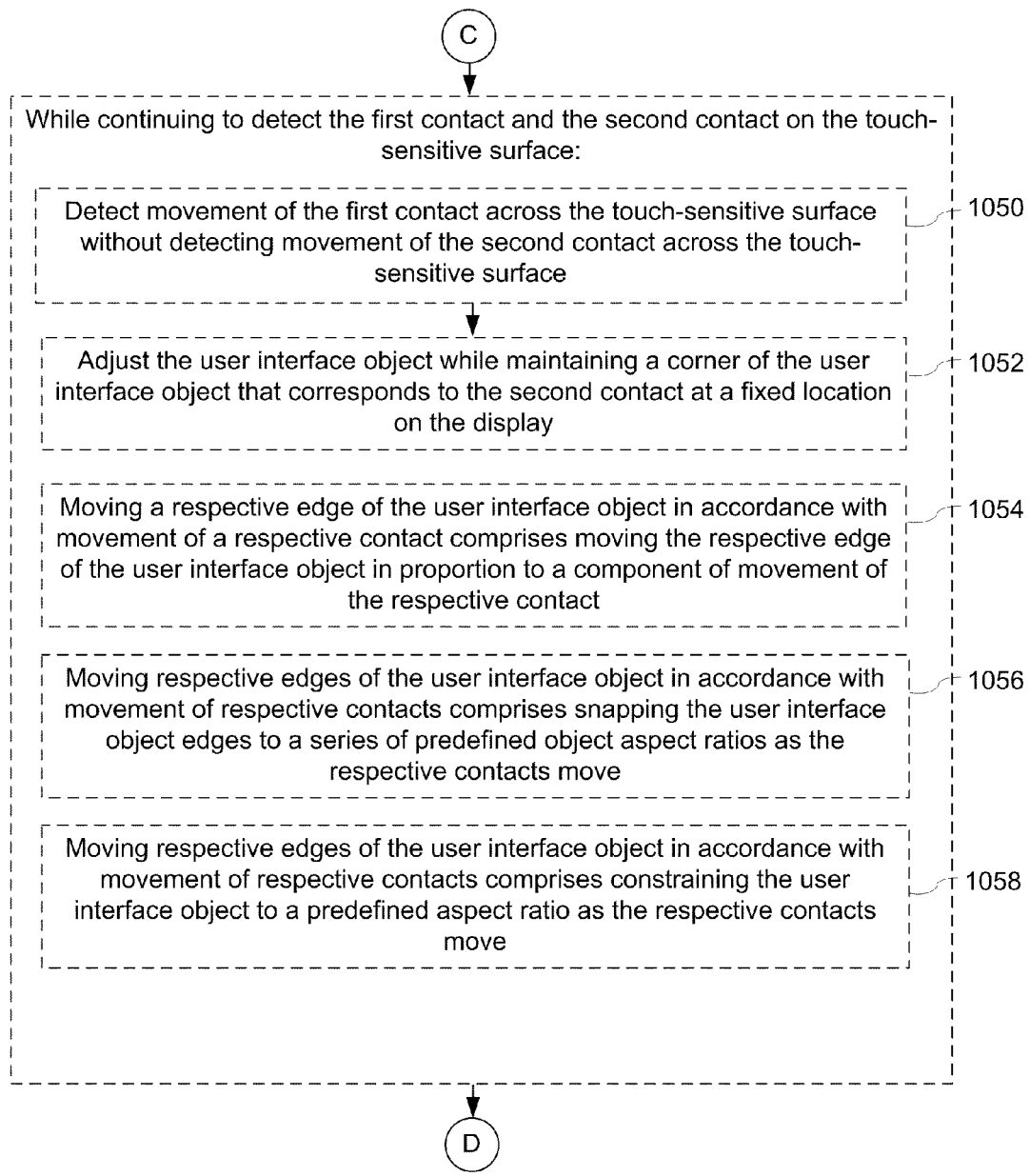
Figure 10E:
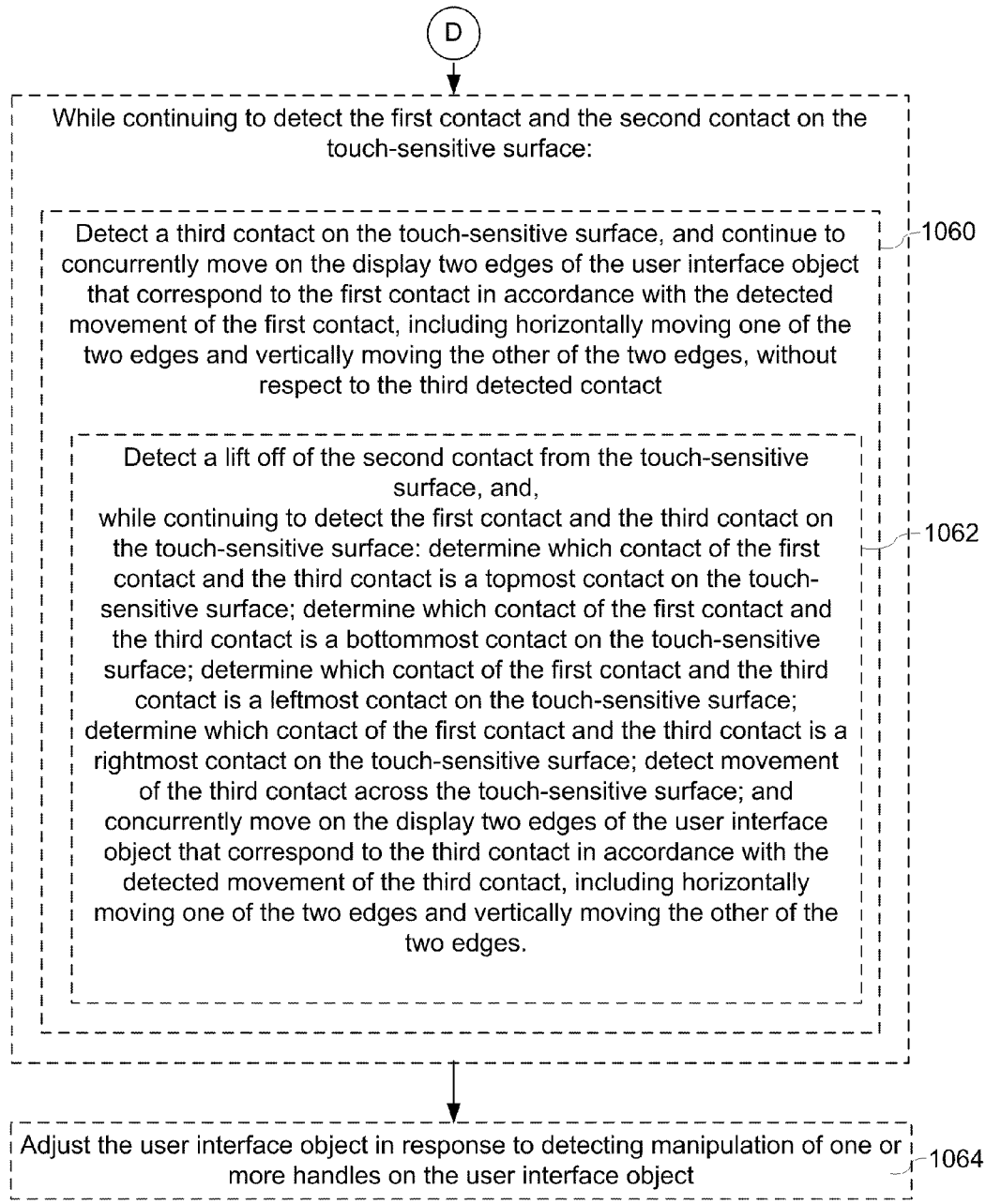

FIG. 5J illustrate cropping the digital image after manipulating the cropping mask rectangle. FIG. 5K illustrates translating the cropped digital image 5052.

FIGS. 6A-6E are flow diagrams illustrating a method of manipulating a cropping mask in accordance with some embodiments. The method 600 is performed at a computing device (e.g., 300, FIG. 3) with a display and a touch-sensitive surface. Some operations in method 600 may be combined and/or the order of some operations may be changed.

In some embodiments, the touch-sensitive surface is separate from the display (e.g., surface 5002 is separate from display 5004 in FIG. 5E). In some embodiments, the touch-sensitive surface is a touch pad (e.g., 5002, FIG. 5E or 355, FIG. 3).

In some embodiments, the touch-sensitive surface is on the display. In other words, the display is a touch screen display (e.g., 112, FIG. 2). In some embodiments, the method is performed at a portable multifunction device with a touch screen display (e.g., portable multifunction device 100).

As described below, the method 600 provides an intuitive way to position, adjust, and otherwise manipulate a cropping mask rectangle at a computing device with a display and a touch-sensitive surface. The method reduces the cognitive burden on a user when cropping a digital image, thereby creating a more efficient human-machine interface. For battery-operated computing devices, enabling a user to perform image cropping faster and more efficiently conserves power and increases the time between battery charges.

The device simultaneously displays (602) on the display 5004: a digital image 5006 and a cropping mask rectangle 5008 for the digital image (e.g., see FIG. 5E). The cropping mask rectangle 5008 has four edges comprising a top edge, a bottom edge, a left edge, and a right edge. In some embodiments, the top and bottom edges are horizontal lines and the left and right edges are vertical lines (604). In some embodiments, the cropping mask rectangle 5008 has an initial height and width that are independent of initial positions of the first contact and second contact. For example in FIG. 5E, the height and width of the cropping mask rectangle 5008 do not depend on the initial positions of contacts 5010-3 and 5010-4. In some embodiments, the digital image 5006 and the cropping mask rectangle 5008 are simultaneously displayed in an image editing application (e.g., 144, FIG. 3), a drawing application (e.g., 380, FIG. 3), a presentation application (e.g., 382, FIG. 3), a word processing application (e.g., 384, FIG. 3), a website creation application (e.g., 386, FIG. 3), a disk authoring application (e.g., 388, FIG. 3), or a spreadsheet application (e.g., 390, FIG. 3) (606).

In some embodiments, the device provides (608) a visual indicator that the cropping mask rectangle can be manipulated (e.g., highlighting the border of the cropping mask rectangle, FIG. 5E).

The device detects (610) a first contact and a second contact concurrently on the touch-sensitive surface (e.g., first contact 5010-3 and second contact 5010-4, FIG. 5E). For example, the device may detect two finger contacts on the touch-sensitive surface at the same time or detect contacts by one finger and a stylus or pen on the touch-sensitive surface at the same time.

In some embodiments, the first contact and the second contact are displaced (612) from the edges of the cropping mask rectangle.

In some embodiments, the first contact and the second contact are displaced (614) from the cropping mask rectangle 5008. The first contact and the second contact are not required to touch the cropping mask rectangle or any visible (or hidden) handles on the cropping mask rectangle in order to manipulate of the cropping mask rectangle. The vertical or horizontal movements of edges of the cropping mask rectangle in response to detected movements of the first contact and the second contact are independent of any (incidental) touching of the cropping mask rectangle (or any handles on the cropping mask rectangle) by the first contact or the second contact. If the touch-sensitive surface 5002 is a touchpad, the first contact and the second contact do not touch the cropping mask rectangle at all (e.g., first contact 5010-3 and second contact 5010-4, FIG. 5E). In some embodiments, the first contact and the second contact may be detected anywhere on the touch-sensitive surface.

In other words, in accordance with some embodiments, the first contact and the second contact are not associated with a cursor or cropping mask rectangle handles (e.g., 5011 in FIG. 5E). For example, compare FIG. 5H, which shows a conventional cursor interaction with a cropping mask rectangle handle, with FIG. 5F, an exemplary illustration of the present invention. In FIG. 5H, a cursor 5042 controlled by a mouse or finger contact (e.g., 5010-5) is used to manipulate a handle on a cropping mask rectangle to precisely adjust an edge or corner of the cropping mask rectangle 5008. In contrast, as shown in FIG. 5F, there is no cursor, and the contacts 5010-3 and 5010-4 are not associated with the handles on a cropping mask rectangle 5008. Thus, the device does not manipulate the cropping mask rectangle 5008 based on control of the movements of a cursor or cropping mask rectangle handles by contacts 5010-3 and 5010-4. Instead, when the device is in a cropping mask rectangle manipulation mode, the movement of a contact (e.g., the movement of contact 5010-3 from position a to position b in FIG. 5F) moves the edges of the cropping mask rectangle 5008 based at least in part on the magnitude and direction of movement of the contact 5010-3. To resize the cropping mask rectangle, a user does not have to use a cursor (or any other means) to select a cropping mask rectangle handle. Instead, the user can simply place two contacts on the touch-sensitive surface and move one or both of the contacts, as shown in FIGS. 5F and 5G and described in greater detail below.

In some embodiments, the first contact and the second contact may be detected anywhere on the touch-sensitive surface. In some embodiments, the first contact and the second contact must be detected in a predefined area on the touch-sensitive surface, such as an area that corresponds to the area within the edges of the cropping mask rectangle, or an area without activatable control icons.

In some embodiments, the device determines (616) a position of the first contact on the touch-sensitive surface (e.g., the position of contact 5010-3 on surface 5002, FIG. 5E). In some embodiments, the device determines (618) a position of the second contact on the touch-sensitive surface (e.g., the position of contact 5010-4 on surface 5002, FIG. 5E).

The device determines (620) which contact of the first contact and the second contact is a topmost contact on the touch-sensitive surface. The device determines (622) which contact of the first contact and the second contact is a bottommost contact on the touch-sensitive surface. The device determines (624) which contact of the first contact and the second contact is a leftmost contact on the touch-sensitive surface. The device determines (626) which contact of the first contact and the second contact is a rightmost contact on the touch-sensitive surface. For example, in FIG. 5E, contact 5010-3 is both the topmost contact and the rightmost contact because contact 5010-3 is above and to the right of contact 5010-4. Similarly, in FIG. 5E, contact 5010-4 is both the bottommost contact and the leftmost contact because contact 5010-4 is below and to the left of contact 5010-3. In accordance with these determinations, two of the edges of the cropping mask rectangle correspond to the first contact and two of the edges correspond to the second contact.

Operations 628-656, discussed below, are performed while continuing to detect the first contact 5010-3 and the second contact 5010-4 on the touch-sensitive surface.

The device detects (628) movement of the first contact 5010-3 across the touch-sensitive surface. The device concurrently moves (630) on the display two edges of the cropping mask rectangle that correspond to the first contact in accordance with the detected movement of the first contact, including horizontally moving one of the two edges and vertically moving the other of the two edges. In other words, in accordance with some embodiments, the device concurrently moves on the display a first edge and a second edge of the cropping mask rectangle that correspond to the first contact in accordance with the detected movement of the first contact, including horizontally moving the first edge and vertically moving the second edge, wherein moving the first edge is independent of moving the second edge. For example, in FIG. 5F, the device detects movement of contact 5010-3 from position a (e.g., an "initial" position 5010-3-*a*) to position b (e.g., a "final" position 5010-3-*b*). The device concurrently moves the top edge and the right edge of the cropping mask rectangle 5008 in accordance with the detected movement of contact 5010-3. The top edge and the right edge correspond to contact 5010-3 because this contact is both the topmost contact and the rightmost contact. As shown in FIG. 5F, the right edge is moved horizontally and the top edge is moved vertically.

In other words, in some embodiments, the movement of the first contact is part of a location-independent gesture performed within a predefined region of the touch-sensitive surface. Thus, in some embodiments, the movement of the first edge of the cropping mask rectangle and the movement of the second edge of the cropping mask rectangle are determined by location-independent elements of the gesture. In some embodiments the predefined region is a region of a touch-sensitive display that is outside of an area with activatable control icons (e.g., the region including a tray 408 in FIG. 4B with icons for frequently used applications). In some embodiments the predefined region is a region of a touch-sensitive surface that is separate from the display (e.g., 5002 in FIG. 5F). In some embodiments, the predefined region is a region outside of a scroll region (e.g., a region on the touch-sensitive surface that is associated with a scrolling a user interface).

In some embodiments, a location-independent gesture is any one of the location independent gestures described previously (e.g., the pinching gesture, the depinching gesture, and/or the rotating gesture described below with reference to FIGS. 5A-5D). These gestures are location-independent gestures because the magnitude and direction of movement of the edges of the cropping mask rectangle that are associated with the first contact is the same without regard to the location of the gesture on the touch-sensitive surface. It should be understood that the location-independent gesture can be any gesture in a predefined area on a touch-sensitive surface which has a meaning that is invariant when the gesture is performed in a different location within the predefined area. As one example, in FIG. 5F, the predefined region is the whole touch-sensitive surface 5002 and the gesture is detection of two contacts 5010-3 and 5010-4 in the predefined region and detected movement 5024 of one of the contacts 5010-3 from an initial location of the contact 5010-3-*a* to a final location of the contact 5010-3-*b*. In this example, the gesture is location-independent because the movement of the top edge and the right edge would be the same if the entire gesture (e.g., the initial contacts 5010-4, 5010-3-*a* and the movement 5024 of the one of the contacts 5010-3-*a* to a new contact location 5010-3-*b*) was shifted to the right or the left and/or up or down on the touch-sensitive surface 5002, so long as the gesture is performed within the predefined area.

In some embodiments, while continuing to detect the first contact and the second contact on the touch-sensitive surface, the device: detects (632) movement of both the first contact 5010-3 and the second contact 5010-4 across the touch-sensitive surface; vertically moves (634) the top edge of the cropping mask rectangle in accordance with vertical movement of the topmost contact on the touch-sensitive surface; vertically moves (636) the bottom edge of the cropping mask rectangle in accordance with vertical movement of the bottommost contact on the touch-sensitive surface; horizontally moves (638) the left edge of the cropping mask rectangle in accordance with horizontal movement of the leftmost contact on the touch-sensitive surface; and horizontally moves (640) the right edge of the cropping mask rectangle in accordance with horizontal movement of the rightmost contact on the touch-sensitive surface. For example, in FIG. 5G, the device detects movement of both the first contact 5010-3 and the second contact 5010-4 across the touch-sensitive surface (e.g., movements 5030 and 5036, respectively). The top edge of the cropping mask rectangle 5008 moves vertically in accordance with vertical movement 5032 of the topmost contact (5010-3 in this example). The bottom edge of the cropping mask rectangle 5008 moves vertically in accordance with vertical movement 5038 of the bottommost contact (5010-4 in this example). The left edge of the cropping mask rectangle 5008 moves horizontally in accordance with horizontal movement 5040 of the leftmost contact (5010-4 in this example). The right edge of the cropping mask rectangle 5008 moves horizontally in accordance with horizontal movement 5034 of the rightmost contact (5010-3 in this example). Note that with these vertical and horizontal movements of the cropping mask rectangle edges, the cropping mask rectangle 5008 may change its size and location on the display 5004, but the cropping mask rectangle will not rotate on the display.

Note that with these vertical and horizontal movements of the cropping mask rectangle edges, the cropping mask rectangle 5008 may change its size and location on the display 5004, but the cropping mask rectangle 5008 will not rotate on the display. In other words, in accordance with some embodiments, when the movement of the first contact is two-dimensional movement across the touch-sensitive surface, an orientation of the top edge, bottom edge, left edge, and right edge of the cropping mask rectangle 5008 on the display remain unchanged.

In some embodiments, in response to detecting concurrent movement of the first contact and the second contact, the device concurrently moves (642) at least two of the edges, including at least one edge corresponding to the first contact and at least one edge corresponding to the second contact. For example, in FIG. 5G, in response to detecting concurrent movement of the first contact 5010-3 and the second contact 5010-4, the device concurrently moves two edges corresponding to the first contact 5010-3 (the top edge and the right edge in this example) and two edges corresponding to the second contact 5010-4 (the bottom edge and the left edge in this example).

In some embodiments, the device suppress jitter (643) associated with the first contact and the second contact. In some embodiments, the device maintains a corner of the cropping mask rectangle that corresponds to a contact at a fixed location on the display. In other words, the device does not move two edges of the cropping mask rectangle that correspond to a contact despite detecting movement of the contact. Exemplary code for suppressing jitter and pinning a corner of the cropping mask rectangle is as follows:

```
{
    float deltax0 = point0.x - lastPoint0.x;
    float deltay0 = point0.y - lastPoint0.y;
    float deltax1 = point1.x - lastPoint1.x;
    float deltay1 = point1.y - lastPoint1.y;
    float length0 = sqrt( pow(deltax0,2) + pow(deltay0, 2));
    float length1 = sqrt( pow(deltax1,2) + pow(deltay1, 2));
    float angle0;
    float angle1;
    if (deltax0 > 0)
    {
        angle0 = atan(deltay0/deltax0);
        if (angle0 < 0)
            angle0 += 2*PI;
    }
    elseif (deltax0 < 0)
    {
        angle0 = atan(deltay0/deltax0) + PI;
    }
    elseif (deltay0 > 0)
    {
        angle0 = PI/2;
    }
    else {
        angle0 = 3*PI/2;
    }
    if (deltax1 > 0)
    {
        angle 1 = atan(deltay1/deltax1);
        if (angle1 < 0)
            angle1 += 2*PI;
    }
    else if (deltax1 < 0)
    {
        angle1 = atan(deltay1/deltax1) + PI;
    }
    else if (deltay1 > 0)
    {
        angle1 = PI/2;
    }
    else {
        angle1 = 3*PI/2;
    }
```

-continued

```
    if (length0 < 1.0 && length1 < 1.0)
        return;
    __Touch0AvgVelocity = (7.0*__Touch0AvgVelocity +
    length0* 100.0)/8.0;
    __Touch1AvgVelocity = (7.0*__Touch1AvgVelocity +
    length1* 100.0)/8.0;
    if ( (length1 != 0.0 && (length0/length1 < 2 && length0/length1 >
    0.5)) &&
    ((fabs(angle0 - angle1) < PI/4) || (fabs(angle0 - angle1 + (2*PI)) <
    PI/4)))
    {
        __TouchMode = touchMode__translate;
    }
    else if ((__Touch0AvgVelocity < 50 && __Touch1AvgVelocity >
    50))
    {
        __TouchMode = touchMode__pin0;
    }
    else if ((__Touch1AvgVelocity < 50 && __Touch0AvgVelocity >
    50))
    {
        __TouchMode = touchMode__pin1;
    }
    else
    {
        __TouchMode = touchMode__free;
    }
    if (__TouchMode == touchMode__translate)
    {
        deltax1 = deltax0;
        deltay1 = deltay0;
    }
    else if (__TouchMode == touchMode__pin0)
    {
        deltax0 = 0.0;
        deltay0 = 0.0;
    }
    else if (__TouchMode == touchMode__pin1)
    {
        deltax1 = 0.0;
        deltay1 = 0.0;
    }
}
```

The above code determines a first calculated movement length (length0) corresponding to the detected movement of the first contact (point0) and a second calculated movement length (length1) corresponding to the detected movement of the second contact (point1). The code determines a first calculated angle (angle0) corresponding to the detected movement of the first contact and a second calculated angle (angle1) corresponding to the detected movement of the second contact. If each of the two calculated movement lengths is less than a predetermined distance on the display (e.g., 1 pixel), the code skips the rest of the processing until the next iteration of the process.

If at least one calculated movement length is greater than the predetermined distance, the code determines a first weighted movement rate (Touch0AvgVelocity) based on the detected movement of the first contact and a second weighted movement rate (Touch1AvgVelocity) based on the detected movement of the second contact. In some embodiments, the first and second weighted movement rates are determined by calculating a weighted-average based on the distances moved by the first and second contacts, respectively. In some embodiments, the first and/or second weighted movement rates may be normalized by dividing by the true time between detected movements.

The code calculates parameters to determine whether jitter correction and/or pinning a corner of the cropping mask rectangle are needed. In some embodiments, the code determines a ratio of the first calculated movement length and the second calculated length, as well as determining a difference between the first calculated angle and the second calculated angle.

The code compensates for jitter (in touchMode_translate) when the ratio of the first calculated movement length and the second calculated movement length is within a predefined range, and the difference between the first calculated angle and the second calculated angle is less than or equal to a predetermined threshold (e.g., the ratio of the first and second calculated movement lengths is within the range 0.5-2, and the first and second calculated angles are within 45 degrees of one another). When these conditions are met, the codes sets the movement of the second contact equal to the movement of the first contact so that the cropping mask rectangle translates on the display without changing its size.

The code pins a corner of the cropping mask rectangle that corresponds to the first contact (in touchMode_pin0) when the first weighted movement rate is less than a predetermined threshold (e.g., 50, which corresponds to ~0.5 pixels per update/iteration) and the second weighted movement rate is greater than the predetermined threshold by setting the movement of the first contact to zero. Thus, the two edges that correspond to the first contact (and the corner at the intersection of these two edges) do not move.

The code pins a corner of the cropping mask rectangle that corresponds to the second contact (in touchMode_pin1) when the second weighted movement rate is less than a predetermined threshold (e.g., 50, which corresponds to ~0.5 pixels per update/iteration) and the first weighted movement rate is greater than the predetermined threshold by setting the movement of the second contact to zero. Thus, the two edges that correspond to the second contact (and the corner at the intersection of these two edges) do not move.

If at least one calculated movement length is greater than the predetermined distance, and none of the conditions for jitter suppression or corner pinning are satisfied (in touchMode_free), the code moves each edge of the cropping mask rectangle in accordance with the movement of its corresponding contact.

In some embodiments, the device detects (644) movement of the second contact across the touch-sensitive surface by less than a predefined amount (e.g., an amount corresponding to less than 5-10 pixels on the display), and the device adjusts (646) the cropping mask rectangle while maintaining a corner of the cropping mask rectangle that corresponds to the second contact at a fixed location on the display. For example, in FIG. 5F, the device detects little or no movement of the second contact 5010-4, and the device adjusts the cropping mask rectangle while maintaining the bottom, left corner of the cropping mask rectangle 5008 (i.e., the corner that corresponds to the second contact 5010-4) at a fixed location on the display 5004. In FIG. 5F, the bottom, left corner of the cropping mask rectangle 5008 corresponds to the second contact 5010-4 because the second contact is both the bottommost contact and the leftmost contact.

In other words, in some embodiments, in accordance with determining which contact of the first contact and the second contact is the topmost, bottommost, leftmost and rightmost, the device dynamically associates the first contact and second contact with diagonally opposite corners of the cropping mask rectangle. In some embodiments, the dynamic association is performed without changing the initial height and width of the cropping mask rectangle. Thus, in this embodiment, instead of causing the corners of the cropping mask rectangle to "snap-to" the location of the contacts that are associated with the corners, the corners are dynamically associated with the first contact and the second contact so that the movement of a respective contact (e.g., the first contact) results in a movement of the corner associated with the respective contact (e.g., the first contact), wherein the movement of the corner is based on the movement of the respective contact. For example, if the first contact is associated with the topmost and the rightmost side, then the first contact is associated with the upper right hand corner of the cropping mask rectangle.

In some embodiments, the device detects (648) movement of the first contact across the touch-sensitive surface without detecting movement of the second contact across the touch-sensitive surface, and the device adjusts (650) the cropping mask rectangle while maintaining a corner of the cropping mask rectangle that corresponds to the second contact at a fixed location on the display (e.g., see FIG. 5F and the preceding paragraph).

In some embodiments, moving a respective edge of the cropping mask rectangle in accordance with movement of a respective contact comprises moving (652) the respective edge of the cropping mask rectangle in proportion to a component of movement of the respective contact. For example, in FIG. 5G, the top edge of the cropping mask rectangle 5008 is moved in proportion to the vertical component of movement 5032 of the topmost contact (contact 5010-3); the bottom edge of the cropping mask rectangle 5008 is moved in proportion to the vertical component of movement 5038 of the bottommost contact (contact 5010-4); the left edge of the cropping mask rectangle 5008 is moved in proportion to the horizontal component of movement 5040 of the leftmost contact (contact 5010-4); and the right edge of the cropping mask rectangle 5008 is moved in proportion to the horizontal component of movement 5034 of the rightmost contact (contact 5010-3).

In other words, the movement of the first contact (e.g., 5010-3 in FIG. 5F) is from an initial position (e.g., 5010-3-*a* in FIG. 5F) on the touch-sensitive surface to a final position (e.g., 5010-3-*b* in FIG. 5F) on the touch-sensitive surface and the concurrent movement of the two edges of the cropping mask rectangle is dependent only on relative movement of the first contact (e.g., 5010-3 in FIG. 5F) from the initial position of the first contact to a final position.

Exemplary code for moving respective edges of the cropping mask rectangle in accordance with movement of respective contacts is as follows:

```
{
    CGPoint point0 = [touches pointAtIndex:0];
    CGPoint point1 = [touches pointAtIndex:([touches count] > 1) ? 1 :
0];
    double dWidthRight = (_lastPoint1.x > _lastPoint0.x) ? (point1.x -
_lastPoint1.x) :
(point0.x - _lastPoint0.x);
    double dWidthLeft = (_lastPoint1.x > _lastPoint0.x) ?
(_lastPoint0.x - point0.x) :
(_lastPoint1.x - point1. x);
    _cropRect.width += dWidthRight + dWidthLeft;
    _cropRect.x -= dWidthLeft - (dWidthRight + dWidthLeft)/2;
    double dHeightBottom = (_lastPoint1.y < _lastPoint0.y) ?
(_lastPoint1.y - point1.y) :
(_lastPoint0.y - point0.y);
    double dHeightTop = (_lastPoint1.y < _lastPoint0.y) ? (point0.y -
_lastPoint0.y) :
(point1.y - _lastPoint1.y);
    _cropRect.height += dHeightBottom + dHeightTop;
    _cropRect.y += dHeightTop - (dHeightBottom + dHeightTop)/2;
    _lastPoint0 = point0;
    _lastPoint1 = point1;
}
```

The above code obtains the location of the first and second contacts (point0, point1). The prior locations of the first and second contacts are represented by lastPoint0 and lastPoint1. Then, the changes in width (actually movements of the cropping rectangle's left and right edges) on both the left (dWidth-Left) and right (dWidthRight) sides of the cropping rectangle are determined based on horizontal movement of the contacts, taking care to decide which is the leftmost contact and which is the rightmost (based on whether lastPoint1.x is greater or less than lastPoint0.x). The new width of the cropping rectangle (cropRect.width) is computed based on the movements of the left and right edges (dWidthLeft and dWidthRight), and the x-axis location of the cropping rectangle (cropRect.x) is also updated based on the movements of the left and right edges (dWidthLeft and dWidthRight). Similar calculations are performed to determine changes in the height (cropRect.height) and y-axis location (cropRect.y) of the cropping rectangle. Finally, the current locations (point0, point1) of the contacts are stored as the "last" locations (lastPoint0, lastPoint1) for use during the next iteration of the process.

In some embodiments, moving respective edges of the cropping mask rectangle in accordance with movement of respective contacts comprises snapping (654) the cropping mask rectangle edges to a series of predefined mask aspect ratios as the respective contacts move (e.g., 1:1, 2:3, 3:2, 3:5, 5:3, 5:7, 7:5, 8:10, 10:8, 3:4, 4:3, 16:9, 9:16, and/or the display aspect ratio). In some embodiments, the aspect ratio changes or appears to change continuously on the display.

In some embodiments, moving respective edges of the cropping mask rectangle in accordance with movement of respective contacts comprises constraining (656) the cropping mask rectangle to a predefined mask aspect ratio as the respective contacts move (e.g., 1:1, 2:3, 3:2, 3:5, 5:3, 5:7, 7:5, 8:10, 10:8, 3:4, 4:3, 16:9, 9:16, or the display aspect ratio).

Some or all of operations 610-656 may be repeated in response to detecting lift off of one or both contacts (5010-3 and 5010-4) and then detecting again two simultaneous contacts on the touch-sensitive surface 5002. For a user, these operations provide a fast, intuitive way to manipulate the cropping mask rectangle 5008 with two contacts on the touch-sensitive surface.

In other words, in some embodiments, after the device moves, on the display, two edges of the cropping mask rectangle that correspond to the first contact in accordance with the detected movement of the first contact, including horizontally moving one of the two edges and vertically moving the other of the two edges, the device detects a liftoff of the first contact. In some embodiments, the device detects a third contact concurrently with the second contact on the touch-sensitive surface; determines which contact of the second contact and the third contact is a topmost contact on the touch-sensitive surface; determines which contact of the second contact and the third contact is a bottommost contact on the touch-sensitive surface; determines which contact of the second contact and the third contact is a leftmost contact on the touch-sensitive surface; and determines which contact of the second contact and the third contact is a rightmost contact on the touch-sensitive surface. In some embodiments, while continuing to detect the second contact and the third contact on the touch-sensitive surface, the device: detects movement of the third contact across the touch-sensitive surface; and concurrently moves, on the display, two edges of the cropping mask rectangle that correspond to the third contact in accordance with the detected movement of the third contact, including horizontally moving one of the two edges and vertically moving the other of the two edges.

The cropping mask rectangle is typically a persistent cropping mask rectangle (e.g., a persistent user interface object). In some embodiments, while the user is in a cropping mask rectangle manipulation mode, the user can begin manipulating the cropping mask rectangle (e.g., moving one or more sides of the cropping mask rectangle to resize the cropping mask rectangle), and then liftoff one or more of the contacts that were used to manipulate the cropping mask rectangle. In this embodiment, the device will maintain the state of the persistent cropping mask rectangle (e.g., the size, location, orientation and other characteristics of the cropping mask rectangle) after the device detects liftoff of the contact. In some embodiments the state of the persistent cropping mask rectangle is maintained for a predetermined time (e.g., 15 seconds) or until the user performs a predetermined action (e.g., selecting a button to leave the cropping mask rectangle manipulation mode). As described in greater detail above, if the user makes contact with the touch-sensitive surface while the state of the persistent cropping mask rectangle is being maintained (e.g., before 15 seconds have elapsed), then the user may resume manipulating the cropping mask rectangle.

As one example, a device detects first and second contacts on a touch-sensitive surface (e.g., 5002 in FIG. 5F), and detects movement of the first contact (e.g., 5010-3 in FIG. 5F). In this example, the device resizes the cropping mask rectangle (5008 in FIG. 5F by moving the right edge of the cropping mask rectangle in accordance with the movement of the first contact 5010-3 to the right of the touch-sensitive surface and moving the top edge of the cropping mask rectangle in accordance with the movement of the first contact 5010-3 towards the top of the touch-sensitive surface, thereby increasing the size of the cropping mask rectangle. Continuing this example, the device detects liftoff of the first contact 5010-3. In this example, the cropping mask rectangle is persistent and its state is maintained by the device even after the liftoff is detected. Continuing the example, the device detects a third contact (i.e., a new contact) at the location of the initial position of the first contact 5010-3 while still detecting the second contact. Then, the device detects movement of the third contact that is substantially similar to the previous movement of the first contact. In response, the device moves the top edge and the right edge of the cropping mask rectangle in accordance with the movement of the third contact on the touch-sensitive surface. Thus, the movement of the third contact further increases the size of the cropping mask rectangle.

It should be understood that while this example illustrates two successive contacts moving in the same direction, the first contact and the third contact could move in any direction. For example, the first contact could move up and to the right while the third contact moves down and to the right. Alternatively, the third contact could retrace the movement of the first contact in the opposite direction, effectively undoing the changes made in response to the movement of the first contact. Similarly while this example illustrates the liftoff of only one contact, it should be understood that both contacts could be lifted off of the touch-sensitive surface and two new contacts could be detected, without departing from the scope of method described herein.

In some embodiments, a timer is set for a predefined amount of time (e.g., 0.2 seconds) when the device detects that the first or second contact is stationary. If the timer expires before the device detects motion of the stationary contact on the touch-sensitive surface, the history of events for the first and second contacts on the touch-sensitive surface is cleared.

In some embodiments, while continuing to detect the first contact and the second contact on the touch-sensitive surface, the device detects a third contact on the touch-sensitive surface, and continues to concurrently move on the display two edges of the cropping mask rectangle that correspond to the first contact in accordance with the detected movement of the first contact, including horizontally moving one of the two edges and vertically moving the other of the two edges without respect to the third detected contact (658). In effect, the device ignores the third detected contact.

In some embodiments, after a third contact is detected, the device detects a lift off of the second contact from the touch-sensitive surface. While continuing to detect the first contact and the third contact on the touch-sensitive surface, the device determines which contact of the first contact and the third contact is a topmost contact on the touch-sensitive surface; determines which contact of the first contact and the third contact is a bottommost contact on the touch-sensitive surface; determines which contact of the first contact and the third contact is a leftmost contact on the touch-sensitive surface; determines which contact of the first contact and the third contact is a rightmost contact on the touch-sensitive surface; detects movement of the third contact across the touch-sensitive surface; and concurrently moves, on the display, two edges of the cropping mask rectangle that correspond to the third contact in accordance with the detected movement of the third contact, including horizontally moving one of the two edges and vertically moving the other of the two edges (660). Thus, in these embodiments, the device uses the first and third fingers to manipulate the cropping mask rectangle 5008 despite having changed fingers.

Complementary conventional methods of adjusting the size and location of the cropping mask rectangle may also be used. In some embodiments, the device adjusts (662) the cropping mask rectangle in response to detecting manipulation of one or more handles on the cropping mask rectangle. For example, in FIG. 5H, a cursor 5042 controlled by a mouse or finger contact (e.g., 5010-5) may be used to manipulate a handle on the cropping mask rectangle to precisely adjust an edge or corner of the cropping mask rectangle.

In some embodiments, the device crops (664) the digital image with the cropping mask rectangle (e.g., FIG. 5J).

In some embodiments, the device translates (666) the cropped digital image. For example, in FIG. 5K, the device translates the cropped digital image 5052 in response to user input via a mouse or finger contact (e.g., 5010-7).

FIGS. 7A-7F are flow diagrams illustrating a method of manipulating a digital image and a cropping mask in accordance with some embodiments. The method 700 is performed at a computing device (e.g., 300, FIG. 3) with a display and a touch-sensitive surface. Some operations in method 700 may be combined and/or the order of some operations may be changed.

In some embodiments, the touch-sensitive surface is separate from the display (e.g., surface 5002 is separate from display 5004 in FIG. 5A). In some embodiments, the touch-sensitive surface is a touch pad (e.g., 5002, FIG. 5A or 355, FIG. 3).

In some embodiments, the touch-sensitive surface is on the display. In other words, the display is a touch screen display (e.g., 112, FIG. 2). In some embodiments, the method is performed at a portable multifunction device with a touch screen display (e.g., portable multifunction device 100). In some embodiments, As described below, the method 700 provides an intuitive way to position, adjust, and otherwise manipulate a digital image and a cropping mask rectangle at a computing device with a display and a touch-sensitive surface. The method reduces the cognitive burden on a user when manipulating and cropping a digital image, thereby creating a more efficient human-machine interface. For battery-operated computing devices, enabling a user to perform image manipulation and cropping faster and more efficiently conserves power and increases the time between battery charges.

The device simultaneously displays (702) on the display 5004: a digital image 5006 and a cropping mask rectangle 5008 for the digital image (e.g., see FIG. 5A). The digital image 5006 has an image location on the display and an image area. The cropping mask rectangle 5008 has four edges comprising a top edge, a bottom edge, a left edge, and a right edge. In some embodiments, the top and bottom edges are horizontal lines and the left and right edges are vertical lines (704). In some embodiments, the digital image 5006 and the cropping mask rectangle 5008 are simultaneously displayed in an image editing application (e.g., 144, FIG. 3), a drawing application (e.g., 380, FIG. 3), a presentation application (e.g., 382, FIG. 3), a word processing application (e.g., 384, FIG. 3), a website creation application (e.g., 386, FIG. 3), a disk authoring application (e.g., 388, FIG. 3), or a spreadsheet application (e.g., 390, FIG. 3) (706).

In some embodiments, the device enters (708) a digital image manipulation mode in response to detecting a first predefined user action (e.g., a double tap gesture on surface 5002, a tap gesture on a control icon, or a mouse click on a control icon).

Operations 710-736, discussed below, are performed while the computing device is in the digital image manipulation mode.

In some embodiments, while the computing device is in the digital image manipulation mode, the device provides (710) a visual indicator that the digital image can be manipulated (e.g., highlighting the border of the digital image 5006, FIG. 5A).

The device detects (712) a first contact and a second contact concurrently on the touch-sensitive surface (e.g., first contact 5010-1 and second contact 5010-2, FIG. 5A). For example, the device may detect two finger contacts on the touch-sensitive surface at the same time or detect contacts by one finger and a stylus or pen on the touch-sensitive surface at the same time.

In some embodiments, while the computing device is in the digital image manipulation mode, the device determines (714) a position of the first contact on the touch-sensitive surface (e.g., the position of contact 5010-1 on surface 5002, FIG. 5A). In some embodiments, while the computing device is in the digital image manipulation mode, the device determines (716) a position of the second contact on the touch-sensitive surface (e.g., the position of contact 5010-2 on surface 5002, FIG. 5A).

Operations 718-736, discussed below, are performed while continuing to detect the first contact 5010-1 and the second contact 5010-2 on the touch-sensitive surface.

The device detects (724) movement of at least one of the first contact 5010-1 and the second contact 5010-2 across the touch-sensitive surface 5002.

In some embodiments, while the computing device is in the digital image manipulation mode, the device determines (718) a location between the first contact and the second contact on the touch-sensitive surface (e.g., 5018-*c*, a midpoint or centroid of the two contacts 5010-1-*c* and 5010-2-*c*, FIG. 5C). While continuing to detect the first contact and the second contact on the touch-sensitive surface, the device determines (726) a change in the location between the first contact and the second contact on the touch-sensitive surface (e.g., a change 5020 in the location of the midpoint or centroid of the two contacts to 5018-*d* (FIG. 5C) due to the movement of at least one of the contacts).

The device changes (728) the image location on the display in accordance with the change 5020 in the location between the first contact and the second contact on the touch-sensitive surface (e.g., translating the centroid of the digital image in accordance with the translation of the midpoint or centroid of the two contacts on the touch-sensitive surface). For example, the device may translate the centroid of the digital image 5006 in proportion to the translation 5020 of the midpoint or centroid 5018 of the two contacts on the touch-sensitive surface.

In some embodiments, while the computing device is in the digital image manipulation mode, the device determines (720) a distance between the first contact and the second contact on the touch-sensitive surface (e.g., 5022-*e*, the distance between the respective centroids of contacts 5010-1-*e* and 5010-2-*e*, FIG. 5D). While continuing to detect the first contact and the second contact on the touch-sensitive surface, the device determines (730) a change in the distance between the first contact and the second contact on the touch-sensitive surface (e.g., in FIG. 5D, a change in the distance 5022 between respective centroids of contacts 5010-1 and 5010-2, from 5022-*e* to 5022-*f* due to the movement of at least one of the contacts).

The device changes (732) the image area in accordance with the change in the distance 5022 between the first contact and the second contact on the touch-sensitive surface. For example, the image area may be enlarged in accordance with a depinching gesture between the first contact and the second contact or reduced in accordance with a pinching gesture between the first contact and the second contact. In some embodiments, the image 5006 is enlarged or reduced without concurrent rotation of the image (i.e., the image 5006 maintains its orientation). In some embodiments, the image is rotated (e.g., the image changes its orientation in response to detection of a rotating gesture that includes rotation of an axis between the two contacts relative to a fixed axis on the touch-sensitive surface). In some embodiments, the image is enlarged or reduced with concurrent rotation of the image (e.g., the image changes its orientation in response to detection of a depinching gesture that also includes some rotation of the two fingers performing the depinching gesture, in other words, the depinching gesture is combined with a rotating gesture). In some embodiments, the device changes the image area in proportion to the change in the distance 5022 between the first contact and the second contact.

In some embodiments, while the computing device is in the digital image manipulation mode, while continuing to detect the first contact and the second contact on the touch-sensitive surface, the device rotates (736) the digital image in accordance with a change in an angle between an axis between the first contact and the second contact and an axis corresponding to the touch-sensitive surface. For example, in FIG. 5B, the device rotates the digital image 5006 in accordance with a change in an angle between an axis 5014 between the first contact and the second contact and an axis 5016 corresponding to the touch-sensitive surface.

In some embodiments, while the computing device is in the digital image manipulation mode, the device determines (722) an angle between an axis 5014-*a* between the first contact and the second contact and an axis corresponding to the touch-sensitive surface (e.g., a vertical, horizontal 5016, or diagonal axis of the touch-sensitive surface). While continuing to detect the first contact and the second contact on the touch-sensitive surface, the device determines (734) a change in the angle between the axis 5014 between the first contact and the second contact and the axis 5016 corresponding to the touch-sensitive surface. For example, in FIG. 5B, the device determines the change in the angle between the axis 5014 and the axis 5016 as contact 5010-2 moves from position a to position b. The device rotates (736) the digital image in accordance with (e.g., in proportion to) the change in the angle between the axis 5014 between the first contact and the second contact and the axis 5016 corresponding to the touch-sensitive surface.

Some or all of operations 712-736 may be repeated in response to detecting lift off of one or both contacts (5010-1 and 5010-2) and then detecting again two simultaneous contacts on the touch-sensitive surface 5002. For a user, these operations provide a fast, intuitive way to manipulate the digital image 5006 with two contacts on the touch-sensitive surface.

In some embodiments, the device enters (738) a cropping mask rectangle manipulation mode in response to detecting a second predefined user action (e.g., a double tap gesture on surface 5002, a tap gesture on a control icon, or a mouse click on a control icon).

Operations 740-788, discussed below, are performed while the computing device is in the cropping mask rectangle manipulation mode.

In some embodiments, while the computing device is in the cropping mask rectangle manipulation mode, the device provides (740) a visual indicator that the cropping mask rectangle can be manipulated (e.g., highlighting the border of the cropping mask rectangle, FIG. 5E).

The device detects (742) a third contact and a fourth contact concurrently on the touch-sensitive surface (e.g., third contact 5010-3 and fourth contact 5010-4, FIG. 5E). For example, the device may detect two finger contacts on the touch-sensitive surface at the same time or detect contacts by one finger and a stylus or pen on the touch-sensitive surface at the same time. In some embodiments, the cropping mask rectangle 5008 has an initial height and width that are independent of initial positions of the third contact and fourth contact. For example in FIG. 5E, the height and width of the cropping mask rectangle 5008 do not depend on the initial positions of contacts 5010-3 and 5010-4.

In some embodiments, the third contact and fourth contact are displaced (744) from the edges of the cropping mask rectangle.

In some embodiments, the third contact and fourth contact are displaced (746) from the cropping mask rectangle 5008. The third contact and the fourth contact are not required to touch the cropping mask rectangle or any visible (or hidden) handles on the cropping mask rectangle in order to manipulate the cropping mask rectangle. The vertical or horizontal movements of edges of the cropping mask rectangle in response to detected movements of the third contact and the fourth contact are independent of any (incidental) touching of the cropping mask rectangle (or any handles on the cropping mask rectangle) by the third contact or the fourth contact. If the touch-sensitive surface 5002 is a touchpad, the third contact and the fourth contact do not touch the cropping mask rectangle at all (e.g., third contact 5010-3 and fourth contact 5010-4, FIG. 5E). In some embodiments, the third contact and the fourth contact may be detected anywhere on the touch-sensitive surface.

In other words, in accordance with some embodiments, the third contact and the fourth contact are not associated with a cursor or cropping mask rectangle handles (e.g., 5011 in FIG. 5E). For example, compare FIG. 5H, which shows a conventional cursor interaction with a cropping mask rectangle handle, with FIG. 5F, an exemplary illustration of the present invention. In FIG. 5H, a cursor 5042 controlled by a mouse or finger contact (e.g., 5010-5) is used to manipulate a handle on a cropping mask rectangle to precisely adjust an edge or corner of the cropping mask rectangle 5008. In contrast, as shown in FIG. 5F, there is no cursor, and the contacts 5010-3 and 5010-4 are not associated with the handles on a cropping mask rectangle 5008. Thus, the device does not manipulate the cropping mask rectangle 5008 based on control of the movements of a cursor or cropping mask rectangle handles by contacts 5010-3 and 5010-4. Instead, when the device is in a cropping mask rectangle manipulation mode, the movement of a contact (e.g., the movement of contact 5010-3 from position a to position b in FIG. 5F) moves the edges of the cropping mask rectangle 5008 based at least in part on the magnitude and direction of movement of the contact 5010-3. To resize the cropping mask rectangle, a user does not have to use a cursor (or any other means) to select a cropping mask rectangle handle. Instead, the user can simply place two contacts on the touch-sensitive surface and move one or both of the contacts, as shown in FIGS. 5F and 5G and described in greater detail below.

In some embodiments, the third contact and the fourth contact must be detected in a predefined area on the touch-sensitive surface, such as an area that corresponds to or displays the digital image, an area that corresponds to or displays the area within the edges of the cropping mask rectangle, or an area without activatable control icons.

In some embodiments, while the computing device is in the cropping mask rectangle manipulation mode, the device determines (748) a position of the third contact on the touch-sensitive surface (e.g., the position of contact 5010-3 on surface 5002, FIG. 5E). In some embodiments, while the computing device is in the cropping mask rectangle manipulation mode, the device determines (750) a position of the fourth contact on the touch-sensitive surface (e.g., the position of contact 5010-4 on surface 5002, FIG. 5E).

The device determines (752) which contact of the third contact and the fourth contact is a topmost contact on the touch-sensitive surface. The device determines (754) which contact of the third contact and the fourth contact is a bottommost contact on the touch-sensitive surface. The device determines (756) which contact of the third contact and the fourth contact is a leftmost contact on the touch-sensitive surface. The device determines (758) which contact of the third contact and the fourth contact is a rightmost contact on the touch-sensitive surface. For example, in FIG. 5E, contact 5010-3 is both the topmost contact and the rightmost contact because contact 5010-3 is above and to the right of contact 5010-4. Similarly, in FIG. 5E, contact 5010-4 is both the bottommost contact and the leftmost contact because contact 5010-4 is below and to the left of contact 5010-3. In accordance with these determinations, two of the edges of the cropping mask rectangle correspond to the first contact and two of the edges correspond to the second contact.

Operations 760-788, discussed below, are performed while continuing to detect the third contact 5010-3 and the fourth contact 5010-4 on the touch-sensitive surface.

The device detects (760) movement of the third contact 5010-3 across the touch-sensitive surface. The device concurrently moves (762) on the display two edges of the cropping mask rectangle that correspond to the third contact in accordance with the detected movement of the third contact, including horizontally moving one of the two edges and vertically moving the other of the two edges. In other words, in accordance with some embodiments, the device concurrently moves on the display a first edge and a second edge of the cropping mask rectangle that correspond to the third contact in accordance with the detected movement of the third contact, including horizontally moving the first edge and vertically moving the second edge, wherein moving the first edge is independent of moving the second edge. For example, in FIG. 5F, the device detects movement of contact 5010-3 from position a (e.g., an "initial" position 5010-3-*a*) to position b (e.g., a "final" position 5010-3-*b*). The device concurrently moves the top edge and the right edge of the cropping mask rectangle 5008 in accordance with the detected movement of contact 5010-3. The top edge and the right edge correspond to contact 5010-3 because this contact is both the topmost contact and the rightmost contact. As shown in FIG. 5F, the right edge is moved horizontally and the top edge is moved vertically.

In other words, in some embodiments, the movement of the third contact is part of a location-independent gesture performed within a predefined region of the touch-sensitive surface. Thus, in some embodiments, the movement of the first edge of the cropping mask rectangle and the movement of the second edge of the cropping mask rectangle are determined by location-independent elements of the gesture. In some embodiments the predefined region is a region of a touch-sensitive display that is outside of an area with activatable control icons (e.g., the region including a tray 408 in FIG. 4B with icons for frequently used applications). In some embodiments the predefined region is a region of a touch-sensitive surface that is separate from the display (e.g., 5002 in FIG. 5F). In some embodiments, the predefined region is a region outside of a scroll region (e.g., a region outside of a predefined region on the touch-sensitive surface that is associated with a scrolling a user interface).

In some embodiments, a location-independent gesture is any one of the location independent gestures described previously (e.g., the pinching gesture, the depinching gesture, and/or the rotating gesture described herein with reference to FIGS. 5A-5D). These gestures are location-independent gestures because the magnitude and direction of movement of the edges of the cropping mask rectangle that are associated with the third contact is the same without regard to the location of the gesture on the touch-sensitive surface. It should be understood that the location-independent gesture can be any gesture in a predefined area on a touch-sensitive surface which has a meaning that is invariant when the gesture is performed in a different location within the predefined area. As one example, in FIG. 5F, the predefined region is the whole touch-sensitive surface 5002 and the gesture is detection of two contacts 5010-3 and 5010-4 in the predefined region and detected movement 5024 of one of the contacts 5010-3 from an initial location of the contact 5010-3-*a* to a final location of the contact 5010-3-*b*. In this example, the gesture is location-independent because the movement of the top edge and the right edge would be the same if the entire gesture (e.g., the initial contacts 5010-4, 5010-3-*a* and the movement 5024 of the one of the contacts 5010-3-*a* to a new contact location 5010-3-*b*) was shifted to the right or the left and/or up or down on the touch-sensitive surface 5002, so long as the gesture is performed within the predefined area.

In some embodiments, while continuing to detect the third contact and the fourth contact on the touch-sensitive surface: the device: detects (764) movement of both the third contact 5010-3 and the fourth contact 5010-4 across the touch-sensitive surface; vertically moves (766) the top edge of the cropping mask rectangle in accordance with vertical movement of the topmost contact on the touch-sensitive surface; vertically moves (768) the bottom edge of the cropping mask rectangle in accordance with vertical movement of the bottommost contact on the touch-sensitive surface; horizontally moves (770) the left edge of the cropping mask rectangle in accordance with horizontal movement of the leftmost contact on the touch-sensitive surface; and horizontally moves (772) the right edge of the cropping mask rectangle in accordance with horizontal movement of the rightmost contact on the touch-sensitive surface. For example, in FIG. 5G, the device detects movement of both the first contact 5010-3 and the second contact 5010-4 across the touch-sensitive surface (e.g., movements 5030 and 5036, respectively). The top edge of the cropping mask rectangle 5008 moves vertically in accordance with vertical movement 5032 of the topmost contact (5010-3 in this example). The bottom edge of the cropping mask rectangle 5008 moves vertically in accordance with vertical movement 5038 of the bottommost contact (5010-4 in this example). The left edge of the cropping mask rectangle 5008 moves horizontally in accordance with horizontal movement 5040 of the leftmost contact (5010-4 in this example). The right edge of the cropping mask rectangle 5008 moves horizontally in accordance with horizontal movement 5034 of the rightmost contact (5010-3 in this example). Note that with these vertical and horizontal movements of the cropping mask rectangle edges, the cropping mask rectangle 5008 may change its size and location on the display 5004, but the cropping mask rectangle will not rotate on the display.

Note that with these vertical and horizontal movements of the cropping mask rectangle edges, the cropping mask rectangle 5008 may change its size and location on the display 5004, but the cropping mask rectangle 5008 will not rotate on the display. In other words, in accordance with some embodiments, when the movement of the third contact is two-dimensional movement across the touch-sensitive surface, an orientation of the top edge, bottom edge, left edge, and right edge of the cropping mask rectangle 5008 on the display remain unchanged.

In some embodiments, in response to detecting concurrent movement of the third contact and the fourth contact, the device concurrently moves (774) at least two of the edges, including at least one edge corresponding to the third contact and at least one edge corresponding to the fourth contact. For example, in FIG. 5G, in response to detecting concurrent movement of the third contact 5010-3 and the fourth contact 5010-4, the device concurrently moves two edges corresponding to the third contact 5010-3 (the top edge and the right edge in this example) and two edges corresponding to the fourth contact 5010-4 (the bottom edge and the left edge in this example).

In some embodiments, the device suppresses (775) jitter associated with the third contact and the fourth contact. In some embodiments, the device maintains a corner of the cropping mask rectangle that corresponds to a contact at a fixed location on the display. In other words, the device does not move two edges of the cropping mask rectangle that correspond to a contact despite detecting movement of the contact. In some embodiments, the device may use code for suppressing jitter and pinning a corner of the cropping mask rectangle similar to the exemplary code described above with respect to operation 643 (FIG. 6C).

In some embodiments, the device detects (776) movement of the fourth contact across the touch-sensitive surface by less than a predefined amount (e.g., an amount corresponding to less than 5-10 pixels on the display), and the device adjusts (778) the cropping mask rectangle while maintaining a corner of the cropping mask rectangle that corresponds to the fourth contact at a fixed location on the display. For example, in FIG. 5F, the device detects little or no movement of the fourth contact 5010-4, and the device adjusts the cropping mask rectangle while maintaining the bottom, left corner of the cropping mask rectangle 5008 (i.e., the corner that corresponds to the fourth contact 5010-4) at a fixed location on the display 5004. In FIG. 5F, the bottom, left corner of the cropping mask rectangle 5008 corresponds to the fourth contact 5010-4 because the fourth contact is both the bottommost contact and the leftmost contact.

In other words, in some embodiments, in accordance with determining which contact of the third contact and the fourth contact is the topmost, bottommost, leftmost and rightmost, the device dynamically associates the third contact and fourth contact with diagonally opposite corners of the cropping mask rectangle. In some embodiments, the dynamic association is performed without changing the initial height and width of the cropping mask rectangle. Thus, in this embodiment, instead of causing the corners of the cropping mask rectangle to "snap-to" the location of the contacts that are associated with the corners, the corners are dynamically associated with the third contact and the fourth contact so that the movement of a respective contact (e.g., the third contact) results in a movement of the corner associated with the respective contact (e.g., the third contact), wherein the movement of the corner is based on the movement of the respective contact. For example, if the third contact is associated with the topmost and the rightmost side, then the third contact is associated with the upper right hand corner of the cropping mask rectangle.

In some embodiments, the device detects (780) movement of the third contact across the touch-sensitive surface without detecting movement of the fourth contact across the touch-sensitive surface, and the device adjusts (782) the cropping mask rectangle while maintaining a corner of the cropping mask rectangle that corresponds to the second contact at a fixed location on the display (e.g., see FIG. 5F and the preceding paragraph).

In some embodiments, moving a respective edge of the cropping mask rectangle in accordance with movement of a respective contact comprises moving (784) the respective edge of the cropping mask rectangle in proportion to a component of movement of the respective contact. For example, in FIG. 5G, the top edge of the cropping mask rectangle 5008 is moved in proportion to the vertical component of movement 5032 of the topmost contact (contact 5010-3); the bottom edge of the cropping mask rectangle 5008 is moved in proportion to the vertical component of movement 5038 of the bottommost contact (contact 5010-4); the left edge of the cropping mask rectangle 5008 is moved in proportion to the horizontal component of movement 5040 of the leftmost contact (contact 5010-4); and the right edge of the cropping mask rectangle 5008 is moved in proportion to the horizontal component of movement 5034 of the rightmost contact (contact 5010-3).

In other words, the movement of the third contact (e.g., 5010-3 in FIG. 5F) is from an initial position (e.g., 5010-3-a in FIG. 5F) on the touch-sensitive surface to a final position (e.g., 5010-3-b in FIG. 5F) on the touch-sensitive surface and the concurrent movement of the two edges of the cropping mask rectangle is dependent only on relative movement of the third contact (e.g., 5010-3 in FIG. 5F) from the initial position of the third contact to a final position.

Exemplary code for moving respective edges of the cropping mask rectangle in accordance with movement of respective contacts is described above with respect to an analogous operation (652) in FIG. 6.

In some embodiments, moving respective edges of the cropping mask rectangle in accordance with movement of respective contacts comprises snapping (786) the cropping mask rectangle edges to a series of predefined mask aspect ratios as the respective contacts move (e.g., 1:1, 2:3, 3:2, 3:5, 5:3, 5:7, 7:5, 8:10, 10:8, 3:4, 4:3, 16:9, 9:16, and/or the display aspect ratio). In some embodiments, the aspect ratio changes or appears to change continuously on the display.

In some embodiments, moving respective edges of the cropping mask rectangle in accordance with movement of respective contacts comprises constraining (788) the cropping mask rectangle to a predefined mask aspect ratio as the respective contacts move (e.g., 1:1, 2:3, 3:2, 3:5, 5:3, 5:7, 7:5, 8:10, 10:8, 3:4, 4:3, 16:9, 9:16, or the display aspect ratio).

Some or all of operations 742-788 may be repeated in response to detecting lift off of one or both contacts (5010-3 and 5010-4) and then detecting again two simultaneous contacts on the touch-sensitive surface 5002. For a user, these operations provide a fast, intuitive way to manipulate the cropping mask rectangle 5008 with two contacts on the touch-sensitive surface.

In other words, in some embodiments, after the device moves, on the display, two edges of the cropping mask rectangle that correspond to the third contact in accordance with the detected movement of the third contact, including horizontally moving one of the two edges and vertically moving the other of the two edges, the device detects a liftoff of the third contact. In some embodiments, the device detects a fifth contact concurrently with the fourth contact on the touch-sensitive surface; determines which contact of the fourth contact and the fifth contact is a topmost contact on the touch-sensitive surface; determines which contact of the fourth contact and the fifth contact is a bottommost contact on the touch-sensitive surface; determines which contact of the fourth contact and the fifth contact is a leftmost contact on the touch-sensitive surface; determines which contact of the fourth contact and the fifth contact is a rightmost contact on the touch-sensitive surface. In some embodiments, while continuing to detect the fourth contact and the fifth contact on the touch-sensitive surface, the device: detects movement of the fifth contact across the touch-sensitive surface; and concurrently moves, on the display, two edges of the cropping mask rectangle that correspond to the fifth contact in accordance with the detected movement of the fifth contact, including horizontally moving one of the two edges and vertically moving the other of the two edges.

The cropping mask rectangle is typically a persistent cropping mask rectangle (e.g., a persistent user interface object). In some embodiments, while the user is in a cropping mask rectangle manipulation mode, the user can begin manipulating the cropping mask rectangle (e.g., moving one or more sides of the cropping mask rectangle to resize the cropping mask rectangle), and then liftoff one or more of the contacts that were used to manipulate the cropping mask rectangle. In this embodiment, the device will maintain the state of the persistent cropping mask rectangle (e.g., the size, location, orientation and other characteristics of the cropping mask rectangle) after the device detects liftoff of the contact. In some embodiments the state of the persistent cropping mask rectangle is maintained for a predetermined time (e.g., 15 seconds) or until the user performs a predetermined action (e.g., selecting a button to leave the cropping mask rectangle manipulation mode). As described in greater detail above, if the user makes contact with the touch-sensitive surface while the state of the persistent cropping mask rectangle is being maintained (e.g., before 15 seconds have elapsed), then the user may resume manipulating the cropping mask rectangle.

As one example, a device detects third and fourth contacts on a touch-sensitive surface (e.g., 5002 in FIG. 5F), and detects movement of the third contact (e.g., 5010-3 in FIG. 5F). In this example, the device resizes the cropping mask rectangle (5008 in FIG. 5F by moving the right edge of the cropping mask rectangle in accordance with the movement of the third contact 5010-3 to the right of the touch-sensitive surface and moving the top edge of the cropping mask rectangle in accordance with the movement of the third contact 5010-3 towards the top of the touch-sensitive surface, thereby increasing the size of the cropping mask rectangle. Continuing this example, the device detects liftoff of the third contact 5010-3. In this example, the cropping mask rectangle is persistent and its state is maintained by the device even after the liftoff is detected. Continuing the example, the device detects a fifth contact (i.e., a new contact) at the location of the initial position of the third contact 5010-3 while still detecting the fourth contact. Then, the device detects movement of the fifth contact that is substantially similar to the previous movement of the third contact. In response, the device moves the top edge and the right edge of the cropping mask rectangle in accordance with the movement of the fifth contact on the touch-sensitive surface. Thus, the movement of the fifth contact further increases the size of the cropping mask rectangle.

It should be understood that while this example illustrates two successive contacts moving in the same direction, the third contact and the fifth contact could move in any direction. For example, the third contact could move up and to the right while the fifth contact moves down and to the right. Alternatively, the fifth contact could retrace the movement of the third contact in the opposite direction, effectively undoing the changes made in response to the movement of the third contact. Similarly while this example illustrates the liftoff of only one contact, it should be understood that both contacts could be lifted off of the touch-sensitive surface and two new contacts could be detected, without departing from the scope of method described herein.

In some embodiments, while continuing to detect the third contact and the fourth contact on the touch-sensitive surface, the device detects a fifth contact on the touch-sensitive surface, and continues to concurrently move, on the display, two edges of the cropping mask rectangle that correspond to the third contact in accordance with the detected movement of the third contact, including horizontally moving one of the two edges and vertically moving the other of the two edges without respect to the third detected contact (790). In effect, the device ignores the fifth detected contact.

In some embodiments, after a fifth contact is detected, the device detects a lift off of the fourth contact from the touch-sensitive surface. While continuing to detect the third contact and the fifth contact on the touch-sensitive surface, the device determines which contact of the third contact and the fifth contact is a topmost contact on the touch-sensitive surface; determines which contact of the third contact and the fifth contact is a bottommost contact on the touch-sensitive surface; determines which contact of the third contact and the fifth contact is a leftmost contact on the touch-sensitive surface; determines which contact of the third contact and the fifth contact is a rightmost contact on the touch-sensitive surface; detects movement of the fifth contact across the touch-sensitive surface; and concurrently moves, on the display, two edges of the cropping mask rectangle that correspond to the fifth contact in accordance with the detected movement of the fifth contact, including horizontally moving one of the two edges and vertically moving the other of the two edges (792). Thus, in these embodiments, the device uses the fingers corresponding to the third and fifth contacts to manipulate the cropping mask rectangle 5008 despite having changed fingers.

Complementary conventional methods of adjusting the size and location of the cropping mask rectangle may also be used. In some embodiments, the device adjusts (794) the cropping mask rectangle in response to detecting manipulation of one or more handles on the cropping mask rectangle. For example, in FIG. 5H, a cursor 5042 controlled by a mouse or finger contact (e.g., 5010-5) may be used to manipulate a handle on the cropping mask rectangle to precisely adjust an edge or corner of the cropping mask rectangle.

In some embodiments, the device crops (796) the digital image with the cropping mask rectangle (e.g., FIG. 5J).

In some embodiments, the device translates (798) the cropped digital image. For example, in FIG. 5K, the device translates the cropped digital image 5052 in response to user input via a mouse or finger contact (e.g., 5010-7).

FIGS. 8A-8D are flow diagrams illustrating a method of manipulating a cropping mask in accordance with some embodiments. The method 800 is performed at a computing device (e.g., 300, FIG. 3) with a display and a touch-sensitive surface. Some operations in method 800 may be combined and/or the order of some operations may be changed.

In some embodiments, the touch-sensitive surface is separate from the display (e.g., surface 5002 is separate from display 5004 in FIG. 5E). In some embodiments, the touch-sensitive surface is a touch pad (e.g., 5002, FIG. 5E or 355, FIG. 3).

In some embodiments, the touch-sensitive surface is on the display. In other words, the display is a touch screen display (e.g., 112, FIG. 2). In some embodiments, the method is performed at a portable multifunction device with a touch screen display (e.g., portable multifunction device 100).

As described below, the method 800 provides an intuitive way to position, adjust, and otherwise manipulate a cropping mask rectangle at a computing device with a display and a touch-sensitive surface. The method reduces the cognitive burden on a user when cropping a digital image, thereby creating a more efficient human-machine interface. For battery-operated computing devices, enabling a user to perform image cropping faster and more efficiently conserves power and increases the time between battery charges.

The device simultaneously displays (802) on the display 5004: a digital image 5006 and a cropping mask rectangle 5008 for the digital image (e.g., see FIG. 5E). The cropping mask rectangle 5008 has a mask location on the display, a mask area, a mask height, a mask width, and a mask aspect ratio between the mask width and the mask height. In some embodiments, the digital image 5006 and the cropping mask rectangle 5008 are simultaneously displayed in an image editing application (e.g., 144, FIG. 3), a drawing application (e.g., 380, FIG. 3), a presentation application (e.g., 382, FIG. 3), a word processing application (e.g., 384, FIG. 3), a website creation application (e.g., 386, FIG. 3), a disk authoring application (e.g., 388, FIG. 3), or a spreadsheet application (e.g., 390, FIG. 3) (804).

In some embodiments, the device provides (806) a visual indicator that the cropping mask rectangle can be manipulated (e.g., highlighting the border of the cropping mask rectangle, FIG. 5E).

The device detects (808) a first contact and a second contact concurrently on the touch-sensitive surface (e.g., first contact 5010-3 and second contact 5010-4, FIG. 5E). For example, the device may detect two finger contacts on the touch-sensitive surface at the same time or detect contacts by one finger and a stylus or pen on the touch-sensitive surface at the same time.

In some embodiments, the first contact and the second contact are displaced (810) from the edges of the cropping mask rectangle.

In some embodiments, the first contact and second contact are displaced (812) from the cropping mask rectangle. The first contact and the second contact are not required to touch the cropping mask rectangle or any visible (or hidden) handles on the cropping mask rectangle in order to manipulate of the cropping mask rectangle. The vertical or horizontal movements of edges of the cropping mask rectangle in response to detected movements of the first contact and the second contact are independent of any (incidental) touching of the cropping mask rectangle (or any handles on the cropping mask rectangle) by the first contact or the second contact. If the touch-sensitive surface 5002 is a touchpad, the first contact and the second contact do not touch the cropping mask rectangle at all (e.g., first contact 5010-3 and second contact 5010-4, FIG. 5E). In some embodiments, the first contact and the second contact may be detected anywhere on the touch-sensitive surface. In some embodiments, the first contact and the second contact must be detected in a predefined area on the touch-sensitive surface, such as an area that corresponds to or displays the digital image, an area that corresponds to or displays the area within the edges of the cropping mask rectangle, or an area without activatable control icons.

In some embodiments, the device determines (814) a position of the first contact on the touch-sensitive surface (e.g., the position of contact 5010-3 on surface 5002, FIG. 5E). In some embodiments, the device determines (816) a position of the second contact on the touch-sensitive surface (e.g., the position of contact 5010-4 on surface 5002, FIG. 5E).

Operations 818-848, discussed below, are performed while continuing to detect the first contact 5010-3 and the second contact 5010-4 on the touch-sensitive surface.

The device detects (824) movement of at least one of the first contact and the second contact across the touch-sensitive surface.

In some embodiments, the device determines (818) an angle between an axis 5048-e between the first contact and the second contact and an axis corresponding to the touch-sensitive surface (e.g., a vertical, horizontal 5050-e, or diagonal axis of the touch-sensitive surface). While continuing to detect the first contact and the second contact on the touch-sensitive surface, the device determines (826) a change in the angle between the axis between the first contact and the second contact and the axis corresponding to the touch-sensitive surface. For example, in FIG. 5I, the device determines the change in the angle between the axis 5048 and the axis 5050 as contacts 5010-3 and 5010-4 move from respective positions e to respective positions f.

The device changes (828) the mask aspect ratio in accordance with the change in the angle between the axis 5048 between the first contact and the second contact and the axis 5050 corresponding to the touch-sensitive surface. For example, in FIG. 5I, the diagonal angle θ of the cropping mask rectangle changes from $\theta_e$ to $\theta_f$ (thereby changing the mask aspect ratio) in accordance with the change in the angle between the axis 5048 and the axis 5050. Exemplary code for changing the mask aspect ratio is as follows:

```
{
    CGFloat aspectRatio = (__cropRect.width/__cropRect.height);
    __cropRect.height = __defaultHeight*__lastScale.y;
    __cropRect.width = __cropRect.height*aspectRatio;
    __lastScale.x = [[touches matrix] scaleX];
    __lastScale.y = [[touches matrix] scaleY];
    CGFloat deltaRotation = [[touches matrix] rotation] - __lastRotation;
    __lastRotation = [[touches matrix] rotation];
    CGFloat diagonalLength = [LCMisc distanceFromPoint:CGPointZero toPoint:CGPointMake(__cropRect.width,__cropRect.height)];
    CGFloat newHeight = sin(__cropAngle)*diagonalLength;
```

-continued

```
    CGFloat newWidth = cos(_cropAngle)*diagonalLength;
    _cropRect.height = newHeight;
    _cropRect.width = newWidth;
    _cropAngle += deltaRotation;
}
```

The above code obtains the scale factor (_lastScale.x, _lastScale.y) of the detected contacts, and the "rotation" (or angle) between the detected contacts (_lastRotation) and a predefined axis (e.g., the x-axis of the touch-sensitive surface). For example, the "rotation" defined by the detected contacts can be the angle between a line (or axis) connecting centroids of the two contacts and a horizontal line (e.g., x-axis of the touch-sensitive surface). These scale and rotation values are obtained from so-called convenience functions that extract information from a touches transformation matrix, embodied in the [touches matrix] object, and are updated as the contacts change position on the touch-sensitive surface. The diagonal length (diagonalLength) of the cropping rectangle is computed using the width (_cropRect.width) and height (_cropRect.height) of the cropping rectangle, computed during the last iteration of the process implemented by this code. The computed width and height are based on the scaling factors and an initial or default size of the cropping rectangle (e.g., the default size may be the size of an image being cropped, or the default size may be a fixed, predefined size). Then the sin( ) and cos( ) functions are used with the current angle (see θ in FIG. 5I) of the cropping rectangle's diagonal and the diagonal length to calculate new lengths (_cropRect.height and _cropRect.width) of the sides of the cropping rectangle. Each iteration of the execution of this code uses values computed during the prior iteration.

In some embodiments, while continuing to detect the first contact 5010-3 and the second contact 5010-4 on the touch-sensitive surface, the device changes (832) the mask location on the display in accordance with a change in a location (e.g., a midpoint or centroid of the two contacts) between the first contact and the second contact on the touch-sensitive surface (e.g., translating the centroid of the cropping mask rectangle in accordance with the translation of the location between the two contacts on the touch-sensitive surface). This change in mask location is analogous to the change in digital image location described above with respect to FIG. 5C and an analogous description need not be repeated here.

In some embodiments, the device determines (820) a location between the first contact and the second contact on the touch-sensitive surface (e.g., a midpoint or centroid of the two contacts). While continuing to detect the first contact and the second contact on the touch-sensitive surface, the device determines (830) a change in the location between the first contact and the second contact on the touch-sensitive surface (e.g., a change in the midpoint or centroid of the two contacts due to the movement of at least one of the contacts), and the device changes (832) the mask location on the display in accordance with the change in the location between the first contact and the second contact on the touch-sensitive surface (e.g., translating the centroid of the cropping mask rectangle in accordance with the translation of the location between the two contacts on the touch-sensitive surface). This change in mask location is analogous to the change in digital image location described above with respect to FIG. 5C and an analogous description need not be repeated here.

In some embodiments, while continuing to detect the first contact and the second contact on the touch-sensitive surface, the device changes (836) the mask area in accordance with a change in a distance between the first contact and the second contact on the touch-sensitive surface (e.g., enlarging the mask area in accordance with a depinching gesture between the first contact and the second contact or reducing the mask area in accordance with a pinching gesture between the first contact and the second contact). This change in mask area is analogous to the change in digital image area described above with respect to FIG. 5D and an analogous description need not be repeated here.

In some embodiments, the device determines (822) a distance between the first contact and the second contact on the touch-sensitive surface. While continuing to detect the first contact and the second contact on the touch-sensitive surface, the device determines (834) a change in the distance between the first contact and the second contact on the touch-sensitive surface, and the device changes (836) the mask area in accordance with the change in the distance between the first contact and the second contact on the touch-sensitive surface (e.g., enlarging the mask area in accordance with a depinching gesture between the first contact and the second contact or reducing the mask area in accordance with a pinching gesture between the first contact and the second contact). This change in mask area is analogous to the change in digital image area described above with respect to FIG. 5D and an analogous description need not be repeated here.

In some embodiments, the device: detects (838) movement of the first contact across the touch-sensitive surface; detects (840) movement of the second contact across the touch-sensitive surface by less than a predefined amount (e.g., an amount corresponding to less than 5-10 pixels on the display); and adjusts (842) the cropping mask rectangle while maintaining a corner of the cropping mask rectangle that corresponds to the second contact at a fixed location on the display. For example, in FIG. 5F, the device detects little or no movement of the second contact 5010-4, and the device adjusts the cropping mask rectangle while maintaining the bottom, left corner of the cropping mask rectangle 5008 (i.e., the corner that corresponds to the second contact 5010-4) at a fixed location on the display 5004. In FIG. 5F, the bottom, left corner of the cropping mask rectangle 5008 corresponds to the second contact 5010-4 because the second contact is both the bottommost contact and the leftmost contact.

In some embodiments, the device detects (844) movement of the first contact across the touch-sensitive surface without detecting movement of the second contact across the touch-sensitive surface, and the device adjusts (846) the cropping mask rectangle while maintaining a corner of the cropping mask rectangle that corresponds to the second contact at a fixed location on the display (e.g., see FIG. 5F and the preceding paragraph).

In some embodiments, changing the mask aspect ratio comprises snapping (848) the cropping mask rectangle to a series of predefined mask aspect ratios (e.g., 1:1, 2:3, 3:2, 3:5, 5:3, 5:7, 7:5, 8:10, 10:8, 3:4, 4:3, 16:9, 9:16, and/or the display aspect ratio). In some embodiments, the aspect ratio changes or appears to change continuously on the display.

Some or all of operations 808-848 may be repeated in response to detecting lift off of one or both contacts (5010-3 and 5010-4) and then detecting again two simultaneous contacts on the touch-sensitive surface 5002. For a user, these operations provide a fast, intuitive way to manipulate the cropping mask rectangle 5008 with two contacts on the touch-sensitive surface.

Complementary conventional methods of adjusting the size and location of the cropping mask rectangle may also be used. In some embodiments, the device adjusts (850) the cropping mask rectangle in response to detecting manipulation of one or more handles on the cropping mask rectangle. For example, in FIG. 5H, a cursor 5042 controlled by a mouse or finger contact (e.g., 5010-5) may be used to manipulate a handle on the cropping mask rectangle to precisely adjust an edge or corner of the cropping mask rectangle.

In some embodiments, the device crops (852) the digital image with the cropping mask rectangle (e.g., FIG. 5J).

In some embodiments, the device translates (854) the cropped digital image. For example, in FIG. 5K, the device translates the cropped digital image 5052 in response to user input via a mouse or finger contact (e.g., 5010-7).

FIGS. 9A-9E are flow diagrams illustrating a method of manipulating a digital image and a cropping mask in accordance with some embodiments. The method 900 is performed at a computing device (e.g., 300, FIG. 3) with a display and a touch-sensitive surface. Some operations in method 900 may be combined and/or the order of some operations may be changed.

In some embodiments, the touch-sensitive surface is separate from the display (e.g., surface 5002 is separate from display 5004 in FIG. 5A). In some embodiments, the touch-sensitive surface is a touch pad (e.g., 5002, FIG. 5A or 355, FIG. 3).

In some embodiments, the touch-sensitive surface is on the display. In other words, the display is a touch screen display (e.g., 112, FIG. 2). In some embodiments, the method is performed at a portable multifunction device with a touch screen display (e.g., portable multifunction device 100).

As described below, the method 900 provides an intuitive way to position, adjust, and otherwise manipulate a digital image and a cropping mask rectangle at a computing device with a display and a touch-sensitive surface. The method reduces the cognitive burden on a user when manipulating and cropping a digital image, thereby creating a more efficient human-machine interface. For battery-operated computing devices, enabling a user to perform image manipulation and cropping faster and more efficiently conserves power and increases the time between battery charges.

The device simultaneously displays (902) on the display 5004: a digital image 5006 and a cropping mask rectangle 5008 for the digital image (e.g., see FIG. 5A). The digital image 5006 has an image location on the display and an image area. The cropping mask rectangle 5008 has a mask location on the display, a mask area, a mask height, a mask width, and a mask aspect ratio between the mask width and the mask height. In some embodiments, the digital image and the cropping mask rectangle are simultaneously displayed in an image editing application (e.g., 144, FIG. 3), a drawing application (e.g., 380, FIG. 3), a presentation application (e.g., 382, FIG. 3), a word processing application (e.g., 384, FIG. 3), a website creation application (e.g., 386, FIG. 3), a disk authoring application (e.g., 388, FIG. 3), or a spreadsheet application (e.g., 390, FIG. 3) (904).

In some embodiments, the device enters (906) a digital image manipulation mode in response to detecting a first predefined user action (e.g., a double tap gesture on surface 5002, a tap gesture on a control icon, or a mouse click on a control icon).

Operations 908-934, discussed below, are performed while the computing device is in the digital image manipulation mode.

In some embodiments, while the computing device is in the digital image manipulation mode, the device provides (908) a visual indicator that the digital image can be manipulated (e.g., highlighting the border of the digital image 5006, FIG. 5A).

The device detects (910) a first contact and a second contact concurrently on the touch-sensitive surface (e.g., first contact 5010-1 and second contact 5010-2, FIG. 5A). For example, the device may detect two finger contacts on the touch-sensitive surface at the same time or detect contacts by one finger and a stylus or pen on the touch-sensitive surface at the same time.

In some embodiments, while the computing device is in the digital image manipulation mode, the device determines (912) a position of the first contact on the touch-sensitive surface (e.g., the position of contact 5010-1 on surface 5002, FIG. 5A). In some embodiments, while the computing device is in the digital image manipulation mode, the device determines (914) a position of the second contact on the touch-sensitive surface (e.g., the position of contact 5010-2 on surface 5002, FIG. 5A).

Operations 916-934, discussed below, are performed while continuing to detect the first contact 5010-1 and the second contact 5010-2 on the touch-sensitive surface.

The device detects (922) movement of at least one of the first contact 5010-1 and the second contact 5010-2 across the touch-sensitive surface 5002.

In some embodiments, while the computing device is in the digital image manipulation mode, the device determines (916) a location between the first contact and the second contact on the touch-sensitive surface (e.g., 5018-c, a midpoint or centroid of the two contacts 5010-1-c and 5010-2-c, FIG. 5C). While continuing to detect the first contact and the second contact on the touch-sensitive surface, the device determines (924) a change in the location between the first contact and the second contact on the touch-sensitive surface (e.g., a change 5020 in the location of the midpoint or centroid of the two contacts to 5018-d (FIG. 5C) due to the movement of at least one of the contacts).

The device changes (926) the image location on the display in accordance with the change 5020 in the location between the first contact and the second contact on the touch-sensitive surface (e.g., translating the centroid of the digital image in accordance with the translation of the midpoint or centroid of the two contacts on the touch-sensitive surface). For example, the device may translate the centroid of the digital image 5006 in proportion to the translation 5020 of the midpoint or centroid 5018 of the two contacts on the touch-sensitive surface.

In some embodiments, while the computing device is in the digital image manipulation mode, the device determines (918) a distance between the first contact and the second contact on the touch-sensitive surface (e.g., 5022-e, the distance between the respective centroids of contacts 5010-1-e and 5010-2-e, FIG. 5D). While continuing to detect the first contact and the second contact on the touch-sensitive surface, the device determines (928) a change in the distance between the first contact and the second contact on the touch-sensitive surface (e.g., in FIG. 5D, a change in the distance 5022 between respective centroids of contacts 5010-1 and 5010-2, from 5022-e to 5022-f due to the movement of at least one of the contacts).

The device changes (930) the image area in accordance with the change in the distance 5022 between the first contact and the second contact on the touch-sensitive surface. For example, the image area may be enlarged in accordance with a depinching gesture between the first contact and the second contact or reduced in accordance with a pinching gesture between the first contact and the second contact. In some embodiments, the image 5006 is enlarged or reduced without concurrent rotation of the image (i.e., the image 5006 maintains its orientation). In some embodiments, the image is rotated (e.g., the image changes its orientation in response to detection of a rotating gesture that includes some rotation of the two fingers). In some embodiments, the image is enlarged or reduced with concurrent rotation of the image (e.g., the image changes its orientation in response to detection of a depinching gesture that also includes some rotation of the two fingers performing the depinch gesture, in other words, a depinching gesture that is combined with a rotating gesture). In some embodiments, the device changes the image area in proportion to the change in the distance 5022 between the first contact and the second contact.

In some embodiments, while the computing device is in the digital image manipulation mode, while continuing to detect the first contact and the second contact on the touch-sensitive surface, the device rotates (934) the digital image in accordance with a change in an angle between an axis between the first contact and the second contact and an axis corresponding to the touch-sensitive surface. For example, in FIG. 5B, the device rotates the digital image 5006 in accordance with a change in an angle between an axis 5014 between the first contact and the second contact and an axis 5016 corresponding to the touch-sensitive surface.

In some embodiments, while the computing device is in the digital image manipulation mode, the device determines (920) an angle between an axis 5014-a between the first contact and the second contact and an axis corresponding to the touch-sensitive surface (e.g., a vertical, horizontal 5016, or diagonal axis of the touch-sensitive surface). While continuing to detect the first contact and the second contact on the touch-sensitive surface, the device determines (932) a change in the angle between the axis 5014 between the first contact and the second contact and the axis 5016 corresponding to the touch-sensitive surface. For example, in FIG. 5B, the device determines the change in the angle between the axis 5014 and the axis 5016 as contact 5010-2 moves from position a to position b. The device rotates (934) the digital image in accordance with (e.g., in proportion to) the change in the angle between the axis 5014 between the first contact and the second contact and the axis 5016 corresponding to the touch-sensitive surface.

Some or all of operations 910-934 may be repeated in response to detecting lift off of one or both contacts (5010-1 and 5010-2) and then detecting again two simultaneous contacts on the touch-sensitive surface 5002. For a user, these operations provide a fast, intuitive way to manipulate the digital image 5006 with two contacts on the touch-sensitive surface.

In some embodiments, the device enters (936) a cropping mask rectangle manipulation mode in response to detecting a second predefined user action (e.g., a double tap gesture on surface 5002, a tap gesture on a control icon, or a mouse click on a control icon).

Operations 938-980, discussed below, are performed while the computing device is in the cropping mask rectangle manipulation mode.

In some embodiments, while the computing device is in the cropping mask rectangle manipulation mode, the device provides (938) a visual indicator that the cropping mask rectangle can be manipulated (e.g., highlighting the border of the cropping mask rectangle, FIG. 5E).

The device detects (940) a third contact and a fourth contact concurrently on the touch-sensitive surface (e.g., third contact 5010-3 and fourth contact 5010-4, FIG. 5E). For example, the device may detect two finger contacts on the touch-sensitive surface at the same time or detect contacts by one finger and a stylus or pen on the touch-sensitive surface at the same time.

In some embodiments, the third contact and fourth contact are displaced (942) from the edges of the cropping mask rectangle.

In some embodiments, the third contact and fourth contact are displaced (944) from the cropping mask rectangle 5008. The third contact and the fourth contact are not required to touch the cropping mask rectangle or any visible (or hidden) handles on the cropping mask rectangle in order to manipulate of the cropping mask rectangle. The change in the aspect ratio of the cropping mask rectangle in response to detected movements of the third contact and the fourth contact is independent of any (incidental) touching of the cropping mask rectangle (or any handles on the cropping mask rectangle) by the third contact or the fourth contact. If the touch-sensitive surface 5002 is a touchpad, the third contact and the fourth contact do not touch the cropping mask rectangle at all (e.g., third contact 5010-3 and fourth contact 5010-4, FIG. 5E). In some embodiments, the third contact and the fourth contact may be detected anywhere on the touch-sensitive surface. In some embodiments, the third contact and the fourth contact must be detected in a predefined area on the touch-sensitive surface, such as an area that corresponds to or displays the digital image, an area that corresponds to or displays the area within the edges of the cropping mask rectangle, or an area without activatable control icons.

In some embodiments, while the computing device is in the cropping mask rectangle manipulation mode, the device determines (946) a position of the third contact on the touch-sensitive surface (e.g., the position of contact 5010-3 on surface 5002, FIG. 5E). In some embodiments, while the computing device is in the cropping mask rectangle manipulation mode, the device determines (948) a position of the fourth contact on the touch-sensitive surface (e.g., the position of contact 5010-4 on surface 5002, FIG. 5E).

Operations 950-980, discussed below, are performed while continuing to detect the third contact 5010-3 and the fourth contact 5010-4 on the touch-sensitive surface.

The device detects (956) movement of at least one of the third contact and the fourth contact across the touch-sensitive surface.

In some embodiments, while the computing device is in the cropping mask rectangle manipulation mode, the device determines (950) an angle between an axis 5048-e between the third contact and the fourth contact and an axis corresponding to the touch-sensitive surface (e.g., a vertical, horizontal 5050-e, or diagonal axis of the touch-sensitive surface). While continuing to detect the third contact and the fourth contact on the touch-sensitive surface, the device determines (958) a change in the angle between the axis between the third contact and the fourth contact and the axis corresponding to the touch-sensitive surface. For example, in FIG. 5I, the device determines the change in the angle between the axis 5048 and the axis 5050 as contacts 5010-3 and 5010-4 move from respective positions e to respective positions f.

The device changes (960) the mask aspect ratio in accordance with the change in the angle between the axis 5048 between the third contact and the fourth contact and the axis 5050 corresponding to the touch-sensitive surface. For example, in FIG. 5I, the diagonal angle θ of the cropping mask rectangle changes from $\theta_e$ to $\theta_f$ (thereby changing the mask aspect ratio) in accordance with the change in the angle between the axis 5048 and the axis 5050. Exemplary code for changing the mask aspect ratio is described above with respect to an analogous operation (828) in FIG. 8.

In some embodiments, while the computing device is in the cropping mask rectangle manipulation mode, while continuing to detect the third contact 5010-3 and the fourth contact 5010-4 on the touch-sensitive surface, the device changes (964) the mask location on the display in accordance with a change in a location (e.g., a midpoint or centroid of the two contacts) between the third contact and the fourth contact on the touch-sensitive surface (e.g., translating the centroid of the cropping mask rectangle in accordance with the translation of the location between the two contacts on the touch-sensitive surface). This change in mask location is analogous to the change in digital image location described above with respect to FIG. 5C and an analogous description need not be repeated here.

In some embodiments, while the computing device is in the cropping mask rectangle manipulation mode, the device determines (952) a location between the third contact and the fourth contact on the touch-sensitive surface (e.g., a midpoint or centroid of the two contacts). While continuing to detect the third contact and the fourth contact on the touch-sensitive surface, the device determines (962) a change in the location between the third contact and the fourth contact on the touch-sensitive surface (e.g., a change in the midpoint or centroid of the two contacts due to the movement of at least one of the contacts), and the device changes (964) the mask location on the display in accordance with the change in the location between the third contact and the fourth contact on the touch-sensitive surface (e.g., translating the centroid of the cropping mask rectangle in accordance with the translation of the location between the two contacts on the touch-sensitive surface). This change in mask location is analogous to the change in digital image location described above with respect to FIG. 5C and an analogous description need not be repeated here.

In some embodiments, while the computing device is in the cropping mask rectangle manipulation mode, while continuing to detect the third contact and the fourth contact on the touch-sensitive surface, the device changes (968) the mask area in accordance with a change in a distance between the third contact and the fourth contact on the touch-sensitive surface (e.g., enlarging the mask area in accordance with a depinching gesture between the third contact and the fourth contact or reducing the mask area in accordance with a pinching gesture between the third contact and the fourth contact). This change in mask area is analogous to the change in digital image area described above with respect to FIG. 5D and an analogous description need not be repeated here.

In some embodiments, while the computing device is in the cropping mask rectangle manipulation mode, the device determines (954) a distance between the third contact and the fourth contact on the touch-sensitive surface. While continuing to detect the third contact and the fourth contact on the touch-sensitive surface, the device determines (966) a change in the distance between the third contact and the fourth contact on the touch-sensitive surface, and the device changes (968) the mask area in accordance with the change in the distance between the third contact and the fourth contact on the touch-sensitive surface (e.g., enlarging the mask area in accordance with a depinching gesture between the third contact and the fourth contact or reducing the mask area in accordance with a pinching gesture between the third contact and the fourth contact). This change in mask area is analogous to the change in digital image area described above with respect to FIG. 5D and an analogous description need not be repeated here.

In some embodiments, the device: detects (970) movement of the third contact across the touch-sensitive surface; detects (972) movement of the fourth contact across the touch-sensitive surface by less than a predefined amount (e.g., an amount corresponding to less than 5-10 pixels on the display); and adjusts (974) the cropping mask rectangle while maintaining a corner of the cropping mask rectangle that corresponds to the fourth contact at a fixed location on the display. For example, in FIG. 5F, the device detects little or no movement of the fourth contact 5010-4, and the device adjusts the cropping mask rectangle while maintaining the bottom, left corner of the cropping mask rectangle 5008 (i.e., the corner that corresponds to the fourth contact 5010-4) at a fixed location on the display 5004. In FIG. 5F, the bottom, left corner of the cropping mask rectangle 5008 corresponds to the fourth contact 5010-4 because the fourth contact is both the bottommost contact and the leftmost contact.

In some embodiments, the device detects (976) movement of the third contact across the touch-sensitive surface without detecting movement of the fourth contact across the touch-sensitive surface, and the device adjusts (978) the cropping mask rectangle while maintaining a corner of the cropping mask rectangle that corresponds to the fourth contact at a fixed location on the display (e.g., see FIG. 5F and the preceding paragraph).

In some embodiments, changing the mask aspect ratio comprises snapping (980) the cropping mask rectangle to a series of predefined mask aspect ratios (e.g., 1:1, 2:3, 3:2, 3:5, 5:3, 5:7, 7:5, 8:10, 10:8, 3:4, 4:3, 16:9, 9:16, and/or the display aspect ratio). In some embodiments, the aspect ratio changes or appears to change continuously on the display.

Some or all of operations 940-980 may be repeated in response to detecting lift off of one or both contacts (5010-3 and 5010-4) and then detecting again two simultaneous contacts on the touch-sensitive surface 5002. For a user, these operations provide a fast, intuitive way to manipulate the cropping mask rectangle 5008 with two contacts on the touch-sensitive surface.

Complementary conventional methods of adjusting the size and location of the cropping mask rectangle may also be used. In some embodiments, the device adjusts (982) the cropping mask rectangle in response to detecting manipulation of one or more handles on the cropping mask rectangle. For example, in FIG. 5H, a cursor 5042 controlled by a mouse or finger contact (e.g., 5010-5) may be used to manipulate a handle on the cropping mask rectangle to precisely adjust an edge or corner of the cropping mask rectangle.

In some embodiments, the device crops (984) the digital image with the cropping mask rectangle (e.g., FIG. 5J).

In some embodiments, the device translates (986) the cropped digital image. For example, in FIG. 5K, the device translates the cropped digital image 5052 in response to user input via a mouse or finger contact (e.g., 5010-7).

FIGS. 10A-10D are flow diagrams illustrating a method of manipulating a user interface object in accordance with some embodiments. FIGS. 11A-11D illustrate exemplary user interfaces for manipulating a user interface object on a computing device with a display and a touch-sensitive surface in accordance with some embodiments.

Figure 11A:
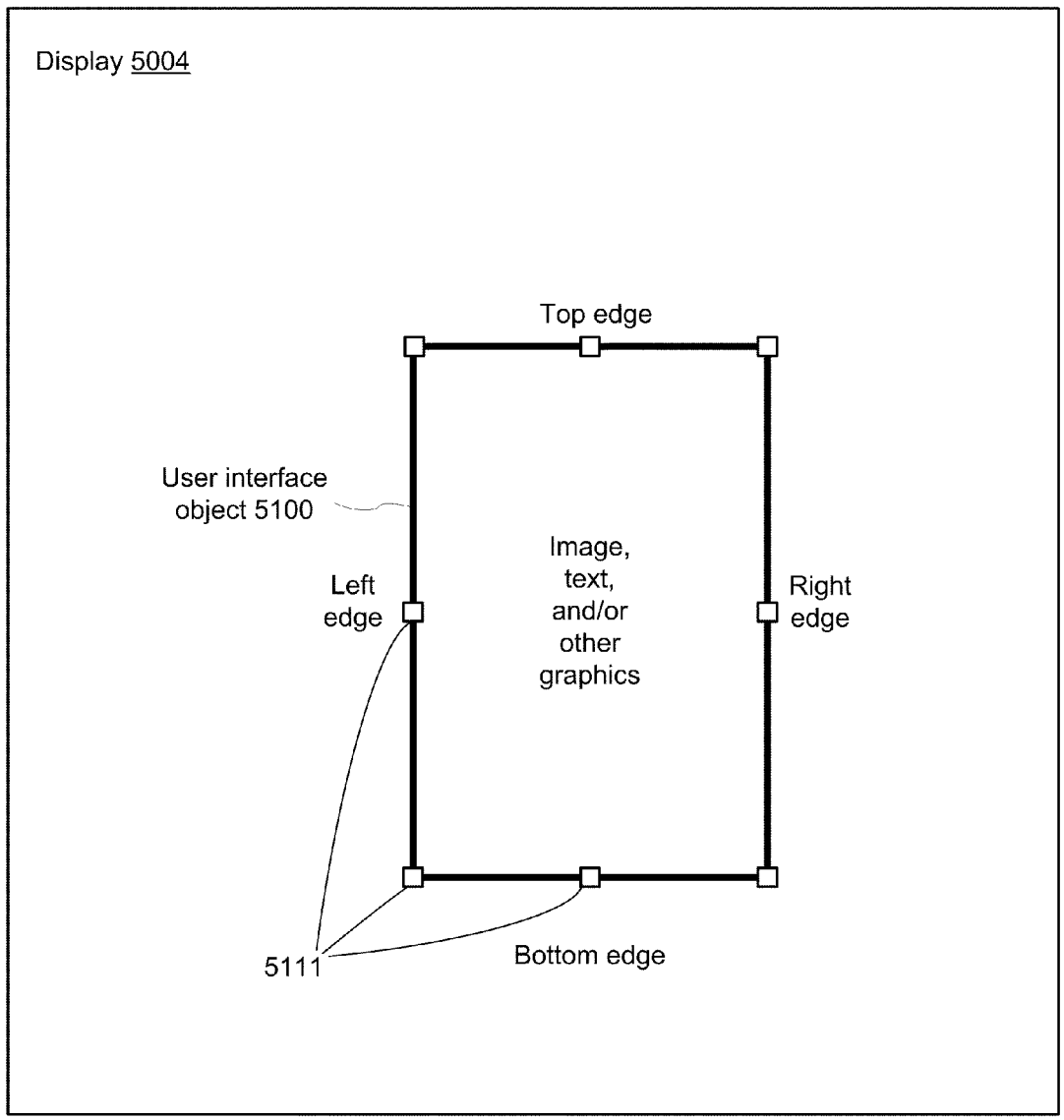
FIGS. 11A-11D illustrate exemplary user interfaces for manipulating a user interface object on a computing device with a display and a touch-sensitive surface in accordance with some embodiments.
Figure 11A:
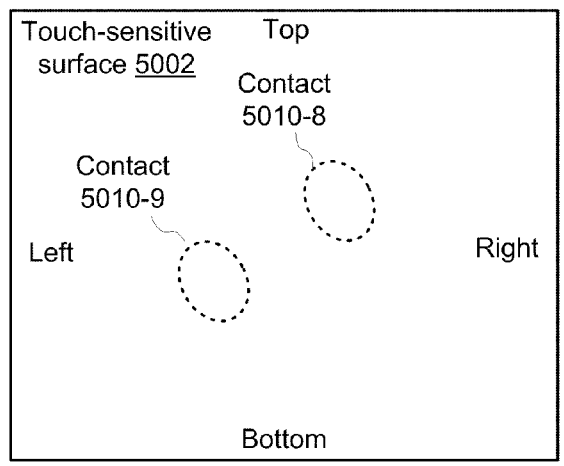
Figure 11B:
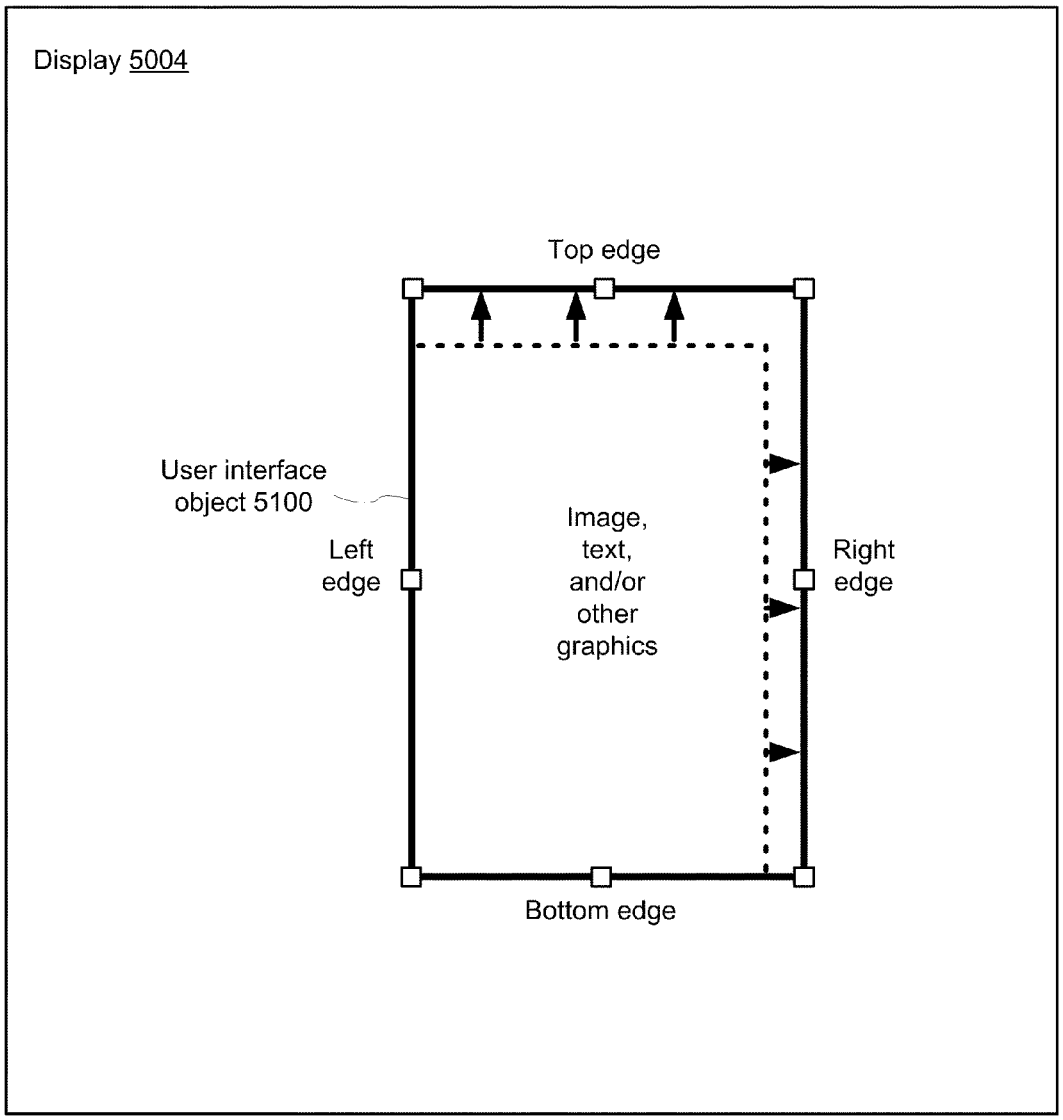
Figure 11B:
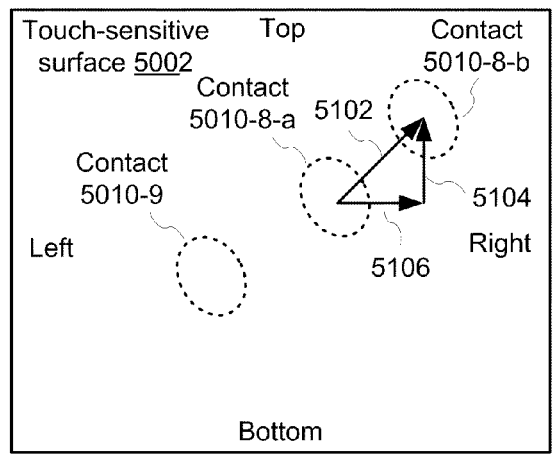

FIG. 11B illustrates concurrently moving two edges of the user interface object 5100 that correspond to one of two simultaneous contacts in accordance with the detected movement of the contact (contact 5010-8), including horizontally moving one of the two edges and vertically moving the other of the two edges.

Figure 11C:
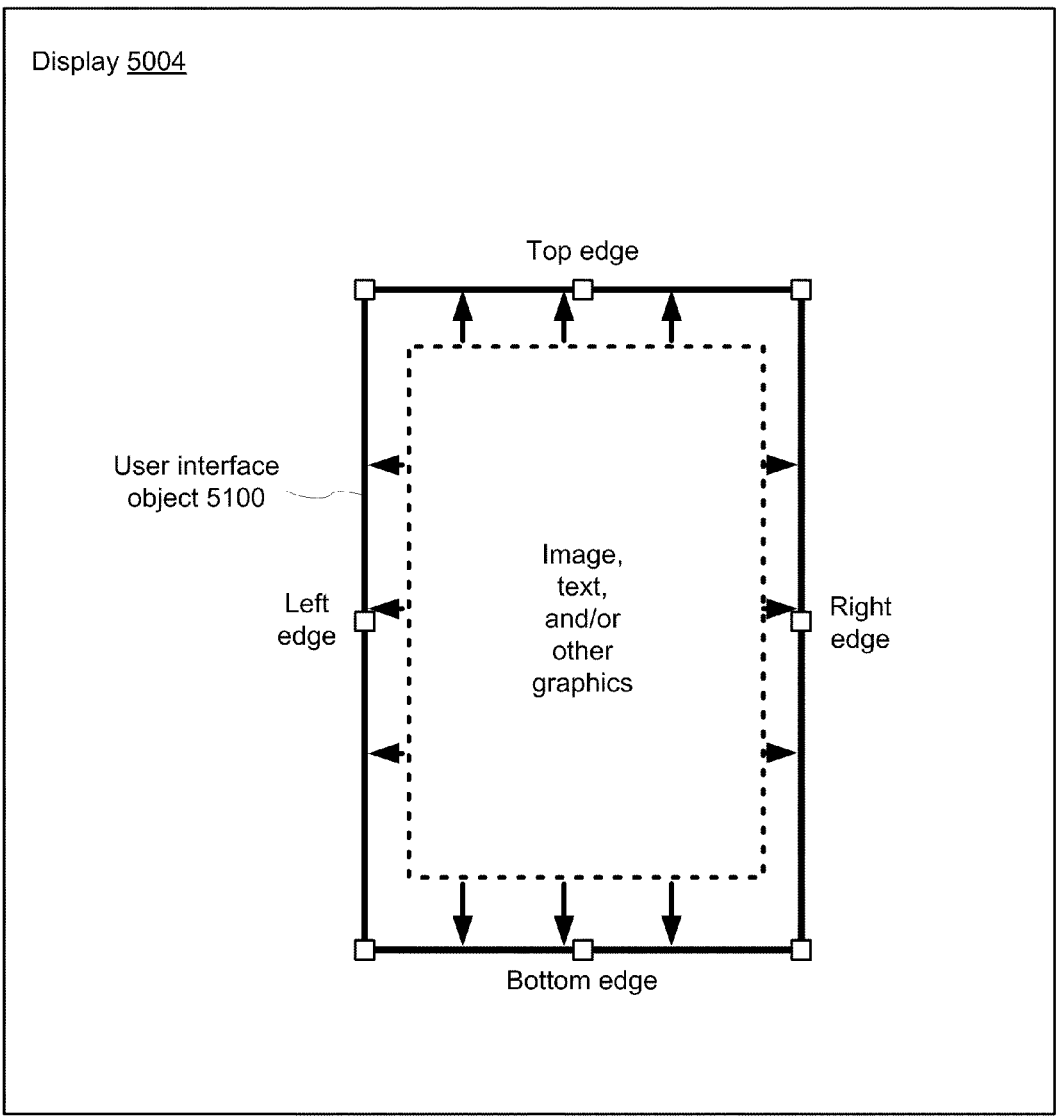
Figure 11C:
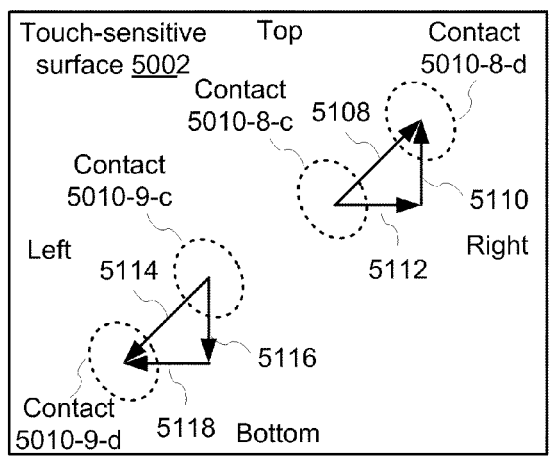

FIG. 11C illustrates concurrently moving respective edges of the user interface object 5100 in accordance with the movements of respective contacts 5010-8 and 5010-9.

Figure 11D:
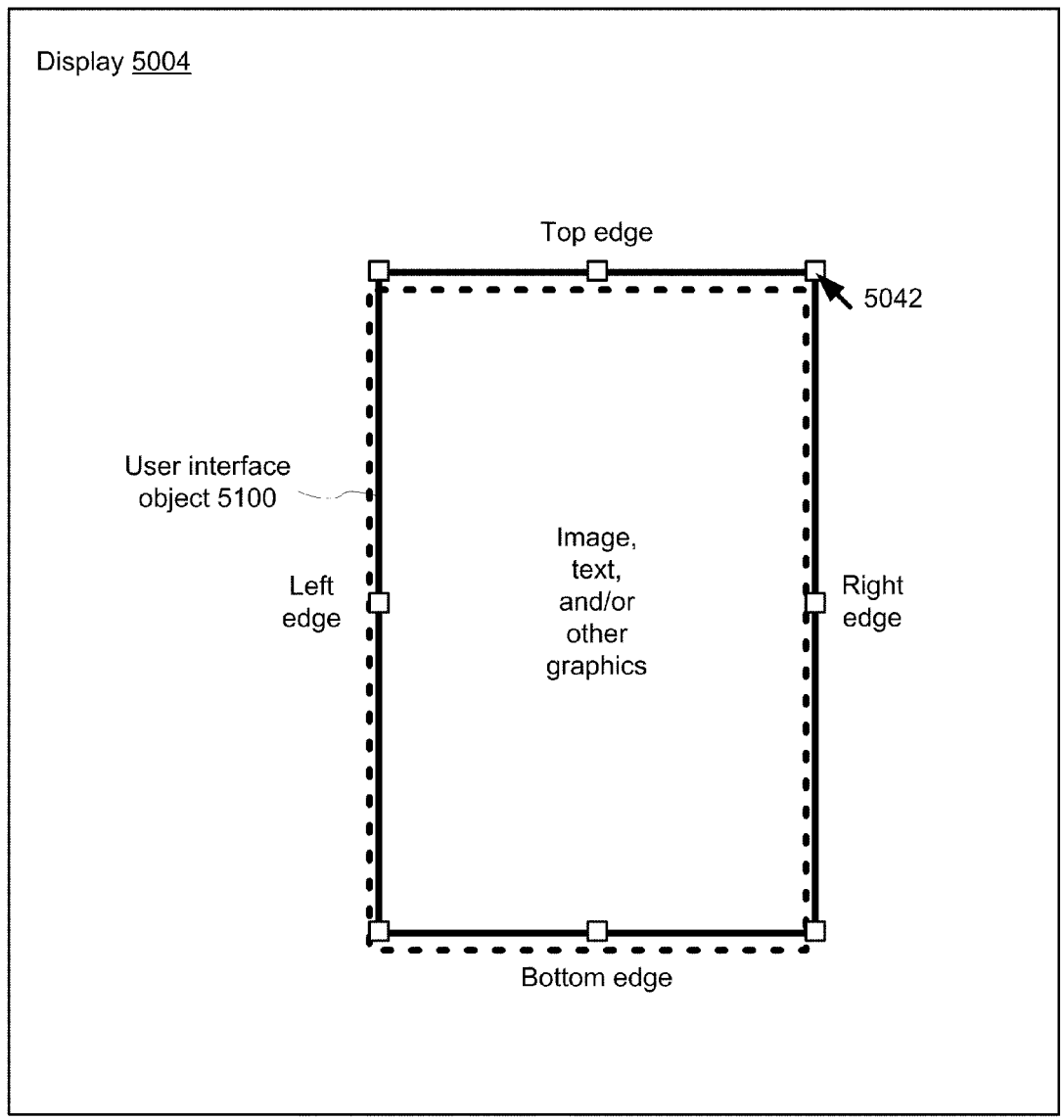
Figure 11D:
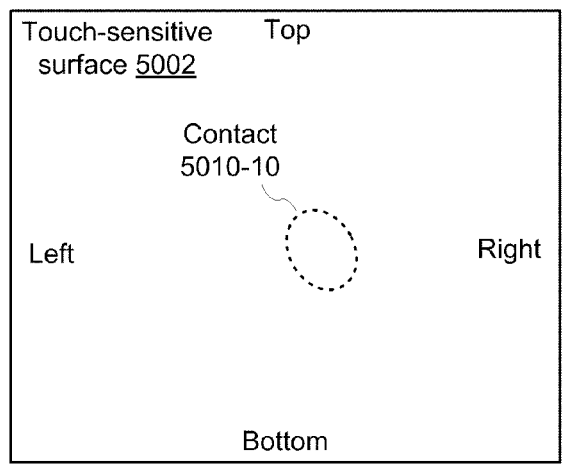

FIG. 11D illustrates using a complementary conventional method to adjust the size and location of the user interface object 5100.

The user interfaces in FIGS. 11A-11D are used to illustrate the processes described below with respect to FIGS. 10A-10D.

With respect to FIGS. 10A-10D, the method 1000 is performed at a computing device (e.g., 300, FIG. 3) with a display and a touch-sensitive surface. Some operations in method 1000 may be combined and/or the order of some operations may be changed.

In some embodiments, the touch-sensitive surface is separate from the display (e.g., surface 5002 is separate from display 5004 in FIG. 11A). In some embodiments, the touch-sensitive surface is a touch pad (e.g., 5002, FIG. 11A or 355, FIG. 3).

In some embodiments, the touch-sensitive surface is on the display. In other words, the display is a touch screen display (e.g., 112, FIG. 2). In some embodiments, the method is performed at a portable multifunction device with a touch screen display (e.g., portable multifunction device 100).

As described below, the method 1000 provides an intuitive way to position, adjust, and otherwise manipulate a user interface object at a computing device with a display and a touch-sensitive surface. The method reduces the cognitive burden on a user when manipulating the object, thereby creating a more efficient human-machine interface. For battery-operated computing devices, enabling a user to perform object manipulation faster and more efficiently conserves power and increases the time between battery charges.

The device displays (1002) a user interface object 5100 (e.g., a digital image, text, and/or other graphics) on the display 5004. The user interface object 5100 has four edges comprising a top edge, a bottom edge, a left edge, and a right edge. In some embodiments, the four edges are edges of a bounding box of the user interface object (1004). In some embodiments, the top and bottom edges are horizontal lines and the left and right edges are vertical lines (1006). In some embodiments, the user interface object 5100 has sharp corners or rounded corners (e.g., a rectangle with sharp or rounded corners). In some embodiments, the user interface object 1004 has an initial height and width that are independent of initial positions of the first contact and second contact. For example in FIG. 11A, the height and width of the user interface object 5100 do not depend on the initial positions of contacts 5010-8 and 5010-9.

In some embodiments, the user interface object 5100 is displayed in an image editing application (e.g., 144, FIG. 3), a drawing application (e.g., 380, FIG. 3), a presentation application (e.g., 382, FIG. 3), a word processing application (e.g., 384, FIG. 3), a website creation application (e.g., 386, FIG. 3), a disk authoring application (e.g., 388, FIG. 3), or a spreadsheet application (e.g., 390, FIG. 3) (1008).

In some embodiments, the device provides (1010) a visual indicator that the user interface object 5100 can be manipulated (e.g., highlighting the border of the user interface object or displaying the bounding box of the user interface object, FIG. 11A).

The device detects (1012) a first contact and a second contact concurrently on the touch-sensitive surface (e.g., first contact 5010-8 and second contact 5010-9, FIG. 11A). For example, the device may detect two finger contacts on the touch-sensitive surface at the same time or detect contacts by one finger and a stylus or pen on the touch-sensitive surface at the same time.

In some embodiments, the first contact and the second contact are displaced (1014) from the edges of the user interface object.

In some embodiments, the first contact and the second contact are displaced (1016) from the user interface object 5100. The first contact and the second contact are not required to touch the user interface object or any visible (or hidden) handles on the user interface object in order to manipulate of the user interface object. The vertical or horizontal movements of edges of the user interface object in response to detected movements of the first contact and the second contact are independent of any (incidental) touching of the user interface object (or any handles on the user interface object) by the first contact or the second contact. If the touch-sensitive surface is a touchpad, the first contact and the second contact do not touch the user interface object at all (e.g., first contact 5010-8 and second contact 5010-9, FIG. 11A).

In other words, in accordance with some embodiments, the first contact and the second contact are not associated with a cursor or user interface object handles (e.g., 5111 in FIG. 11A). For example, compare FIG. 5H, which shows a conventional cursor interaction with a user interface object handle, with FIG. 11C, an exemplary illustration of the present invention. In FIG. 5H, a cursor 5042 controlled by a mouse or finger contact (e.g., 5010-5) is used to manipulate a handle on a user interface object to precisely adjust an edge or corner of the user interface object. In contrast, as shown in FIG. 11C, there is no cursor, and the contacts 5010-8 and 5010-9 are not associated with the handles on a user interface object 5100. Thus, the device does not manipulate the user interface object 5100 based on control of the movements of a cursor or user interface object handles by contacts 5010-8 and 5010-9. Instead, when the device is in a user interface object manipulation mode (e.g., cropping mask rectangle manipulation mode), the movement of a contact (e.g., the movement of contact 5010-8 from position c to position d in FIG. 11C) moves the edges of the user interface object 5100 based at least in part on the magnitude and direction of movement of the contact 5010-8. To resize the user interface object, a user does not have to use a cursor (or any other means) to select a user interface object handle. Instead, the user can simply place two contacts on the touch-sensitive surface and move one or both of the contacts, as shown in FIGS. 11B and 11C and described in greater detail below.

In some embodiments, the first contact and the second contact may be detected anywhere on the touch-sensitive surface. In some embodiments, the first contact and the second contact must be detected in a predefined area on the touch-sensitive surface, such as an area that corresponds to the area within the edges of the user interface object, or an area without activatable control icons.

In some embodiments, the device determines (1018) a position of the first contact on the touch-sensitive surface (e.g., the position of contact 5010-8 on surface 5002, FIG. 11A). In some embodiments, the device determines (1020) a position of the second contact on the touch-sensitive surface (e.g., the position of contact 5010-9 on surface 5002, FIG. 11A).

The device determines (1022) which contact of the first contact and the second contact is a topmost contact on the touch-sensitive surface. The device determines (1024) which contact of the first contact and the second contact is a bottommost contact on the touch-sensitive surface. The device determines (1026) which contact of the first contact and the second contact is a leftmost contact on the touch-sensitive surface. The device determines (1028) which contact of the first contact and the second contact is a rightmost contact on the touch-sensitive surface. For example, in FIG. 11A, contact 5010-8 is both the topmost contact and the rightmost contact because contact 5010-8 is above and to the right of contact 5010-9. Similarly, in FIG. 11A, contact 5010-9 is both the bottommost contact and the leftmost contact because contact 5010-9 is below and to the left of contact 5010-8. In accordance with these determinations, two of the edges of the user interface object correspond to the first contact and two of the edges correspond to the second contact.

Operations 1030-1058, discussed below, are performed while continuing to detect the first contact 5010-8 and the second contact 5010-9 on the touch-sensitive surface.

The device detects (1030) movement of the first contact 5010-8 across the touch-sensitive surface. The device concurrently moves (1032) on the display two edges of the user interface object that correspond to the first contact in accordance with the detected movement of the first contact, including horizontally moving one of the two edges and vertically moving the other of the two edges. In other words, in accordance with some embodiments, the device concurrently moves on the display a first edge and a second edge of the user interface object that correspond to the first contact in accordance with the detected movement of the first contact, including horizontally moving the first edge and vertically moving the second edge, wherein moving the first edge is independent of moving the second edge. For example, in FIG. 11B, the device detects movement of contact 5010-8 from position a (e.g., an "initial" position 5010-8-a) to position b (e.g., a "final" position 5010-8-b). The device concurrently moves the top edge and the right edge of the user interface object 5100 in accordance with the detected movement of contact 5010-8. The top edge and the right edge correspond to contact 5010-8 because this contact is both the topmost contact and the rightmost contact. As shown in FIG. 11B, the right edge is moved horizontally and the top edge is moved vertically.

In other words, in some embodiments, the movement of the first contact is part of a location-independent gesture performed within a predefined region of the touch-sensitive surface. Thus, in some embodiments, the movement of the first edge of the user interface object and the movement of the second edge of the user interface object are determined by location-independent elements of the gesture. In some embodiments the predefined region is a region of a touch-sensitive display that is outside of an area with activatable control icons (e.g., the region including a tray 408 in FIG. 4B with icons for frequently used applications). In some embodiments the predefined region is a region of a touch-sensitive surface that is separate from the display (e.g., 5002 in FIG. 11A). In some embodiments, the predefined region is a region outside of a scroll region (e.g., a region outside of a predefined region on the touch-sensitive surface that is associated with a scrolling a user interface).

In some embodiments, a location-independent gesture is any one of the location independent gestures described previously (e.g., the pinching gesture, the depinching gesture, and/or the rotating gesture described with reference to FIGS. 5A-5D). These gestures are location-independent gestures because the magnitude and direction of movement of the edges of the user interface object that are associated with the first contact is the same without regard to the location of the gesture on the touch-sensitive surface. It should be understood that the location-independent gesture can be any gesture in a predefined area on a touch-sensitive surface which has a meaning that is invariant when the gesture is performed in a different location within the predefined area. As one example, in FIG. 11B, the predefined region is the whole touch-sensitive surface 5002 and the gesture is detection of two contacts 5010-9 and 5010-8 in the predefined region and detected movement 5102 of one of the contacts 5010-8 from an initial location of the contact 5010-8-a to a final location of the contact 5010-8-b. In this example, the gesture is location-independent because the movement of the top edge and the right edge would be the same if the entire gesture (e.g., the initial contacts 5010-9, 5010-8-a and the movement 5102 of the one of the contacts 5010-8-a to a new contact location 5010-8-b) was shifted to the right or the left and/or up or down on the touch-sensitive surface 5002, so long as the gesture is performed within the predefined area.

In some embodiments, while continuing to detect the first contact and the second contact on the touch-sensitive surface, the device: detects (1034) movement of both the first contact 5010-8 and the second contact 5010-9 across the touch-sensitive surface; vertically moves (1036) the top edge of the user interface object in accordance with vertical movement of the topmost contact on the touch-sensitive surface; vertically moves (1038) the bottom edge of the user interface object in accordance with vertical movement of the bottommost contact on the touch-sensitive surface; horizontally moves (1040) the left edge of the user interface object in accordance with horizontal movement of the leftmost contact on the touch-sensitive surface; and horizontally moves (1042) the right edge of the user interface object in accordance with horizontal movement of the rightmost contact on the touch-sensitive surface. For example, in FIG. 11C, the device detects movement of both the first contact 5010-8 and the second contact 5010-9 across the touch-sensitive surface (e.g., movements 5108 and 5114, respectively). The top edge of the user interface object 5100 moves vertically in accordance with vertical movement 5110 of the topmost contact (5010-8 in this example). The bottom edge of the user interface object 5100 moves vertically in accordance with vertical movement 5116 of the bottommost contact (5010-9 in this example). The left edge of the user interface object 5100 moves horizontally in accordance with horizontal movement 5118 of the leftmost contact (5010-9 in this example). The right edge of the user interface object 5100 moves horizontally in accordance with horizontal movement 5112 of the rightmost contact (5010-8 in this example).

Note that with these vertical and horizontal movements of the user interface object edges, the user interface object 5100 may change its size and location on the display 5004, but the user interface object 5100 will not rotate on the display. In other words, in accordance with some embodiments, when the movement of the first contact is two-dimensional movement across the touch-sensitive surface, an orientation of the top edge, bottom edge, left edge, and right edge of the user interface object 5100 on the display remain unchanged.

In some embodiments, in response to detecting concurrent movement of the first contact and the second contact, the device concurrently moves (1044) at least two of the edges, including at least one edge corresponding to the first contact and at least one edge corresponding to the second contact. For example, in FIG. 11C, in response to detecting concurrent movement of the first contact 5010-8 and the second contact 5010-9, the device concurrently moves two edges corresponding to the first contact 5010-8 (the top edge and the right edge in this example) and two edges corresponding to the second contact 5010-9 (the bottom edge and the left edge in this example).

In some embodiments, the device suppresses (1045) jitter associated with the first contact and the second contact. In some embodiments, the device maintains a corner of the user interface object that corresponds to a contact at a fixed location on the display. In other words, the device does not move two edges of the user interface object that correspond to a contact despite detecting movement of the contact. In some embodiments, the device may use code for suppressing jitter and pinning a corner similar to the exemplary code described above with respect to operation 643 (FIG. 6C).

In some embodiments, the device detects (1046) movement of the second contact across the touch-sensitive surface by less than a predefined amount (e.g., an amount corresponding to less than 5-10 pixels on the display), and the device adjusts (1048) the user interface object while maintaining a corner of the user interface object that corresponds to the second contact at a fixed location on the display. For example, in FIG. 11B, the device detects little or no movement of the second contact 5010-9, and the device adjusts the user interface object while maintaining the bottom, left corner of the user interface object 5100 (i.e., the corner that corresponds to the second contact 5010-9) at a fixed location on the display 5004. In FIG. 11B, the bottom, left corner of the user interface object 5100 corresponds to the second contact 5010-9 because the second contact is both the bottommost contact and the leftmost contact.

In other words, in some embodiments, in accordance with determining which contact of the first contact and the second contact is the topmost, bottommost, leftmost and rightmost, the device dynamically associates the first contact and second contact with diagonally opposite corners of the user interface object. In some embodiments, the dynamic association is performed without changing the initial height and width of the user interface object. Thus, in this embodiment, instead of causing the corners of the user interface object to "snap-to" the location of the contacts that are associated with the corners, the corners are dynamically associated with the first contact and the second contact so that the movement of a respective contact (e.g., the first contact) results in a movement of the corner associated with the respective contact (e.g., the first contact), wherein the movement of the corner is based on the movement of the respective contact. For example, if the first contact is associated with the topmost and the rightmost side, then the first contact is associated with the upper right hand corner of the user interface object.

In some embodiments, the device detects (1050) movement of the first contact across the touch-sensitive surface without detecting movement of the second contact across the touch-sensitive surface, and the device adjusts (1052) the user interface object while maintaining a corner of the user interface object that corresponds to the second contact at a fixed location on the display (e.g., see FIG. 11B and the preceding paragraph).

In some embodiments, moving a respective edge of the user interface object in accordance with movement of a respective contact comprises moving (1054) the respective edge of the user interface object in proportion to a component of movement of the respective contact. For example, in FIG. 11C, the top edge of the user interface object 5100 is moved in proportion to the vertical component of movement 5110 of the topmost contact (contact 5010-8); the bottom edge of the user interface object 5110 is moved in proportion to the vertical component of movement 5116 of the bottommost contact (contact 5010-9); the left edge of the user interface object 5100 is moved in proportion to the horizontal component of movement 5118 of the leftmost contact (contact 5010-9); and the right edge of the user interface object 5100 is moved in proportion to the horizontal component of movement 5112 of the rightmost contact (contact 5010-8).

In other words, the movement of the first contact (e.g., 5010-8 in FIG. 11B) is from an initial position (e.g., 5010-8-a in FIG. 11B) on the touch-sensitive surface to a final position (e.g., 5010-8-b in FIG. 11B) on the touch-sensitive surface and the concurrent movement of the two edges of the user interface object is dependent only on relative movement of the first contact (e.g., 5010-8 in FIG. 11B) from the initial position of the first contact to a final position.

Exemplary code for moving respective edges of the user interface object in accordance with movement of respective contacts is as follows:

```
{
    CGPoint point0 = [touches pointAtIndex:0];
    CGPoint point1 = [touches pointAtIndex:([touches count] > 1) ? 1 : 0];
    double dWidthRight = (__lastPoint1.x > __lastPoint0.x) ? (point1.x - __lastPoint1.x) :
(point0.x - lastPoint0.x);
    double dWidthLeft = (__lastPoint1.x > __lastPoint0.x) ?
(__lastPoint0.x - point0.x) :
(__lastPoint1.x - point1. x);
    __Rect.width += dWidthRight + dWidthLeft;
    __Rect.x -= dWidthLeft - (dWidthRight + dWidthLeft)/2;
    double dHeightBottom = (__lastPoint1.y < lastPoint0.y) ?
(__lastPoint1.y - point1.y) :
(__lastPoint0.y - point0.y);
    double dHeightTop = (__lastPoint1.y < __lastPoint0.y) ? (point0.y - __lastPoint0.y) :
(point1.y - __lastPoint1.y);
    __Rect.height += dHeightBottom + dHeightTop;
    __Rect.y += dHeightTop - (dHeightBottom + dHeightTop)/2;
    __lastPoint0 = point0;
    __lastPoint1 = point1;
}
```

The above code obtains the location of the first and second contacts (point0, point1). The prior locations of the first and second contacts are represented by lastPoint0 and lastPoint1. Then, the changes in width (actually movements of the user interface object's left and right edges) on both the left (dWidthLeft) and right (dWidthRight) sides of the user interface object are determined based on horizontal movement of the contacts, taking care to decide which is the leftmost contact and which is the rightmost (based on whether lastPoint1.x is greater or less than lastPoint0.x). The new width of the user interface object (Rect.width) is computed based on the movements of the left and right edges (dWidthLeft and dWidthRight), and the x-axis location of the user interface object (Rect.x) is also updated based on the movements of the left and right edges (dWidthLeft and dWidthRight). Similar calculations are performed to determine changes in the height (Rect.height) and y-axis location (Rect.y) of the user interface object. Finally, the current locations (point0, point1) of the contacts are stored as the "last" locations (lastPoint0, lastPoint1) for use during the next iteration of the process.

In some embodiments, moving respective edges of the user interface object in accordance with movement of respective contacts comprises snapping (1056) the user interface object edges to a series of predefined object aspect ratios as the respective contacts move (e.g., 1:1, 2:3, 3:2, 3:5, 5:3, 5:7, 7:5, 8:10, 10:8, 3:4, 4:3, 16:9, 9:16, and/or the display aspect ratio). In some embodiments, the aspect ratio changes or appears to change continuously on the display.

In some embodiments, moving respective edges of the user interface object in accordance with movement of respective contacts comprises constraining (1058) the user interface object to a predefined aspect ratio as the respective contacts move (e.g., 1:1, 2:3, 3:2, 3:5, 5:3, 5:7, 7:5, 8:10, 10:8, 3:4, 4:3, 16:9, 9:16, or the display aspect ratio).

Some or all of operations 1012-1058 may be repeated in response to detecting lift off of one or both contacts (5010-8 and 5010-9) and then detecting again two simultaneous contacts on the touch-sensitive surface 5002. For a user, these operations provide a fast, intuitive way to manipulate the user interface object 5100 with two contacts on the touch-sensitive surface.

In other words, in some embodiments, after the device moves, on the display, two edges of the user interface object that correspond to the first contact in accordance with the detected movement of the first contact, including horizontally moving one of the two edges and vertically moving the other of the two edges, the device detects a liftoff of the first contact. In some embodiments, the device detects a third contact concurrently with the second contact on the touch-sensitive surface; determines which contact of the second contact and the third contact is a topmost contact on the touch-sensitive surface; determines which contact of the second contact and the third contact is a bottommost contact on the touch-sensitive surface; determines which contact of the second contact and the third contact is a leftmost contact on the touch-sensitive surface; determines which contact of the second contact and the third contact is a rightmost contact on the touch-sensitive surface. In some embodiments, while continuing to detect the second contact and the third contact on the touch-sensitive surface, the device: detects movement of the third contact across the touch-sensitive surface; and concurrently moves, on the display, two edges of the user interface object that correspond to the third contact in accordance with the detected movement of the third contact, including horizontally moving one of the two edges and vertically moving the other of the two edges.

The user interface object is typically a persistent user interface object. In some embodiments, while the user is in a user interface object manipulation mode, the user can begin manipulating the user interface object (e.g., moving one or more sides of the user interface object to resize the user interface object), and then liftoff one or more of the contacts that were used to manipulate the user interface object. In this embodiment, the device will maintain the state of the persistent user interface object (e.g., the size, location, orientation and other characteristics of the user interface object) after the device detects liftoff of the contact. In some embodiments the state of the persistent user interface object is maintained for a predetermined time (e.g., 15 seconds) or until the user performs a predetermined action (e.g., selecting a button to leave the user interface object manipulation mode). As described in greater detail above, if the user makes contact with the touch-sensitive surface while the state of the persistent user interface object is being maintained (e.g., before 15 seconds have elapsed), then the user may resume manipulating the user interface object.

As one example, a device detects first and second contacts on a touch-sensitive surface (e.g., 5002 in FIG. 11B), and detects movement of the first contact (e.g., 5010-8 in FIG. 11B). In this example, the device resizes the user interface object (5100 in FIG. 11B by moving the right edge of the user interface object in accordance with the movement of the first contact 5010-8 to the right of the touch-sensitive surface and moving the top edge of the user interface object in accordance with the movement of the first contact 5010-8 towards the top of the touch-sensitive surface, thereby increasing the size of the user interface object. Continuing this example, the device detects liftoff of the first contact 5010-8. In this example, the user interface object is persistent and its state is maintained by the device even after the liftoff is detected. Continuing the example, the device detects a third contact (i.e., a new contact) at the location of the initial position of the first contact 5010-8 while still detecting the second contact. Then, the device detects movement of the third contact that is substantially similar to the previous movement of the first contact. In response, the device moves the top edge and the right edge of the user interface object in accordance with the movement of the third contact on the touch-sensitive surface. Thus, the movement of the third contact further increases the size of the user interface object.

It should be understood that while this example illustrates two successive contacts moving in the same direction, the first contact and the third contact could move in any direction. For example, the first contact could move up and to the right while the third contact moves down and to the right. Alternatively, the third contact could retrace the movement of the first contact in the opposite direction, effectively undoing the changes made in response to the movement of the first contact. Similarly while this example illustrates the liftoff of only one contact, it should be understood that both contacts could be lifted off of the touch-sensitive surface and two new contacts could be detected, without departing from the scope of method described herein.

In some embodiments, while continuing to detect the first contact and the second contact on the touch-sensitive surface, the device detects a third contact on the touch-sensitive surface, and continues to concurrently move, on the display, two edges of the user interface object that correspond to the first contact in accordance with the detected movement of the first contact, including horizontally moving one of the two edges and vertically moving the other of the two edges without respect to the third detected contact (1060). In effect, the device ignores the third detected contact.

In some embodiments, after a third contact is detected, the device detects a lift off of the second contact from the touch-sensitive surface. While continuing to detect the first contact and the third contact on the touch-sensitive surface, the device determines which contact of the first contact and the third contact is a topmost contact on the touch-sensitive surface; determines which contact of the first contact and the third contact is a bottommost contact on the touch-sensitive surface; determines which contact of the first contact and the third contact is a leftmost contact on the touch-sensitive surface; determines which contact of the first contact and the third contact is a rightmost contact on the touch-sensitive surface; detects movement of the third contact across the touch-sensitive surface; and concurrently moves, on the display, two edges of the user interface object that correspond to the third contact in accordance with the detected movement of the third contact, including horizontally moving one of the two edges and vertically moving the other of the two edges (1062). Thus, in these embodiments, the device uses the first and third fingers to manipulate the user interface object 5100 despite having changed fingers.

Complementary conventional methods of adjusting the size and location of the user interface object may also be used. In some embodiments, the device adjusts (1064) the user interface object in response to detecting manipulation of one or more handles on the user interface object. For example, in FIG. 11D, a cursor 5042 controlled by a mouse or finger contact (e.g., 5010-10) may be used to manipulate a handle on the user interface object to precisely adjust an edge or corner of the user interface object.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with a display and a touch-sensitive surface:
simultaneously displaying on the display:
a digital image; and
a cropping mask rectangle for the digital image, wherein the cropping mask rectangle has four edges comprising a top edge, a bottom edge, a left edge, and a right edge;
while simultaneously displaying the digital image and the cropping mask rectangle, detecting a first contact and a second contact concurrently on the touch-sensitive surface;
determining which contact of the first contact and the second contact is a topmost contact on the touch-sensitive surface;
determining which contact of the first contact and the second contact is a leftmost contact on the touch-sensitive surface; and
while continuing to detect the first contact and the second contact on the touch-sensitive surface:
detecting movement of the first contact across the touch-sensitive surface; and
concurrently moving on the display two edges of the cropping mask rectangle that correspond to the first contact in accordance with the detected movement of the first contact, including horizontally moving one of the two edges and vertically moving the other of the two edges, wherein movement of the two edges of the cropping mask on the display is independent of whether the first contact or the second contact are detected at a location on the touch-sensitive surface that corresponds to a location on the display of an edge of the cropping mask rectangle.

2. The method of claim 1, including:
while continuing to detect the first contact and the second contact on the touch-sensitive surface:
detecting movement of both the first contact and the second contact across the touch-sensitive surface;
vertically moving the top edge of the cropping mask rectangle in accordance with vertical movement of the topmost contact on the touch-sensitive surface;
vertically moving the bottom edge of the cropping mask rectangle in accordance with vertical movement of a bottommost of the firsty contact and the second contact on the touch-sensitive surface;
horizontally moving the left edge of the cropping mask rectangle in accordance with horizontal movement of the leftmost contact on the touch-sensitive surface; and
horizontally moving the right edge of the cropping mask rectangle in accordance with horizontal movement of a rightmost of the first contact and the second contact on the touch-sensitive surface.

3. The method of claim 1, wherein the first contact and the second contact are displaced from the edges of the cropping mask rectangle.

4. The method of claim 1, wherein the first contact and the second contact are displaced from the cropping mask rectangle.

5. The method of claim 1, wherein moving a respective edge of the cropping mask rectangle in accordance with movement of a respective contact comprises moving the respective edge of the cropping mask rectangle in proportion to a component of movement of the respective contact.

6. The method of claim 1, wherein moving respective edges of the cropping mask rectangle in accordance with movement of respective contacts comprises snapping the cropping mask rectangle edges to a series of predefined mask aspect ratios as the respective contacts move.

7. The method of claim 1, further comprising:
while continuing to detect the first contact and the second contact on the touch-sensitive surface:
detecting a third contact on the touch-sensitive surface; and
continuing to concurrently move on the display two edges of the cropping mask rectangle that correspond to the first contact in accordance with the detected movement of the first contact, including horizontally moving one of the two edges and vertically moving the other of the two edges, without respect to the third detected contact.

8. The method of claim 7, further comprising:
detecting a lift off of the second contact from the touch-sensitive surface;
while continuing to detect the first contact and the third contact on the touch-sensitive surface:
determining which contact of the first contact and the third contact is a topmost contact on the touch-sensitive surface;
determining which contact of the first contact and the third contact is a leftmost contact on the touch-sensitive surface;
detecting movement of the third contact across the touch-sensitive surface; and
concurrently moving on the display two edges of the cropping mask rectangle that correspond to the third contact in accordance with the detected movement of the third contact, including horizontally moving one of the two edges and vertically moving the other of the two edges.

9. A computing device, comprising:
a touch-sensitive surface;
a display;
one or more processors;
memory; and
one or more programs, wherein the one or more programs are stored in the memory and configured to be executed by the one or more processors, the one or more programs including instructions for:
simultaneously displaying on the display:
a digital image; and
a cropping mask rectangle for the digital image, wherein the cropping mask rectangle has four edges comprising a top edge, a bottom edge, a left edge, and a right edge;
while simultaneously displaying the digital image and the cropping mask rectangle mask, detecting a first contact and a second contact concurrently on the touch-sensitive surface;
determining which contact of the first contact and the second contact is a topmost contact on the touch-sensitive surface;

determining which contact of the first contact and the second contact is a leftmost contact on the touch-sensitive surface; and while continuing to detect the first contact and the second contact on the touch-sensitive surface:

detecting movement of the first contact across the touch-sensitive surface; and concurrently moving on the display two edges of the cropping mask rectangle that correspond to the first contact in accordance with the detected movement of the first contact, including horizontally moving one of the two edges and vertically moving the other of the two edges, wherein movement of the two edges of the cropping mask on the display is independent of whether the first contact or the second contact are detected at a location on the touch-sensitive surface that corresponds to a location on the display of an edge of the cropping mask rectangle.

10. A non-transitory computer readable storage medium having stored therein instructions, which when executed by a computing device with a touch-sensitive surface and a display, cause the device to:

simultaneously display on the display:

a digital image; and a cropping mask rectangle for the digital image, wherein the cropping mask rectangle has four edges comprising a top edge, a bottom edge, a left edge, and a right edge;

while simultaneously displaying the digital image and the cropping mask rectangle mask, detect a first contact and a second contact concurrently on the touch-sensitive surface;

determine which contact of the first contact and the second contact is a topmost contact on the touch-sensitive surface;

determine which contact of the first contact and the second contact is a leftmost contact on the touch-sensitive surface; and, while continuing to detect the first contact and the second contact on the touch-sensitive surface:

detect movement of the first contact across the touch-sensitive surface; and concurrently move on the display two edges of the cropping mask rectangle that correspond to the first contact in accordance with the detected movement of the first contact, including horizontally moving one of the two edges and vertically moving the other of the two edges, wherein movement of the two edges of the cropping mask on the display is independent of whether the first contact or the second contact are detected at a location on the touch-sensitive surface that corresponds to a location on the display of an edge of the cropping mask rectangle.

11. The computing device of claim 9, further including instructions for:

while continuing to detect the first contact and the second contact on the touch-sensitive surface:

detecting movement of both the first contact and the second contact across the touch-sensitive surface;

vertically moving the top edge of the cropping mask rectangle in accordance with vertical movement of the topmost contact on the touch-sensitive surface;

vertically moving the bottom edge of the cropping mask rectangle in accordance with vertical movement of a bottommost of the first contact and the second contact on the touch-sensitive surface;

horizontally moving the left edge of the cropping mask rectangle in accordance with horizontal movement of the leftmost contact on the touch-sensitive surface; and horizontally moving the right edge of the cropping mask rectangle in accordance with horizontal movement of a rightmost of the first contact and the second contact on the touch-sensitive surface.

12. The computing device of claim 9, wherein the first contact and the second contact are displaced from the edges of the cropping mask rectangle.

13. The computing device of claim 9, wherein the first contact and the second contact are displaced from the cropping mask rectangle.

14. The computing device of claim 9, wherein moving a respective edge of the cropping mask rectangle in accordance with movement of a respective contact comprises moving the respective edge of the cropping mask rectangle in proportion to a component of movement of the respective contact.

15. The computing device of claim 9, wherein moving respective edges of the cropping mask rectangle in accordance with movement of respective contacts comprises snapping the cropping mask rectangle edges to a series of predefined mask aspect ratios as the respective contacts move.

16. The computing device of claim 9, further including instructions for:

while continuing to detect the first contact and the second contact on the touch-sensitive surface:

detecting a third contact on the touch-sensitive surface; and continuing to concurrently move on the display two edges of the cropping mask rectangle that correspond to the first contact in accordance with the detected movement of the first contact, including horizontally moving one of the two edges and vertically moving the other of the two edges, without respect to the third detected contact.

17. The computing device of claim 16, further including instructions for:

detecting a lift off of the second contact from the touch-sensitive surface;

while continuing to detect the first contact and the third contact on the touch-sensitive surface:

determining which contact of the first contact and the third contact is a topmost contact on the touch-sensitive surface;

determining which contact of the first contact and the third contact is a leftmost contact on the touch-sensitive surface;

detecting movement of the third contact across the touch-sensitive surface; and concurrently moving on the display two edges of the cropping mask rectangle that correspond to the third contact in accordance with the detected movement of the third contact, including horizontally moving one of the two edges and vertically moving the other of the two edges.

18. The non-transitory computer readable storage medium of claim 10, further including instructions which cause the device to:

while continuing to detect the first contact and the second contact on the touch-sensitive surface:

detect movement of both the first contact and the second contact across the touch-sensitive surface;

vertically move the top edge of the cropping mask rectangle in accordance with vertical movement of the topmost contact on the touch-sensitive surface;

vertically move the bottom edge of the cropping mask rectangle in accordance with vertical movement of a bottommost of the first contact and the second contact on the touch-sensitive surface;

horizontally move the left edge of the cropping mask rectangle in accordance with horizontal movement of the leftmost contact on the touch-sensitive surface; and horizontally move the right edge of the cropping mask rectangle in accordance with horizontal movement of a rightmost of the first contact and the second contact on the touch-sensitive surface.

19. The non-transitory computer readable storage medium of claim 10, wherein the first contact and the second contact are displaced from the edges of the cropping mask rectangle.

20. The non-transitory computer readable storage medium of claim 10, wherein the first contact and the second contact are displaced from the cropping mask rectangle.

21. The non-transitory computer readable storage medium of claim 10, wherein moving a respective edge of the cropping mask rectangle in accordance with movement of a respective contact comprises moving the respective edge of the cropping mask rectangle in proportion to a component of movement of the respective contact.

22. The non-transitory computer readable storage medium of claim 10, wherein moving respective edges of the cropping mask rectangle in accordance with movement of respective contacts comprises snapping the cropping mask rectangle edges to a series of predefined mask aspect ratios as the respective contacts move.

23. The non-transitory computer readable storage medium of claim 10, further including instructions which cause the device to:

while continuing to detect the first contact and the second contact on the touch-sensitive surface:
    detect a third contact on the touch-sensitive surface; and
    continue to concurrently move on the display two edges of the cropping mask rectangle that correspond to the first contact in accordance with the detected movement of the first contact, including horizontally moving one of the two edges and vertically moving the other of the two edges, without respect to the third detected contact.

24. The non-transitory computer readable storage medium of claim 23, further including instructions which cause the device to:

detect a lift off of the second contact from the touch-sensitive surface;

while continuing to detect the first contact and the third contact on the touch-sensitive surface:
    determine which contact of the first contact and the third contact is a topmost contact on the touch-sensitive surface;
    determine which contact of the first contact and the third contact is a leftmost contact on the touch-sensitive surface;
    detect movement of the third contact across the touch-sensitive surface; and
    concurrently move on the display two edges of the cropping mask rectangle that correspond to the third contact in accordance with the detected movement of the third contact, including horizontally moving one of the two edges and vertically moving the other of the two edges.

25. The method of claim 1, wherein the touch-sensitive surface is separate from the display.

26. The method of claim 25, wherein the touch-sensitive surface is a touch pad.

27. The computing device of claim 9, wherein the touch-sensitive surface is separate from the display.

28. The computing device of claim 27, wherein the touch-sensitive surface is a touch pad.

29. The non-transitory computer readable storage medium of claim 10, wherein the touch-sensitive surface is separate from the display.

30. The non-transitory computer readable storage medium of claim 29, wherein the touch-sensitive surface is a touch pad.

* * * * *

UNITED STATES PATENT AND TRADEMARK OFFICE
CERTIFICATE OF CORRECTION

PATENT NO. : 8,957,865 B2  Page 1 of 1
APPLICATION NO. : 12/566994
DATED : February 17, 2015
INVENTOR(S) : Avi E. Cieplinski et al.

It is certified that error appears in the above-identified patent and that said Letters Patent is hereby corrected as shown below:

On the Title Page

On the Page 2, in column 2, under "Other Publications", line 11, delete "FinderWorks," and insert --FingerWorks,--, therefor.

On the Page 2, in column 2, under "Other Publications", line 25, delete "GestureI" and insert --Gestural--, therefor.

On the Page 2, in column 2, under "Other Publications", line 44, delete "LiveOuartz,"" and insert --LiveQuartz,"--, therefor.

On the Page 2, in column 2, under "Other Publications", line 46, delete "liveguartz" and insert --livequartz--, therefor.

On the Page 2, in column 2, under "Other Publications", line 71, delete "gadgettts," and insert --gadgets,--, therefor.

In the Claims

In column 65, line 55, in Claim 2, delete "firsty" and insert --first--, therefor.

In column 66, line 62, in Claim 9, delete "rectangle mask," and insert --rectangle,--, therefor.

In column 67, line 31, in Claim 10, delete "rectangle mask," and insert --rectangle,--, therefor.

Signed and Sealed this
Thirtieth Day of June, 2015

Michelle K. Lee
*Director of the United States Patent and Trademark Office*